United States Patent
Michimata

(10) Patent No.: US 11,770,628 B2
(45) Date of Patent: Sep. 26, 2023

(54) IMAGING DEVICE AND IMAGING SYSTEM OUTPUTTING SIGNALS OF LIGHT IN DIFFERENT WAVELENGTH BANDS

(71) Applicant: CANON KABUSHIKI KAISHA, Tokyo (JP)

(72) Inventor: Kenji Michimata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 17/498,625

(22) Filed: Oct. 11, 2021

(65) Prior Publication Data
US 2022/0124291 A1 Apr. 21, 2022

(30) Foreign Application Priority Data
Oct. 15, 2020 (JP) ................................. 2020-174108

(51) Int. Cl.
| | |
|---|---|
| *H04N 25/611* | (2023.01) |
| *G06T 7/55* | (2017.01) |
| *H04N 23/11* | (2023.01) |
| *H04N 23/67* | (2023.01) |
| *H04N 25/441* | (2023.01) |
| *H04N 25/131* | (2023.01) |
| *H04N 25/13* | (2023.01) |

(52) U.S. Cl.
CPC ............. *H04N 25/611* (2023.01); *G06T 7/55* (2017.01); *H04N 23/11* (2023.01); *H04N 23/675* (2023.01); *H04N 23/676* (2023.01); *H04N 25/441* (2023.01); *G06T 2207/30252* (2013.01); *H04N 25/131* (2023.01); *H04N 25/135* (2023.01)

(58) Field of Classification Search
CPC .... H04N 25/611; H04N 23/11; H04N 23/675; H04N 23/676; H04N 25/441; H04N 25/131; H04N 25/135; H04N 25/771; H04N 23/673; G06T 7/55; G06T 2207/30252
USPC .......................................................... 348/349
See application file for complete search history.

(56) References Cited

U.S. PATENT DOCUMENTS

| 10,382,714 B2 | 8/2019 | Michimata et al. | |
|---|---|---|---|
| 2007/0279514 A1* | 12/2007 | Mitsumine ............... | H04N 5/33 348/E5.09 |

(Continued)

FOREIGN PATENT DOCUMENTS

JP H08-32978 A 2/1996

*Primary Examiner* — Usman A Khan
(74) *Attorney, Agent, or Firm* — VENABLE LLP

(57) ABSTRACT

The disclosed imaging device includes pixels each including a photoelectric convertor, a focus controller controlling a focal position of light, and a pixel controller controlling charge accumulation in the photoelectric convertors and readout of signals from the pixels. The pixels include a first pixel outputting signal corresponding to light in a first wavelength band and a second pixel outputting signal corresponding to light in a second wavelength band. The pixel controller executes, during one frame, a first period of accumulating charge in the photoelectric convertor of the first pixel in a state that the light in the first wavelength band is focused on, a second period of accumulating charge in the photoelectric convertor of the second pixel in a state that the light in the second wavelength band is focused on, and a third period of reading out signals corresponding to amount of charge generated in the photoelectric convertors.

14 Claims, 21 Drawing Sheets

(56) References Cited

U.S. PATENT DOCUMENTS

| | | | | |
|---|---|---|---|---|
| 2010/0026875 A1* | 2/2010 | Shirai | ............... | H04N 23/631 |
| | | | | 348/335 |
| 2011/0228164 A1* | 9/2011 | Kinoshita | ............. | H04N 23/54 |
| | | | | 348/374 |
| 2012/0057223 A1* | 3/2012 | Cook | ................. | G02B 13/14 |
| | | | | 359/557 |
| 2015/0130978 A1* | 5/2015 | Tashiro | ............. | H04N 25/531 |
| | | | | 348/311 |
| 2016/0240571 A1* | 8/2016 | Baek | ............... | H01L 27/14636 |
| 2018/0132706 A1* | 5/2018 | Nagae | ................ | G02B 21/18 |

\* cited by examiner

IMAGING DEVICE AND IMAGING SYSTEM OUTPUTTING SIGNALS OF LIGHT IN DIFFERENT WAVELENGTH BANDS

BACKGROUND OF THE INVENTION

Field of the Invention

The present invention relates to an imaging device and an imaging system.

Description of the Related Art

An image sensor having a color filter (CF) array of the Bayer arrangement generally includes a plurality of types of pixels having sensitivity in different wavelength bands, such as RGB (Red, Green, Blue). Since pixels having different sensitivities in different wavelength bands have different degrees of the axial chromatic aberration, it is difficult to focus all pixels in one image when combined with lenses not subjected to the axial chromatic aberration correction. Therefore, in the conventional imaging device, the axial chromatic aberration for the multiple kinds of pixels is corrected by using a lens (apochromatic lens) to which the axial chromatic aberration correction is applied. Japanese Patent Application Laid-Open No. H08-032978 discloses a surface-sequential color camera having driving means for moving an imaging element in the optical axis direction corresponding to each color in order to remove the axial chromatic aberration for each color of the color-separated image light.

Some recent image sensors have a CF array for simultaneously receiving visible light and infrared light, such as RGB-IR (Red, Green, Blue, Infrared). It is possible to use a lens capable of correcting the axial chromatic aberration from a visible light region to an infrared region when focusing on all pixels in one imaging in such a CF array image sensor. However, such a lens is very expensive compared with a visible light lens, and an increase in component cost cannot be avoided. Further, in the technique disclosed in Japanese Patent Application Laid-Open No. H08-032978, images of two or more wavelength bands cannot be acquired in one frame, and it is difficult to acquire high quality images focused on all pixels at high speed.

SUMMARY OF THE INVENTION

The present invention allows to provide a technique for obtaining a high quality image focused on multiple kinds of pixels at a high speed while suppressing an increase in component cost in an imaging device having multiple kinds of pixels having sensitivity in different wavelength bands.

According to an aspect of the present disclosure, there is provided an imaging device including a plurality of pixels each including a photoelectric converter, a focus control unit configured to control a focal position of light incident on the plurality of pixels, and a pixel control unit configured to control charge accumulation in the photoelectric converter of the plurality of pixels, and readout of signals from the plurality of pixels, wherein the plurality of pixels includes a plurality of first pixels configured to output a signal corresponding to light in a first wavelength band, and a plurality of second pixels configured to output a signal corresponding to light in a second wavelength band that is different from the first wavelength band, wherein the pixel control unit is configured to execute, during one frame a first period of accumulating charge in the photoelectric converters of the plurality of first pixels in a state that the light in the first wavelength band is focused on the plurality of first pixels, a second period of accumulating charge in the photoelectric converters of the plurality of second pixels in a state that the light in the second wavelength band is focused on the plurality of second pixels, and a third period of reading out, from each of the plurality of pixels, a signal corresponding to an amount of charge generated in the photoelectric converter.

According to another aspect of the present disclosure, there is provided an imaging device including a plurality of pixels each including a photoelectric converter, a focus control unit configured to control a focal position of light incident on the plurality of pixels, and a pixel control unit configured to control charge accumulation in the photoelectric converter of the plurality of pixels, and readout of signals from the plurality of pixels, wherein the plurality of pixels includes a plurality of types of pixels each having sensitivity in different wavelength bands, wherein the pixel control unit is configured to execute, during one frame, a plurality of periods each corresponding to the plurality of types of pixels, each of the plurality of periods being a period of accumulating charge in the photoelectric converter of a corresponding type of pixel in a state that light in a wavelength band in which the corresponding type of pixel has sensitivity is focused on, and a period of reading out, from each of the plurality of pixels, a signal corresponding to an amount of charge generated in the photoelectric converter.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An imaging device according to a first embodiment of the present invention will be described with reference to FIG. 1 to FIG. 6.

Figure 1:
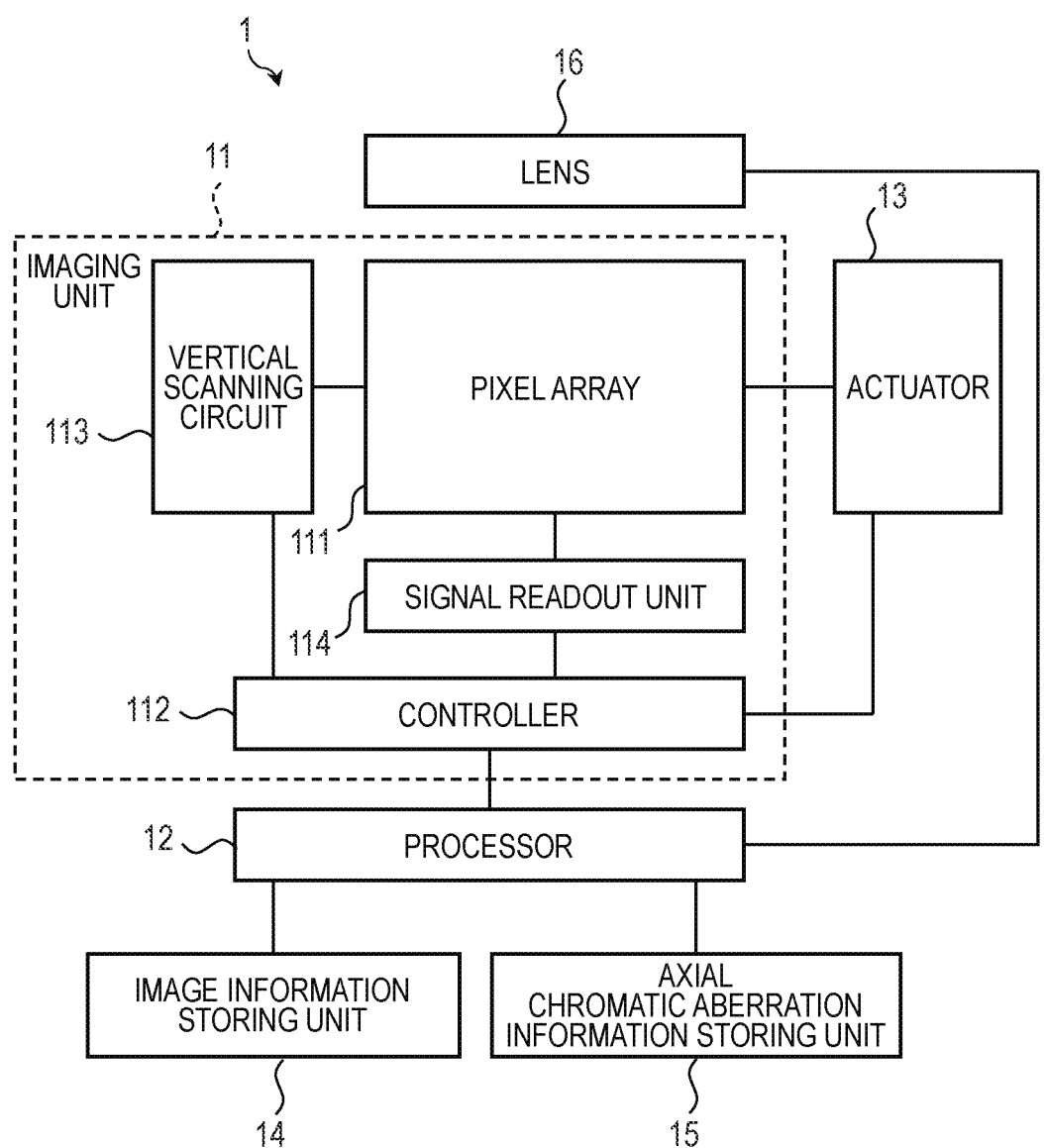
FIG. 1 is a block diagram illustrating a configuration example of an imaging device according to a first embodiment of the present invention.
Figure 2:
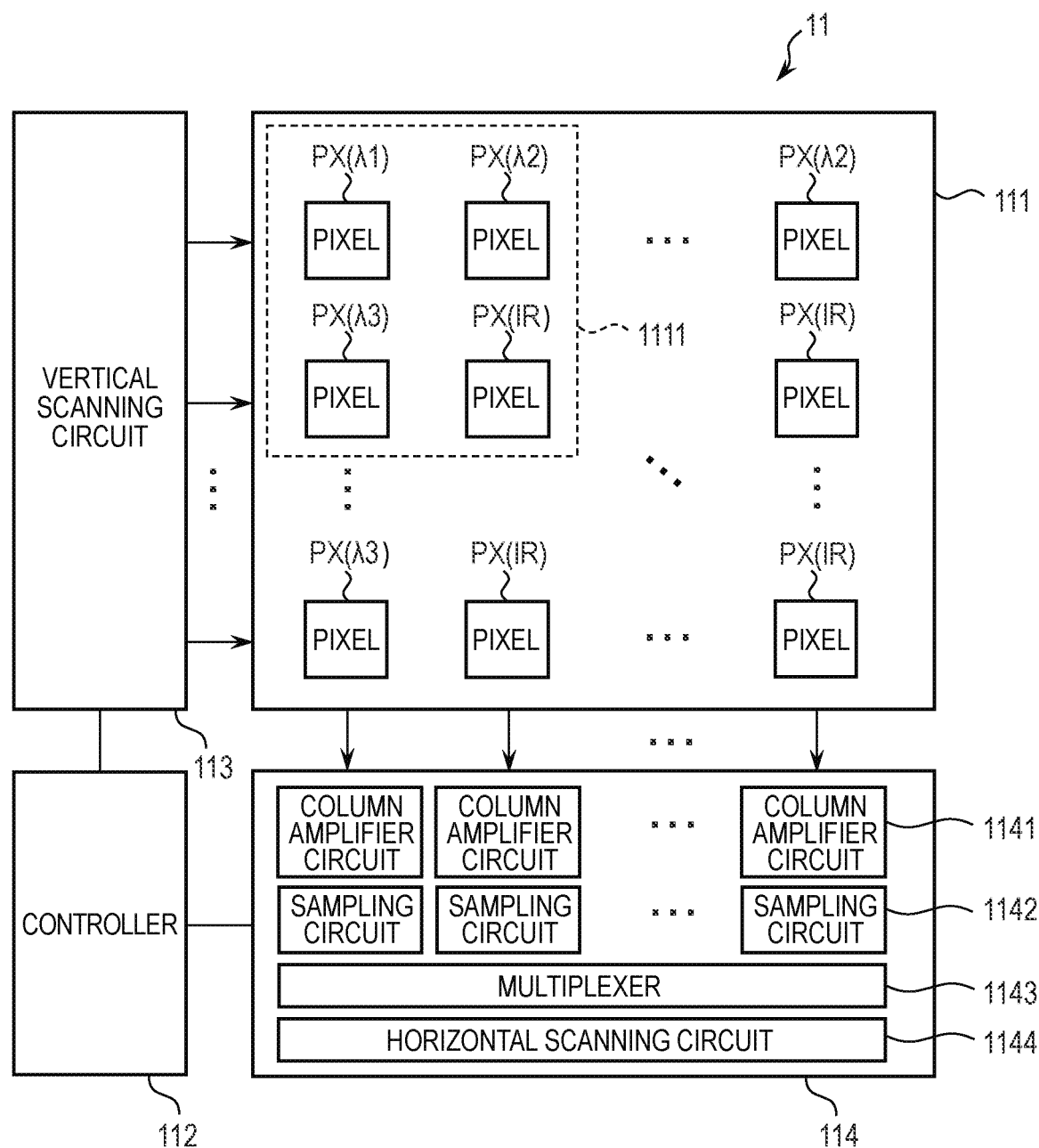
FIG. 2 is a block diagram illustrating a configuration example of an imaging unit in the imaging device according to the first embodiment of the present invention.
Figure 3:
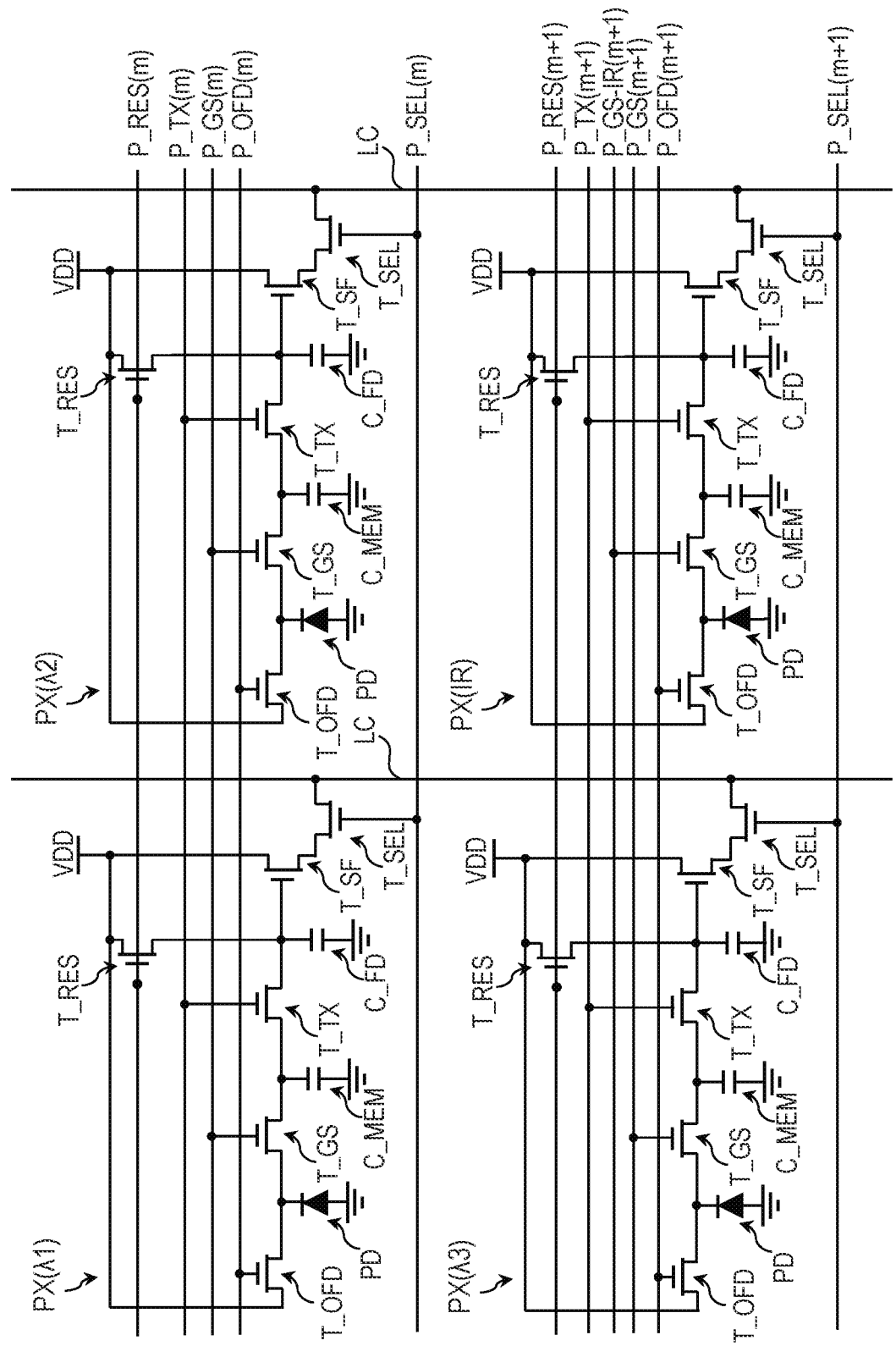
FIG. 3 is a circuit diagram illustrating a configuration example of a unit pixel block in the imaging device according to the first embodiment of the present invention.

First, a configuration example of the imaging device according to the present embodiment will be described with reference to FIG. 1 to FIG. 3. FIG. 1 is a block diagram illustrating a configuration example of the imaging device according to the present embodiment. FIG. 2 is a block diagram illustrating a configuration example of an imaging unit in the imaging device according to the present embodiment. FIG. 3 is a circuit diagram illustrating a configuration example of a unit pixel block in the imaging device according to the present embodiment.

As illustrated in FIG. 1, the imaging device 1 according to the present embodiment may comprise an imaging unit 11, a processor 12, an actuator 13, an image information storing unit 14, an axial chromatic aberration information storing unit 15, and a lens 16. The imaging unit 11 may comprise a pixel array 111, a controller 112, a vertical scanning circuit 113, and a signal readout unit 114.

The processor 12 is connected to the image information storing unit 14, the axial chromatic aberration information storing unit 15, the lens 16, and the controller 112. The controller 112 is connected to the vertical scanning circuit 113, the signal readout unit 114, and the actuator 13. The pixel array 111 is connected to the vertical scanning circuit 113, the signal readout unit 114, and the actuator 13.

The lens 16 is disposed at a position where an optical image of an object may be formed on the imaging surface (pixel array 111) of the imaging unit 11. The lens 16 may also have a function of focusing by moving along the optical axis under the control of the processor 12. The lens 16 of the present embodiment is a lens to which axial chromatic aberration correction is applied in the wavelength band of visible light. For example, the lens 16 is preferably a lens having no axial chromatic aberration caused by wavelength differences of red, green and blue. The lens 16 may be configured to hold information on the type and focal length of the lens, which are specifications of the lens, or may have a function of transmitting the information to the outside (for example, the measured pixel selection unit 124 according to the third embodiment, which will be described later, is provided).

The actuator 13 has a function of focusing by moving the imaging surface (pixel array 111) of the imaging unit 11 in the optical axis direction under the control of the controller 112. The actuator 13 may be, for example, a piezoelectric element, but is not particularly limited.

The processor 12 is configured to communicate with the controller 112 of the imaging unit 11. The processor 12 has a function of acquiring image data of an object by controlling the vertical scanning circuit 113 and the signal readout unit 114 via the controller 112, and storing the acquired image data in the image information storing unit 14. The processor 12 also drives the actuator 13 via the controller 112. The processor 12 drives the lens 16. That is, the processor 12 further includes a function as a focus control unit for controlling the focal position of light by driving the actuator 13 and/or the lens 16.

The axial chromatic aberration information storing unit 15 holds information (axial chromatic aberration information) on the axial chromatic aberration amount for each type of lens and each focal length. The processor 12 acquires the axial chromatic aberration amount corresponding to the type of the lens 16 and the focal length from the axial chromatic aberration information storing unit 15, and drives the actuator 13 according to the acquired axial chromatic aberration amount. Thus, the actuator 13 may be used for correcting the axial chromatic aberration of the lens. That is, the axial chromatic aberration of each pixel may be corrected by appropriately driving the actuator 13 with different displacement amounts for pixels having sensitivity in different wavelength bands.

The processor 12 may comprise, for example, an integrated circuit or a device (for example, an PLD (Programmable Logic Device) such as a Field Programmable Gate Array (FPGA)) capable of programming each function. Alternatively, the processor 12 may be an arithmetic unit such as an MPU (Micro Processing Unit) or an DSP (Digital Signal Processor) for realizing each function. Alternatively, the processor 12 may be a dedicated integrated circuit (Application Specific Integrated Circuits (ASICs), etc.). Alternatively, the processor 12 may include a CPU and memory, and each function may be implemented on a software. That is, the functions of the processor 12 may be implemented by one or both of hardware and software.

As illustrated in FIG. 2, the pixel array 111 includes a plurality of pixels PX arranged in a matrix so as to form a plurality of rows and a plurality of columns. A plurality of pixels PX forming the pixel array 111 include a plurality of kinds of pixels PX having different spectral sensitivity characteristics. Here, it is considered that a plurality of pixels PX forming the pixel array 111 include four types of pixels PX: pixels PX($\lambda$1), PX($\lambda$2), PX($\lambda$3) having sensitivity in the wavelength band of visible light, and pixels PX(IR) having sensitivity in the wavelength band of infrared light. In the pixel array 111, unit pixel blocks 1111 of two rows and two columns, each of which includes four pixels PX($\lambda$1), PX($\lambda$2), PX($\lambda$3), and PX(IR), are repeatedly arranged in row and column directions. In FIG. 2, in each of the unit pixel blocks 1111, the upper left pixel PX is referred to as a pixel PX($\lambda$1), the upper right pixel PX is referred to as a pixel PX($\lambda$2), the lower left pixel PX is referred to as a pixel PX($\lambda$3), and the lower right pixel PX is referred to as a pixel PX(IR).

The spectral sensitivity characteristic of each pixel PX may be changed depending on the type of color filter (hereinafter referred to as "CF") provided in each pixel PX. For example, an CF having a higher transmittance in the wavelength band of green (G) than the CF included in the pixels PX($\lambda$2), PX($\lambda$3) and PX(IR) may be applied to the pixel PX($\lambda$1). An CF having a higher transmittance in the wavelength band of red (R) than the CF provided in the pixels PX($\lambda$1), PX($\lambda$3) and PX(IR) may be applied to the pixel PX($\lambda$2). An CF having a higher transmittance in the wavelength band of blue (B) than the CF provided in the pixels PX($\lambda$1), PX($\lambda$2) and PX(IR) may be applied to the pixel PX($\lambda$3). An CF having a higher transmittance in the wavelength band of infrared light than the CF provided in the pixels PX($\lambda$1), PX($\lambda$2) and PX($\lambda$3) may be applied to the pixel PX(IR). The combination of CF is not limited to this example, and CF having a color other than RGB may be applied to CF for visible light.

The vertical scanning circuit 113 is a control circuit configured to supply a control signal for driving the plurality of pixels PX forming the pixel array 111 in a row unit to the pixel array 111. The vertical scanning circuit 113 may be configured using a shift register or an address decoder.

As illustrated in FIG. 2, the signal readout unit 114 may comprise a plurality of column amplifier circuits 1141 and sampling circuits 1142 provided corresponding to each column of the pixel array 111, a multiplexer 1143, and a horizontal scanning circuit 1144. The column amplifier circuit 1141 and the sampling circuit 1142 perform predetermined processing on pixel signals read out from the pixels PX of each column of the pixel array 111 in response to a control signal from the vertical scanning circuit 113. The horizontal scanning circuit 1144 is configured by using a shift register or an address decoder, and is a control circuit for supplying a control signal specifying a column for outputting a pixel signal to the multiplexer 1143. The multiplexer 1143 is an output circuit that outputs pixel signals of corresponding columns in response to control signals from the horizontal scanning circuit 1144. The signal readout unit 114 may further include an analog-to-digital conversion circuit for converting an analog pixel signal read out from the pixels PX of each column into a digital pixel signal. The details of the signal readout unit 114 will be described later.

The vertical scanning circuit 113 and the signal readout unit 114 have a function as a pixel control unit for controlling the accumulation of charge in the photoelectric converter of the plurality of pixels PX and for controlling the readout of signals from the plurality of pixels PX under the control of the controller 112.

The controller 112 includes a timing generator and has a function of performing synchronous control of the pixel PX, the vertical scanning circuit 113 and the signal readout unit 114 under the control of the processor 12.

FIG. 3 is a circuit diagram illustrating a configuration example of the unit pixel block 1111. Here, an example of the configuration of the unit pixel block 1111 will be described with reference to the pixels PX($\lambda$1) and PX($\lambda$2) arranged in the m-th row, and the pixels PX($\lambda$3) and PX(IR) arranged in a (m+1)-th row.

Each of the pixels PX($\lambda$1), PX($\lambda$2), PX($\lambda$3), and PX(IR) may include a photoelectric converter PD, transistors T_GS, T_TX, T_OFD, T_RES, T_SF, T_SEL, and capacitors C_MEM, C_FD, as illustrated in FIG. 3. The photoelectric converter PD may be, for example, a photoelectric conversion element such as a photodiode, but may be another known photodetection element. The transistors T_GS, T_TX, T_OFD, T_RES, T_SF, and T_SEL may be, for example, n-channel MOS transistors, but may be p-channel MOS transistors or other known switching elements. The capacitors C_MEM and C_FD are capacitance components coupled to source/drain regions of the transistors T_GS, T_TX and T_RES such as p-n junction capacitance and interconnection capacitance.

In the photoelectric converter PD, an anode is connected to a ground node, and a cathode is connected to the drain of the transistor T_GS and the source of the transistor T_OFD. The source of the transistor T_GS is connected to the drain of the transistor T_TX. The capacitor C_MEM is a capacitance component coupled to a connection node between the source of the transistor T_GS and the drain of the transistor T_TX. The source of the transistor T_TX is connected to the source of the transistor T_RES and the gate of the transistor T_SF. The capacitor C_FD is a capacitance component coupled to a connection node between the source of the transistor T_TX, the source of the transistor T_RES, and the gate of the transistor T_SF. The connection node between the source of the transistor T_TX, the source of the transistor T_RES, and the gate of the transistor T_SF may be referred to as a floating diffusion node (hereinafter referred to as "FD node").

The source of the transistor T_SF is connected to the drain of the transistor T_SEL. The source of the transistor T_SEL is connected to a column signal line LC. The drain of the transistor T_OFD, the drain of the transistor T_RES, and the drain of the transistor T_SF are connected to a power supply node to which the voltage VDD is supplied. Although the voltages supplied to the drain of the transistor T_OFD, the drain of the transistor T_RES, and the drain of the transistor T_SF are referred to herein as the common voltage VDD, these voltages need not necessarily be the same.

The gate of the transistor T_RES of the pixel PX($\lambda$1) and the gate of the transistor T_RES of the pixel PX($\lambda$2) are connected to a signal line for supplying a common control signal P_RES(m) to the pixels PX($\lambda$1) and PX($\lambda$2) of the m-th row. The gate of the transistor T_TX of the pixel PX($\lambda$1) and the gate of the transistor T_TX of the pixel PX($\lambda$2) are connected to a signal line for supplying a common control signal P_TX(m) to the pixels PX($\lambda$1) and PX($\lambda$2) of the m-th row. The gate of the transistor T_GS of the pixel PX($\lambda$1) and the gate of the transistor T_GS of the pixel PX($\lambda$2) are connected to a signal line for supplying a common control signal P_GS(m) to the pixels PX($\lambda$1) and PX($\lambda$2) of the m-th row. The gate of the transistor T_OFD of the pixel PX($\lambda$1) and the gate of the transistor T_OFD of the pixel PX($\lambda$2) are connected to a signal line for supplying a common control signal P_OFD(m) to the pixels PX($\lambda$1)

and PX(λ2) of the m-th row. The gate of the transistor T_SEL of the pixel PX(λ1) and the gate of the transistor T_SEL of the pixel PX(λ2) are connected to a signal line for supplying a common control signal P_SEL(m) to the pixels PX(λ1) and PX(λ2) of the m-th row.

The gate of the transistor T_RES of the pixel PX(λ3) and the gate of the transistor T_RES of the pixel PX(IR) are connected to a signal line for supplying a common control signal P_RES(m+1) to the pixels PX(λ3) and PX(IR) of the (m+1)-th row. The gate of the transistor T_TX of the pixel PX(λ3) and the gate of the transistor T_TX of the pixel PX(IR) are connected to a signal line for supplying a common control signal P_TX(m+1) to pixels PX(λ3) and PX(IR) of the (m+1)-th row. The gate of the transistor T_GS of the pixel PX(IR) is connected to a signal line for supplying a common control signal P_GS-IR(m+1) to the pixel PX(IR) of the (m+1)-th row. The gate of the transistor T_GS of the pixel PX(λ3) is connected to a signal line for supplying a common control signal P_GS(m+1) to the pixel PX(λ3) of the (m+1)-th row. The gate of the transistor T_OFD of the pixel PX(λ3) and the gate of the transistor T_OFD of the pixel PX(IR) are connected to a signal line for supplying a control signal P_OFD(m+1) common to the pixels PX(λ3) and PX(IR) of the (m+1)-th row. The gate of the transistor T_SEL of the pixel PX(λ3) and the gate of the transistor T_SEL of the pixel PX(IR) are connected to a signal line for supplying a control signal P_SEL(m+1) common to the pixels PX(λ3) and PX(IR) of the (m+1)-th row.

The control signals P_RES, P_TX, P_GS, P_GS-IR, P_OFD, P_SEL are generated by the vertical scanning circuit 113 on the basis of a synchronization signal outputted from the controller 112 and supplied to a plurality of pixels PX of the pixel array 111 in a row unit. Each transistor forming the pixel PX is controlled to be conductive (ON) or non-conductive (OFF) in response to a corresponding control signal. If each transistor is composed of an n-channel MOS transistor, it is turned on when the corresponding control signal is at a high level (hereinafter referred to as "H level") and turned off when the corresponding control signal is at a low level (hereinafter referred to as "L level").

The photoelectric converter PD converts the incident light into an amount of electric charge corresponding to the quantity of light (i.e., photoelectric conversion), and accumulates the generated electric charge. The transistor T_GS, also referred to as a transfer transistor, has a function as a transfer unit for transferring the charge held by the photoelectric converter PD to the capacitor C_MEM when turned on. The capacitor C_MEM has a function as a charge holding unit for holding charge transferred from the photoelectric converter PD. The transistor T_TX, also referred to as a transfer transistor, has a function as a transfer unit for transferring the charge held by the capacitor C_MEM to the capacitor C_FD when turned on. The capacitor C_FD has a function as a charge holding unit for holding charge transferred from the capacitor C_MEM. The capacitor C_FD also has a function as a charge voltage conversion unit for setting the potential of the FD node to a potential corresponding to its capacitance value and the amount of charge to be held.

The transistor T_SF is configured such that a voltage VDD is supplied to the drain and a bias current is supplied to the source from a current source (not illustrated) via the transistor T_SEL, and forms an amplifier unit (source follower circuit) having a gate as an input node. Thus, the transistor T_SF outputs a signal corresponding to the potential of the FD node to the column signal line LC via the transistor T_SEL.

The transistor T_RES, which is also referred to as a reset transistor, has a function as a reset unit for resetting the FD node to a voltage corresponding to the voltage VDD when turned on. The transistor T_OFD is also referred to as an overflow drain transistor, and has a function as an overflow drain unit for discharging charge held by the photoelectric converter PD when turned on. In other words, the transistor T_OFD has a function as a reset unit for resetting the photoelectric converter PD to a voltage corresponding to the voltage VDD when the transistor T_OFD is turned on. The transistor T_SEL, also referred to as a select transistor, has a function as a select unit for selecting whether or not to output a signal corresponding to the source voltage of the transistor T_SF as a pixel signal to the column signal line LC.

Although an example in which the imaging unit 11 is formed with a CMOS image sensor will be described in the present embodiment, the imaging unit 11 may be formed with a CCD image sensor. The imaging unit 11 may be configured as an image sensor composed of one semiconductor chip, or may be configured as a part of a stacked multifunctional image sensor or the like.

Figure 4:
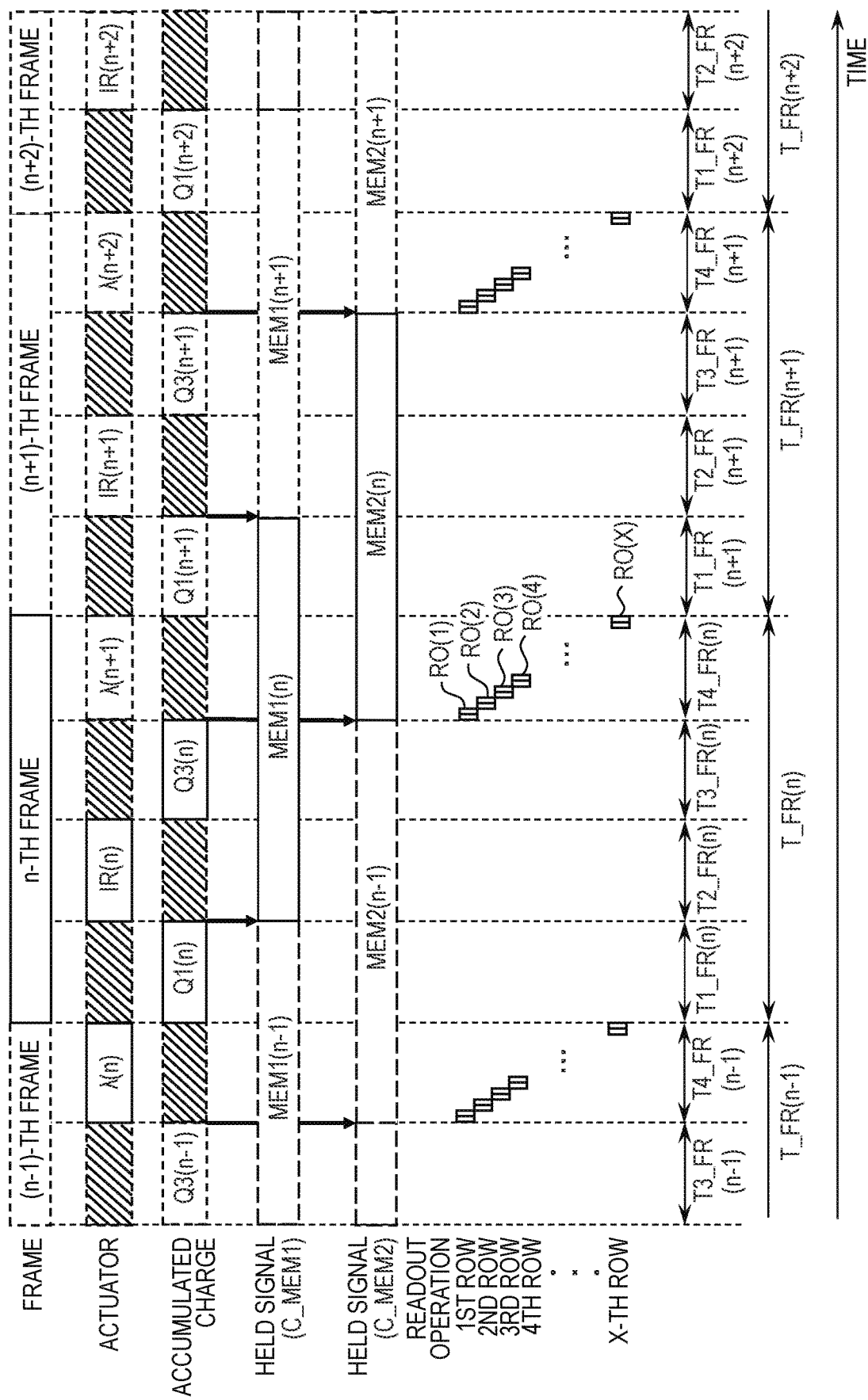
FIG. 4 is a timing diagram (part 1) illustrating an example of driving the imaging device according to the first embodiment of the present invention.
Figure 5:
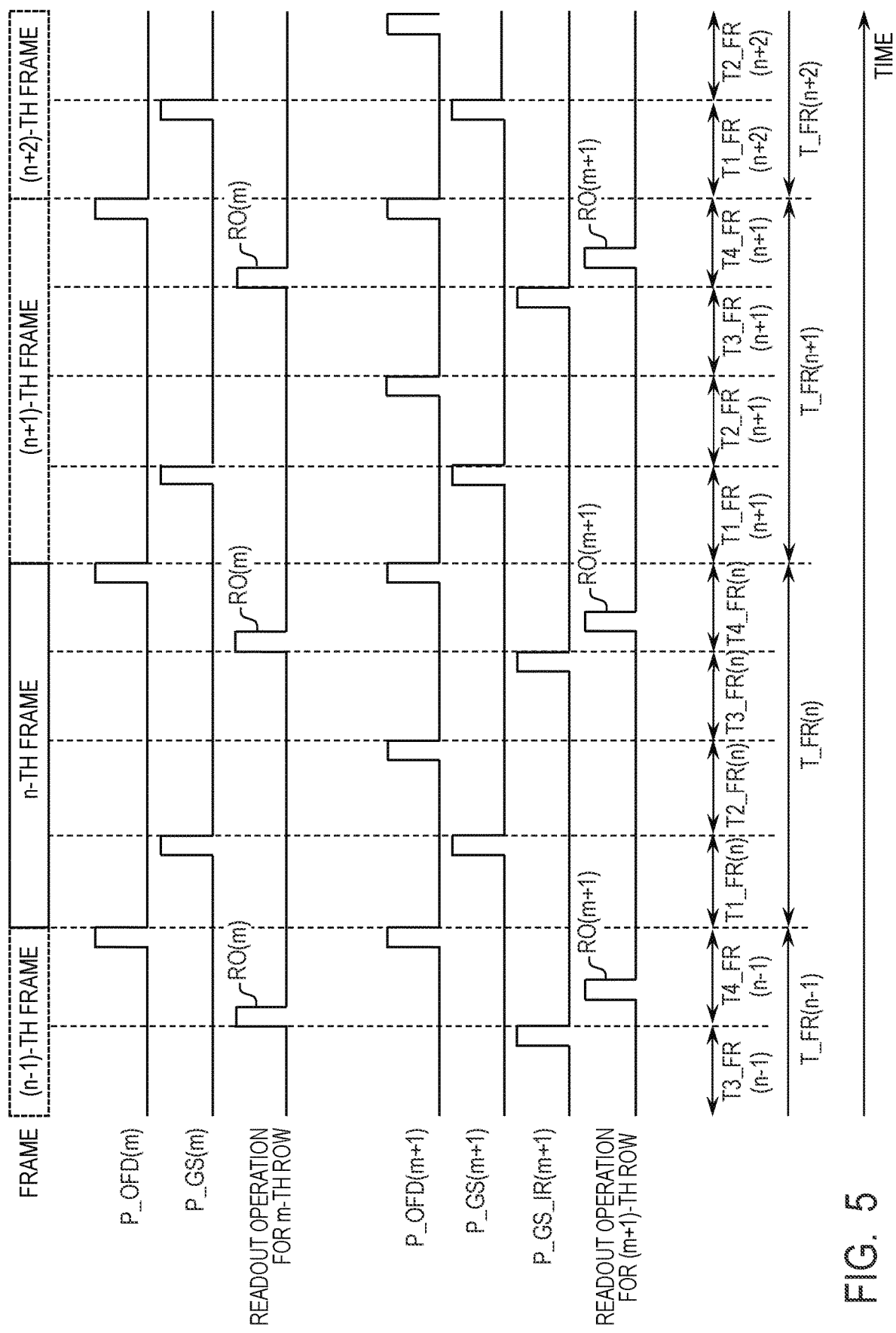
FIG. 5 is a timing diagram (part 2) illustrating an example of driving the imaging device according to the first embodiment of the present invention.
Figure 6:
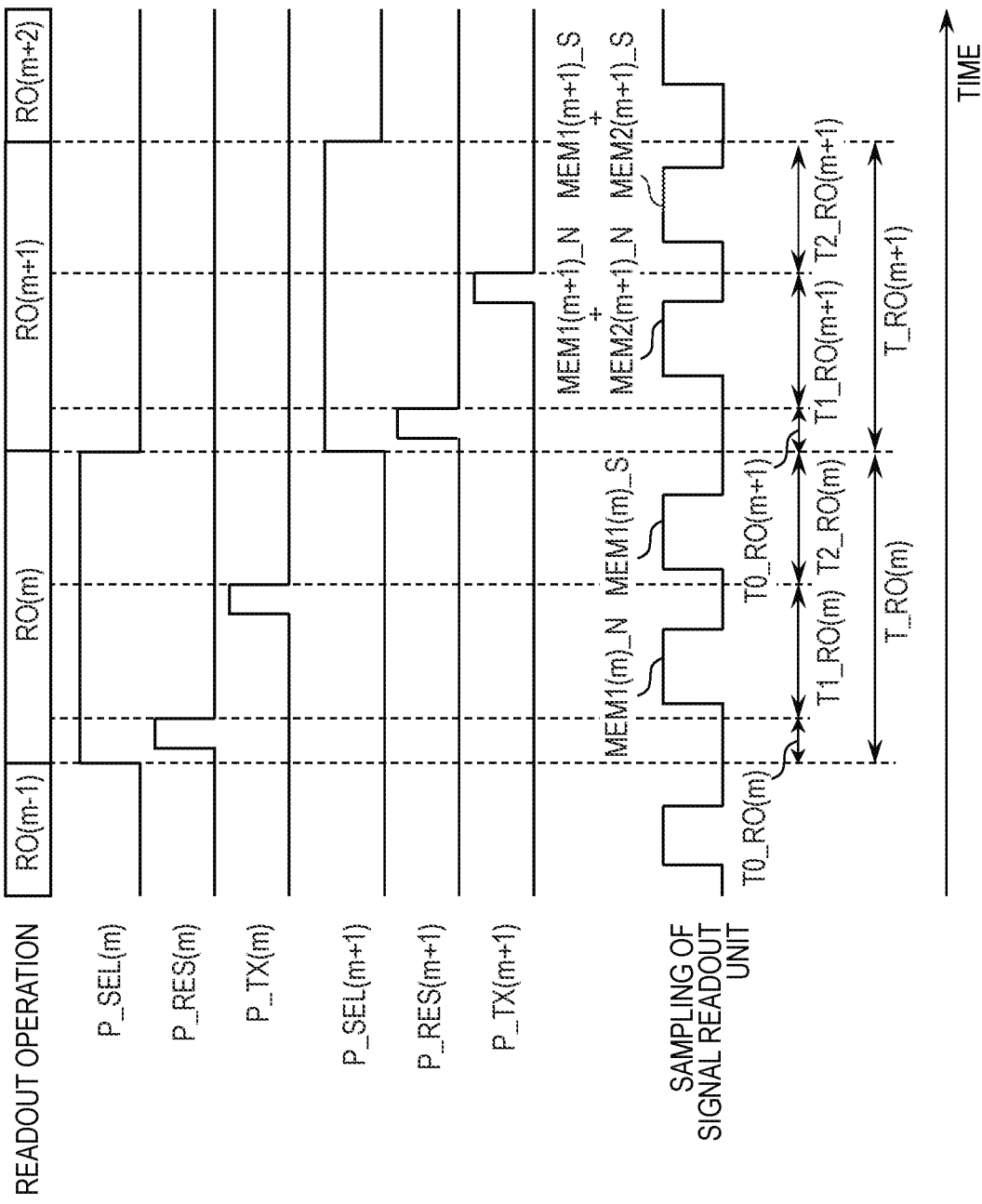
FIG. 6 is a timing diagram (part 3) illustrating an example of driving the imaging device according to the first embodiment of the present invention.

Next, a method of driving the imaging device according to the present embodiment will be described with reference to FIG. 4 to FIG. 6. FIG. 4 to FIG. 6 are timing diagrams illustrating driving examples of the imaging device according to the present embodiment.

FIG. 4 schematically illustrates the operation of the imaging device in the case of capturing moving images. FIG. 4 illustrates temporal changes of "frame", "actuator", "accumulated charge", "held signal (C_MEM1)", "held signal (C_MEM2)", and "readout operation".

In FIG. 4, the "frame" is a period (period T_FR) for acquiring image data (frame data) for one still image generated based on pixel signals of a plurality of pixels PX forming the pixel array 111. FIG. 4 illustrates the operation of four consecutive frames from (n−1)-th frame to (n+2)-th frame. In FIG. 4, a period for acquiring frame data FR(n−1) of (n−1)-th frame corresponds to a period T_FR(n−1). A period for acquiring the frame data FR(n) of n-th frame corresponds to the period T_FR(n). A period for acquiring the frame data FR(n+1) of (n+1)-th frame corresponds to the period T_FR(n+1). A period for acquiring the frame data FR(n+2) of (n+2)-th frame corresponds to the period T_FR (n+2). Each of the periods T_FR includes a first period T1_FR, a second period T2_FR, a third period T3_FR, and a fourth period T4_FR.

In FIG. 4, the "actuator" indicates a driving state of the actuator 13. The actuator 13 is configured to control the position of the pixel array 111 in the optical axis direction in order to correct the axial chromatic aberration of the lens, and may take three driving states, for example, focusing an image of visible light, focusing an image of infrared light, and inactive. In FIG. 4, IR(n), IR(n+1), and IR(n+2) indicate a state in which the pixel array 111 is moved in the optical axis direction by the actuator 13 in order to focus an image of infrared light. Further, λ(n), λ(n+1) and λ(n+2) indicate a state in which the pixel array 111 is moved in the optical axis direction by the actuator 13 in order to focus an image of visible light. In FIG. 4, the shaded period indicates a period during which the actuator 13 is not driven. In this shaded period, the actuator 13 maintains the state set in the immediately preceding period.

In FIG. 4, "accumulated charge" indicates a charge holding period in the photoelectric converter PD. Here, the amount of charge accumulated in the photoelectric converter PD during the third period T3_FR(n−1) of the (n−1)-th frame is represented by Q3(n−1), and the amount of charge accumulated in the photoelectric converter PD during the first period T1_FR(n) of the n-th frame is represented by Q1(n). Further, the charge amount accumulated in the photoelectric converter PD during the third period T3_FR(n) of the n-th frame is represented by Q3(n), and the charge amount accumulated in the photoelectric converter PD during the first period T1_FR(n+1) of the (n+1)-th frame is represented by Q1(n+1). Further, the amount of charge accumulated in the photoelectric converter PD during the third period T3_FR(n+1) of the (n+1)-th frame is represented by Q3(n+1), and the amount of charge accumulated in the photoelectric converter PD during the first period T1_FR(n+2) of the (n+2)-th frame is represented by Q1(n+2). In FIG. 4, the shaded period is a period during which the overflow drain (OFD) operation is performed, and no charge is accumulated in the photoelectric converter PD.

In FIG. 4, the "held signal (C_MEM1)" indicates a signal MEM1 held in the capacitor C_MEM of the pixels PX(λ1), PX(λ2), and PX(λ3). The "held signal (C_MEM2)" indicates a signal MEM2 held by the capacitor C_MEM of the pixel PX (IR). The levels of the signals MEM1 and MEM2 held in the capacitor C_MEM are voltage values corresponding to the amount of charge transferred from the photoelectric converter PD to the capacitor C_MEM by the transistor T_GS.

In FIG. 4, the "readout operation" visually indicates that signals from a plurality of pixels PX are sequentially read out row by row. In FIG. 4, it is considered that the pixel array 111 is composed of X rows from the first row to the X-th row (X is an integer of 2 or more), and the readout operation is performed in the order of the first row, the second row, the third row, . . . , and the X-th row. The readout operation RO(m) illustrated in FIG. 4 represents the readout operation of the signal from the pixel PX of the m-th row (m is an integer of 1 to X).

Since the operations in each frame are basically the same, description will be given here focusing on the readout operation of the frame data FR(n). In the fourth period T4_FR(n−1) of the previous frame ((n−1)-th frame), the actuator 13 is driven (actuator: λ(n)), and the pixel array 111 is moved in the optical axis direction so that the image of visible light incident on the pixel PX is focused.

The period T_FR(n) for reading the frame data FR(n) includes, as described above, the first period T1_FR(n), the second period T2_FR(n), the third period T3_FR(n), and the fourth period T4_FR(n).

In the first period T1_FR(n), charges of the pixels PX(λ1), PX(λ2), and PX(λ3) are accumulated in the photoelectric converter PD without driving the actuator 13 (actuator: inactive). The charge amount Q1(n) accumulated in the photoelectric converter PD during the first period T1_FR(n) is based on the amount of visible light focused on the pixel array 111 and incident on each of the pixels PX(λ1), PX(λ2), and PX(λ3).

After the lapse of the first period T1_FR(n), the charge held by the photoelectric converter PD is transferred to the capacitor C_MEM. Thus, the capacitor C_MEM holds the signal MEM1(n) corresponding to the capacitance value and the charge amount Q1(n). The capacitor C_MEM holds a signal MEM1(n) over a period from a second period T2_FR(n) of n-th frame to a first period T1_FR(n+1) of (n+1)-th frame.

In the second period T2_FR(n), the actuator 13 is driven (actuator: IR(n)), and the pixel array 111 is moved in the optical axis direction so that the image of the infrared light incident on the pixel PX(IR) is focused. Although the details will be described later, in the second period T2_FR(n), charges are not accumulated in the photoelectric converter PD. Specifically, the charge generated in the photoelectric converter PD during the second period T2_FR(n) is discharged by the transistor T_OFD (OFD operation).

Since the amount of movement by the actuator 13 varies depending on the type of the lens and the focal length, the length of the actuator driving period varies depending on the condition of the lens. Since the axial chromatic aberration of a general lens increases in proportion to the focal length, the longer the focal length, the greater the amount of movement, i.e., the longer the actuator driving period.

In the following third period T3_FR(n), the charge of the pixel PX(IR) is accumulated in the photoelectric converter PD without driving the actuator 13 (actuator: inactive). The charge amount Q3(n) accumulated in the photoelectric converter PD during the third period T3_FR(n) is based on the amount of infrared light focused on the pixel array 111 and incident on the pixel PX(IR).

After the lapse of the third period T3_FR(n), the charge held by the photoelectric converter PD of the pixel PX(IR) is transferred to the capacitor C_MEM. Thus, the capacitor C_MEM of the pixel PX(IR) holds the signal MEM2(n) corresponding to the capacitance value and the charge amount Q3(n). The capacitor C_MEM holds a signal MEM2(n) over a period from a fourth period T4_FR(n) of n-th frame to a third period T3_FR(n+1) of (n+1)-th frame.

In the following fourth period T4_FR(n), the actuator 13 is driven (actuator: λ(n+1)), and the pixel array 111 is moved in the optical axis direction so that images of visible light incident on the pixels PX(λ1), PX(λ2), and PX(λ3) are focused. Further, although the details will be described later, in the fourth period T4_FR(n), the readout operation of signals from the plurality of pixels PX is sequentially performed row by row. Specifically, the readout operations from the readout operation RO(1) of the first row to the readout operation RO(λ) of the X-th row are sequentially performed row by row. This readout operation is performed during the fourth period T4_FR(n) in which the signal MEM1(n) and the signal MEM2(n) are held in the capacitor C_MEM.

Based on the signals MEM1(n) and MEM2(n) read out as described above, the processor 12 may acquire an image signal based on the focused visible light and infrared light within one frame. The acquired image signal is stored in the image information storing unit 14 as image information.

FIG. 5 and FIG. 6 illustrate waveforms of control signals supplied from the vertical scanning circuit 113 to the pixels PX of the pixel array 111 when the operation of FIG. 4 is performed. FIG. 5 and FIG. 6 illustrate only the control signals supplied to the pixels PX in the m-th row and the (m+1)-th row for simplification of the description, but the same applies to the control signals supplied to the pixels PX in other rows.

FIG. 5 illustrates control signals P_OFD(m) and P_GS(m) of pixels PX(λ1) and PX(λ2), and control signals P_OFD(m+1), P_GS(m+1) and P_GS_IR(m+1) of pixels PX(λ3) and PX(IR). In FIG. 5, the readout operations RO(m) and RO(m+1) are represented by the same pulse waveform as that of the control signal. The period in which the readout operations RO(m) and RO(m+1) are indicated at the H level correspond to a period for reading out, and a period in which the readout operations RO(m) and RO(m+1) are indicated at the L level is a period for not reading out.

In the fourth period T4_FR(n−1) of the (n−1)-th frame, the position of the pixel array 111 in the optical axis direction is adjusted by the actuator 13 so that the image of visible light incident on the pixel PX is focused. At the end of the fourth period T4_FR(n−1) of the (n−1)-th frame, the vertical scanning circuit 113 switches the control signals P_OFD(m) and P_OFD(m+1) from the L level to the H level. Thus, the transistor T_OFD of the pixel PX of the m-th row and the (m+1)-th row is turned on, and the photoelectric converters PD of the pixels PX(λ1), PX(λ2), PX(λ3), and PX(IR) are reset.

The control signals P_OFD(m) and P_OFD(m+1) are switched from the H level to the L level by the vertical scanning circuit 113, whereby the reset of the photoelectric converter PD in the pixels PX(λ1), PX(λ2), PX(λ3) and PX(IR) is released. Thus, charge accumulation is started in the photoelectric converter PD of the pixels PX(λ1), PX(λ2), PX(λ3), and PX(IR). The timing at which the control signals P_OFD(m) and P_OFD(m+1) switch from the H level to the L level corresponds to the end timing of the fourth period T4_FR(n−1) of the (n−1)-th frame and the start timing of the first period T1_FR(n) of the n-th frame.

At the end of the first period T1_FR(n), the vertical scanning circuit 113 switches the control signals P_GS(m) and P_GS(m+1) from the L level to the H level. As a result, the transistor T_GS of the pixel PX of the m-th row and the (m+1)-th row is turned on, and the charges accumulated in the photoelectric converter PD of the pixels PX(λ1), PX(λ2), and PX(λ3) are transferred to the capacitor C_MEM.

When the control signals P_GS(m) and P_GS(m+1) are switched from the H level to the L level by the vertical scanning circuit 113, the transfer operation of charges from the photoelectric converter PD of the pixels PX(λ1), PX(λ2) and PX(λ3) to the capacitor C_MEM is completed. The timing at which the control signals P_GS(m) and P_GS(m+1) switch from the H level to the L level corresponds to the end timing of the first period T1_FR(n) and the start timing of the second period T2_FR(n).

Thus, the first period T1_FR(n) corresponds to a charge accumulation period (exposure period) in the photoelectric converter PD of the pixels PX(λ1), PX(λ2), and PX(λ3). In the first period T1_FR(n), the photoelectric converters PD of the pixels PX(λ1), PX(λ2), and PX(λ3) store charges of the charge amount Q1($n$). Further, since the charge of the charge amount Q1($n$) is transferred to the capacitor C_MEM, the capacitor C_MEM of the pixels PX(λ1), PX(λ2) and PX(λ3) holds the signal MEM1($n$) corresponding to the charge amount Q1($n$) as an image signal by focused visible light.

In the second period T2_FR(n), the position of the pixel array 111 in the optical axis direction is adjusted by the actuator 13 so that the image of the infrared light incident on the pixel PX is focused. At the end of the second period T2_FR(n), the vertical scanning circuit 113 switches the control signal P_OFD(m+1) from the L level to the H level. As a result, the transistor T_OFD of the pixel PX of the (m+1)-th row is turned on, and the photoelectric converters PD of the pixels PX(λ3) and PX(IR) are reset.

When the control signal P_OFD(m+1) is switched from the H level to the L level by the vertical scanning circuit 113, the reset of the photoelectric converter PD in the pixels PX(λ3) and PX(IR) is released. Thus, charge accumulation is started in the photoelectric converter PD of the pixels PX(λ3) and PX(IR). The timing at which the control signal P_OFD(m+1) switches from the H level to the L level is the end timing of the second period T2_FR(n) and the start timing of the third period T3_FR(n).

At the end of the third period T3_FR(n), the vertical scanning circuit 113 switches the control signal P_GS_IR (m+1) from the L level to the H level. As a result, the transistor T_GS of the pixel PX(IR) of the (m+1)-th row is turned on, and the charge stored in the photoelectric converter PD of the pixel PX(IR) is transferred to the capacitor C_MEM.

When the control signal P_GS_IR(m+1) is switched from the H level to the L level by the vertical scanning circuit 113, the transfer operation of charges from the photoelectric converter PD of the pixel PX(IR) to the capacitor C_MEM is completed. The timing at which the control signal P_GS_IR(m+1) switches from the H level to the L level is the end timing of the third period T3_FR(n) and the start timing of the fourth period T4_FR(n).

Thus, the third period T3_FR(n) is the charge accumulation period (exposure period) in the photoelectric converter PD of the pixel PX(IR). In the third period T3_FR(n), the charge amount Q3($n$) is accumulated in the photoelectric converter PD of the pixel PX(IR). Further, since the charge of the charge amount Q3($n$) is transferred from the photoelectric converter PD to the capacitor C_MEM, the capacitor C_MEM holds the signal MEM2($n$) corresponding to the charge amount Q3($n$) as an image signal by focused infrared light.

In the fourth period T4_FR(n), the readout operations from the first row to the X-th row, that is, the readout operations RO(1) to RO(λ) are sequentially executed. Since the charge accumulation time is made uniform for all the pixels PX and the accumulated charge is held in the capacitor C_MEM in all the pixels PX, the readout operations RO(1) to RO(λ) may be executed in any order. In FIG. 5, the readout operation RO(m) starts at the start timing of the fourth period T4_FR(n), but may be executed at any timing during the fourth period T4_FR(n).

FIG. 6 illustrates a timing diagram depicting specific operations in the readout operations RO(m) and RO(m+1) of FIG. 5. FIG. 6 illustrates control signals P_SEL(m), P_RES (m) and P_TX(m) of pixels PX(λ1) and PX(λ2), and control signals P_SEL(m+1), P_RES(m+1) and P_TX(m+1) of pixels PX(λ3) and PX(IR).

In FIG. 6, the sampling operation in the signal readout unit 114 is expressed by the same pulse waveform as that of the control signal. The period in which "sampling of the signal readout unit" is indicated at the H level corresponds to a period in which sampling is performed, and the period in which "sampling of the signal readout unit" is indicated at the L level corresponds to a period in which sampling is not performed. As described above, the signal readout unit 114 reads out a signal from the pixel PX row by row. Therefore, when a signal is read out from the pixel PX of a certain row, the H level of "sampling of the signal readout unit" indicates that the signal from the pixel PX of the row is sampled.

In the present embodiment, the readout operations RO(1) to RO(λ) from the first row to the X-th row are sequentially executed. Focusing on the (m−1)-th to (m+2)-th rows, as illustrated in FIG. 6, the readout operations RO(m−1), RO(m), RO(m+1), and RO(m+2) are executed in this order. In FIG. 6, the period for performing the readout operation RO(m) corresponds to the period T_RO(m), and the period for performing the readout operation RO(m+1) corresponds to the period T_RO(m+1). The period T_RO(m) includes a period T0_RO(m), a period T1_RO(m), and a period T2_RO (m). The period T_RO(m+1) includes a period T0_RO(m+ 1), a period T1_RO(m+1), and a period T2_RO(m+1).

First, the operation in the period T_RO(m) will be described.

At the start timing of the period T_RO(m), the vertical scanning circuit 113 switches the control signal P_SEL(m)

from the L level to the H level. As a result, the transistor T_SEL of the pixel PX of the m-th row is turned on, and the signal may be read out from the pixel PX of the m-th row to the signal readout unit 114. The vertical scanning circuit 113 maintains the control signal P_SEL(m) at the H level during the period T_RO(m).

Then, the vertical scanning circuit 113 temporarily switches the control signal P_RES(m) to the H level during the period T0_RO(m). As a result, the transistor T_RES of the pixel PX of the m-th row is turned on, and the FD node (capacitor C_FD) is reset. A signal corresponding to the reset potential of the FD node is output to the column signal line LC of the corresponding column via the transistor T_SEL.

Then, during the period T1_RO(m) after the control signal P_RES(m) has switched to the L level, the signal readout unit 114 samples the signals output to the column signal lines LC of the respective columns. The signals obtained from the pixels PX(λ1) and PX(λ2) in this manner correspond to the signals MEM1(m)_N.

Then, the vertical scanning circuit 113 temporarily switches the control signal P_TX(m) to the H level. As a result, the transistor T_TX of the pixel PX of the m-th row is turned on, and the charge held by the capacitor C_MEM is transferred to the capacitor C_FD. Thus, the FD node has a potential corresponding to the amount of charge transferred from the capacitor C_MEM. A signal corresponding to the potential of the FD node is output to the column signal line LC of the corresponding column via the transistor T_SEL.

Next, in the period T2_RO(m) after the control signal P_TX(m) has switched to the L level, the signal readout unit 114 samples the signals output to the column signal lines LC of each column. The signals obtained from the pixels PX(λ1) and PX(λ2) in this manner correspond to the signals MEM1(m)_S.

In the signal readout unit 114, CDS (Correlated Double Sampling) processing is applied to the signal MEM1(m) N and the signal MEM1(m)_S thus acquired. That is, by subtracting the signal MEM1(m) N from the signal MEM1(m)_S, the offset component caused by the circuit configuration and the characteristic variation superimposed on the signal MEM1(m)_S is removed.

In the description of FIG. 4, for simplifying descriptions, the signal MEM1(n) is acquired as an image signal by focused visible light. However, this image signal is actually obtained based on the CDS processing using the signals MEM1(m)_N and MEM1(m)_S. That is, the image signal is a signal obtained by subtracting MEM1(m)_N from MEM1(m)_S.

Next, the operation in the period T_RO(m+1) will be described.

At the start timing of the period T_RO(m+1), the vertical scanning circuit 113 switches the control signal P_SEL(m+1) from the L level to the H level. As a result, the transistor T_SEL of the pixel PX in the (m+1)-th row is turned on, and the signal may be read out from the pixel PX in the (m+1)-th row to the signal readout unit 114. The vertical scanning circuit 113 maintains the control signal P_SEL(m+1) at the H level during the period T_RO(m+1).

Then, the vertical scanning circuit 113 temporarily switches the control signal P_RES(m+1) to the H level during the period T0_RO(m+1). As a result, the transistor T_RES of the pixel PX in the (m+1)-th row is turned on, and the capacitor C_FD is reset. A signal corresponding to the reset potential of the FD node is output to the column signal line LC of the corresponding column via the transistor T_SEL.

Then, during the period T1_RO(m+1) after the control signal P_RES(m) has switched to the L level, the signal readout unit 114 samples the signals output to the column signal lines LC of each column. The signal obtained from the pixel PX(λ3) is the signal MEM1(m+1)_N, and the signal obtained from the pixel PX(IR) is the signal MEM2(m+1)_N.

Then, the vertical scanning circuit 113 temporarily switches the control signal P_TX(m+1) to the H level. As a result, the transistor T_TX of the pixel PX of the (m+1)-th row is turned on, and the charge held by the capacitor C_MEM is transferred to the capacitor C_FD. Thus, the FD node has a potential corresponding to the amount of charge transferred from the capacitor C_MEM. A signal corresponding to the potential of the FD node is output to the column signal line LC of the corresponding column via the transistor T_SEL.

Next, in the period T2_RO(m+1) after the control signal P_TX(m+1) has switched to the L level, the signal readout unit 114 samples the signals output to the column signal lines LC of each column. The signal obtained from the pixel PX(λ3) is the signal MEM1(m+1)_S, and the signal obtained from the pixel PX(IR) is the signal MEM2(m+1)_S.

In the signal readout unit 114, the CDS processing is applied to the signals MEM1(m+1)_N and MEM1(m+1) S acquired as shown above. That is, by subtracting the signal MEM1(m+1) N from the signal MEM1(m+1) S, an offset component caused by the circuit configuration and characteristic variation superimposed on the signal MEM1(m+1)_S is removed.

In the signal readout unit 114, the CDS processing is applied to the signals MEM2(m+1)_N and MEM2(m+1)_S acquired as shown above. That is, by subtracting the signal MEM2(m+1)_N from the signal MEM2(m+1)_S, an offset component caused by the circuit configuration and characteristic variation superimposed on the signal MEM2(m+1)_S is removed.

In the present embodiment, an image signal by focused visible light and infrared light may be acquired within one frame (from the start of charge accumulation in the photoelectric converter PD of all pixels PX to the completion of signal reading) by using a lens to which axial chromatic aberration correction has been applied within the range of visible light. Therefore, it is possible to achieve an imaging device capable of obtaining high-quality images of visible light and infrared light at a high speed at a lower cost than using an expensive lens whose axial chromatic aberration is corrected over a range from visible light to infrared light.

For example, since infrared light is less scattered by molecules forming the atmosphere than visible light at the time of remote moving image photographing, an image without mist and a color image may be obtained, and highly accurate remote monitoring may be performed at low cost, high speed and high image quality. Further, by utilizing the property of infrared light of high transmittance, for example, in inspection in an industrial field, visual inspection by a color image of an object to be inspected flowing through a belt conveyor and inspection of foreign substance inside the object to be inspected by an infrared image may be performed at low cost, high speed and high image quality.

Although the present embodiment shows an example in which the present invention is applied to the capture of moving images, the present invention may also be applied to the capture of still images.

As described above, according to the present embodiment, in the imaging device having a plurality of kinds of pixels having sensitivity in different wavelength bands, it is possible to acquire a high-quality image focused on the plurality of kinds of pixels at a high speed while suppressing an increase in component cost.

Second Embodiment

Figure 7:
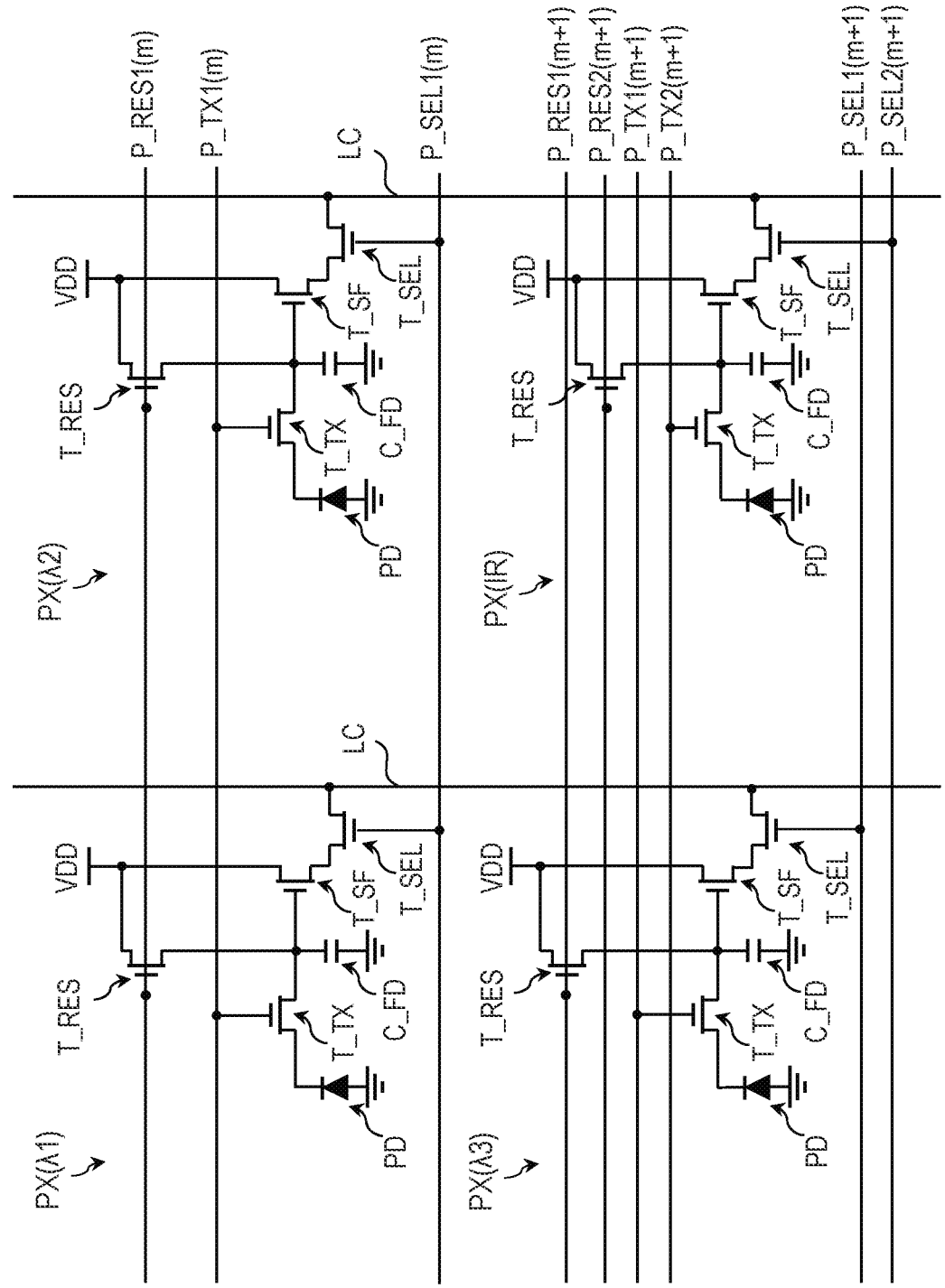
FIG. 7 is a circuit diagram illustrating a configuration example of a unit pixel block in an imaging device according to a second embodiment of the present invention.
Figure 8:
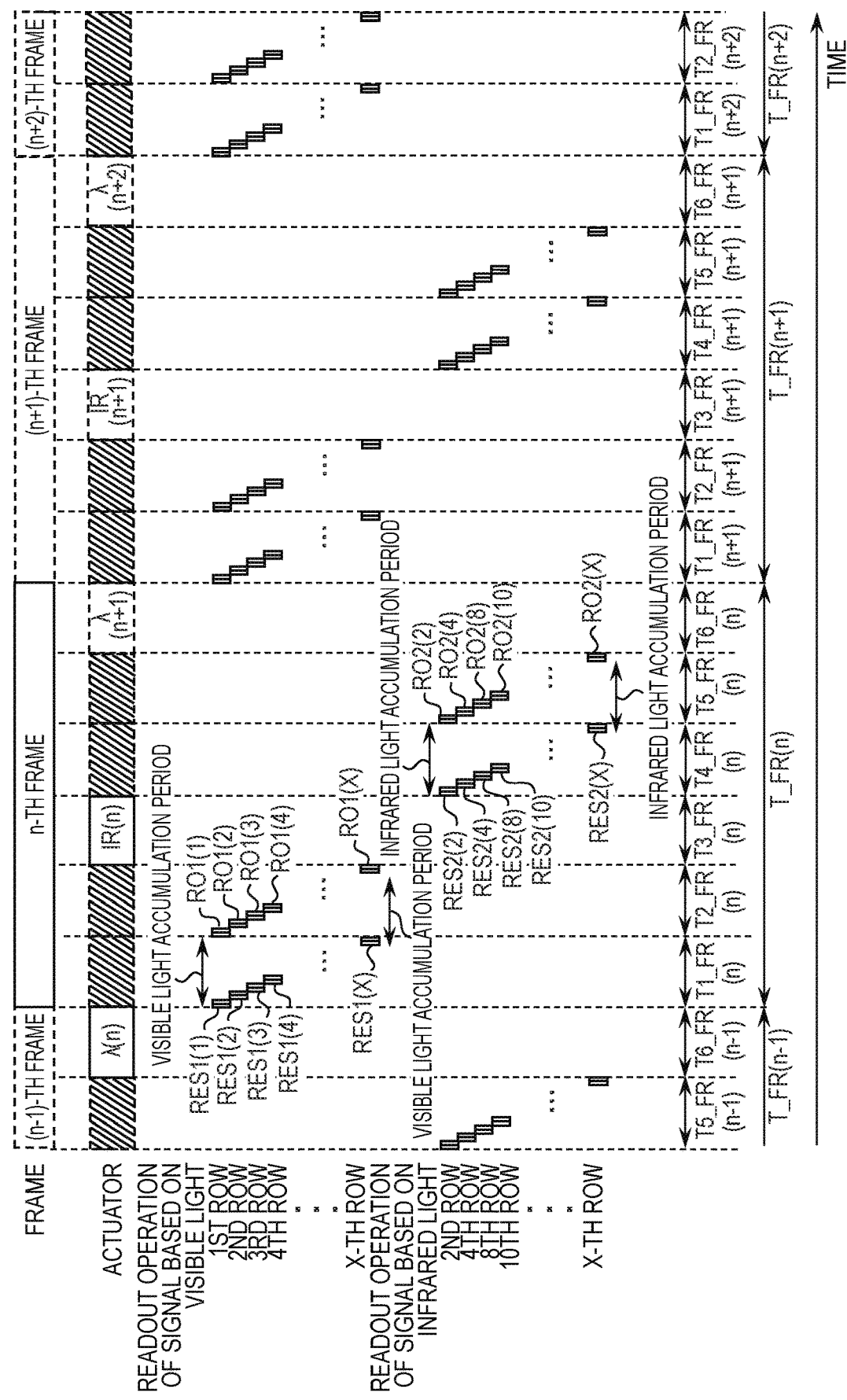
FIG. 8 is a timing diagram (part 1) illustrating an example of driving the imaging device according to the second embodiment of the present invention.
Figure 9:
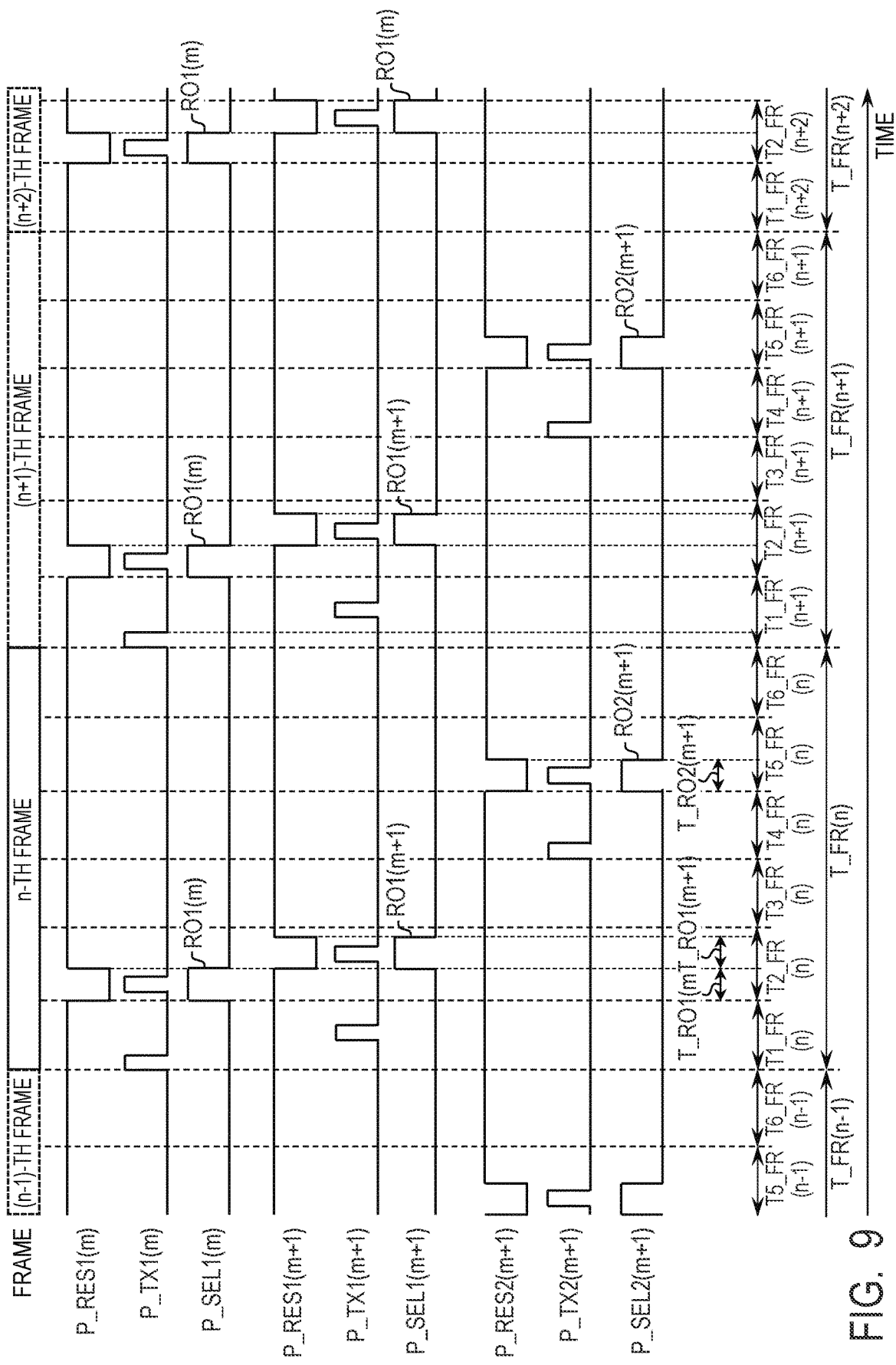
FIG. 9 is a timing diagram (part 2) illustrating an example of driving the imaging device according to the second embodiment of the present invention.
Figure 10:
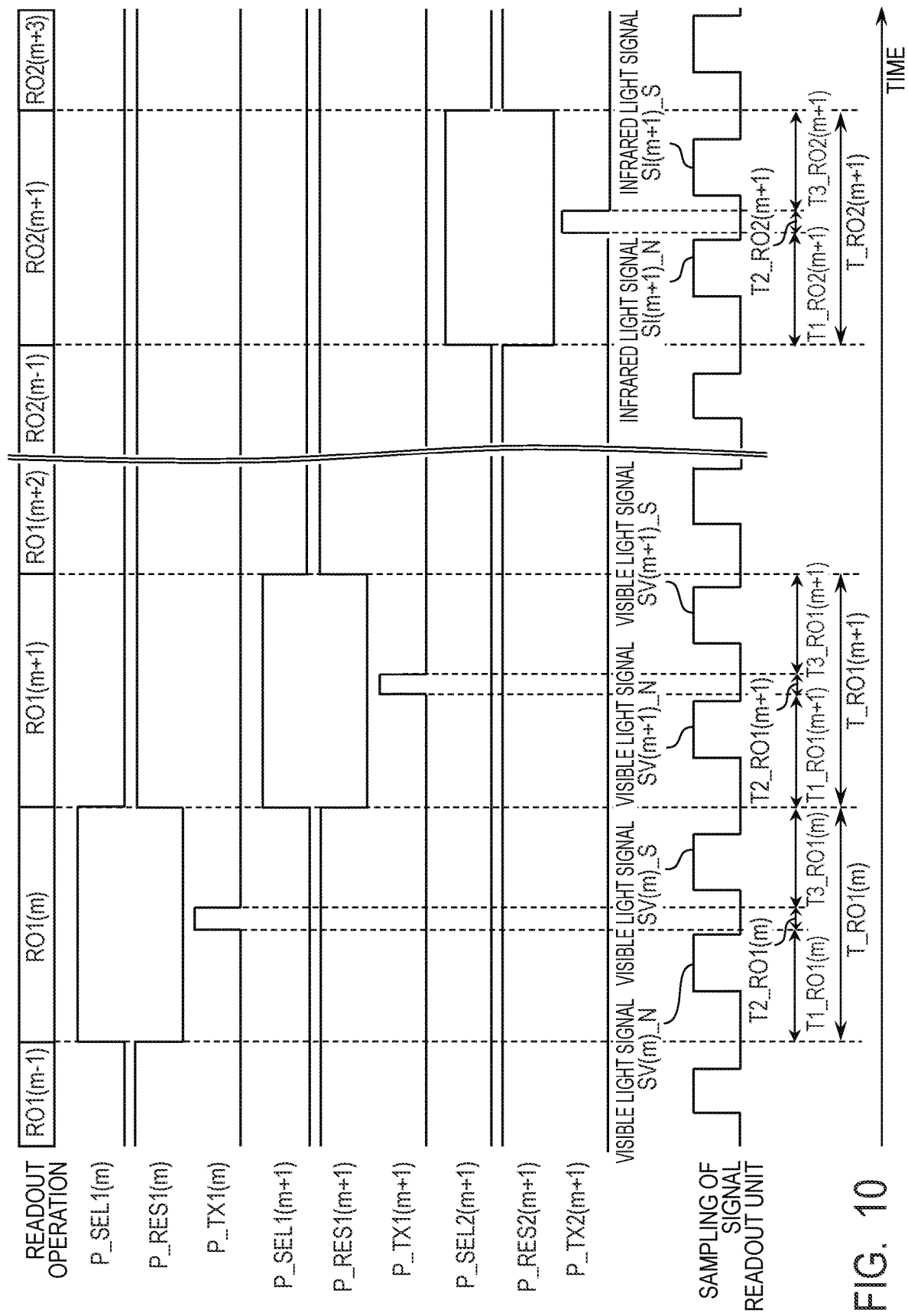
FIG. 10 is a timing diagram (part 3) illustrating an example of driving the imaging device according to the second embodiment of the present invention.

An imaging device according to a second embodiment of the present invention will be described with reference to FIG. 7 to FIG. 10. Components similar to those of the imaging device according to the first embodiment are denoted by the same reference numerals, and descriptions thereof are omitted or simplified. FIG. 7 is a circuit diagram illustrating a configuration example of a unit pixel block according to the present embodiment. FIG. 8 to FIG. 10 are timing diagrams illustrating driving examples of the imaging device according to the present embodiment.

The overall configuration of the imaging device and the configuration of the imaging unit according to the present embodiment are the same as those of the imaging device according to the first embodiment illustrated in FIG. 1 and FIG. 2. The imaging device according to the present embodiment differs from the imaging device according to the first embodiment illustrated in FIG. 3 in the configuration of a plurality of pixels PX forming the pixel array 111.

That is, in the imaging device according to the present embodiment, each of the plurality of pixels PX may be formed with the photoelectric converter PD, the transistors T_TX, T_RES, T_SF, T_SEL, and the capacitor C_FD, as illustrated in FIG. 7. The unit pixel block 1111 includes the pixels PX($\lambda$1), PX($\lambda$2), PX($\lambda$3), and PX(IR) in the same manner as in the first embodiment.

In the photoelectric converter PD, an anode is connected to a ground node, and a cathode is connected to a drain of the transistor T_TX. The source of the transistor T_TX is connected to the source of the transistor T_RES and the gate of the transistor T_SF. The capacitor C_FD is a capacitance component coupled to a connection node of the source of the transistor T_TX, the source of the transistor T_RES, and the gate of the transistor T_SF. The connection node of the source of transistor T_TX, the source of transistor T_RES, and the gate of transistor T_SF may be referred to as a floating diffusion node (hereinafter referred to as "FD node").

The source of the transistor T_SF is connected to the drain of the transistor T_SEL. The source of the transistor T_SEL is connected to the column signal line LC. The drain of the transistor T_RES and the drain of the transistor T_SF are connected to a power supply node to which the voltage VDD is supplied. Although the voltages supplied to the drain of the transistor T_RES and the drain of the transistor T_SF are referred to herein as the common voltage VDD, these voltages need not necessarily be the same.

The gate of the transistor T_RES of the pixel PX($\lambda$1) and the gate of the transistor T_RES of the pixel PX($\lambda$2) are connected to a signal line for supplying a common control signal P_RES1(*m*) to the pixels PX($\lambda$1) and PX($\lambda$2) of the m-th row. The gate of the transistor T_TX of the pixel PX($\lambda$1) and the gate of the transistor T_TX of the pixel PX($\lambda$2) are connected to a signal line for supplying a common control signal P_TX1(*m*) to the pixels PX($\lambda$1) and PX($\lambda$2) of the m-th row. The gate of the transistor T_SEL of the pixel PX($\lambda$1) and the gate of the transistor T_SEL of the pixel PX($\lambda$2) are connected to a signal line for supplying a common control signal P_SEL1(*m*) to the pixels PX($\lambda$1) and PX($\lambda$2) of the m-th row.

The gate of the transistor T_RES of the pixel PX($\lambda$3) is connected to a signal line for supplying a common control signal P_RES1(*m*+1) to the pixel PX($\lambda$3) of the (m+1)-th row. The gate of the transistor T_RES of the pixel PX(IR) is connected to a signal line for supplying a common control signal P_RES2(*m*+1) to the pixel PX(IR) of the (m+1)-th row. The gate of the transistor T_TX of the pixel PX($\lambda$3) is connected to a signal line for supplying a common control signal P_TX1(*m*+1) to the pixel PX($\lambda$3) of the (m+1)-th row. The gate of the transistor T_TX of the pixel PX(IR) is connected to a signal line for supplying a common control signal P_TX2(*m*+1) to the pixel PX(IR) of the (m+1)-th row. The gate of the transistor T_SEL of the pixel PX($\lambda$3) is connected to a signal line for supplying a common control signal P_SEL1(*m*+1) to the pixel PX($\lambda$3) of the (m+1)-th row. The gate of the transistor T_SEL of the pixel PX(IR) is connected to a signal line for supplying a common control signal P_SEL2(*m*+1) to the pixel PX(IR) of the (m+1)-th row.

The control signals P_RES1, P_RES2, P_TX1, P_TX2, P_SEL1, and P_SEL2 are generated by the vertical scanning circuit 113 on the basis of a synchronizing signal outputted from the controller 112 and supplied to the pixel PX in a row unit. Each transistor forming the pixel PX is controlled to be conductive (ON) or non-conductive (OFF) in response to a corresponding control signal. If each transistor is composed of an n-channel MOS transistor, it is turned on when the corresponding control signal is at the H level and turned off when the corresponding control signal is at the L level.

The photoelectric converter PD converts the incident light into an amount of electric charge corresponding to the quantity of light (photoelectric conversion), and accumulates the generated electric charge. The transistor T_TX, also referred to as a transfer transistor, has a function as a transfer unit for transferring the charge held by the photoelectric converter PD to the capacitor C_FD when turned on. The capacitor C_FD has a function as a charge holding unit for holding charges transferred from the photoelectric converter PD. The capacitor C_FD also has a function as a charge voltage conversion unit for setting the potential of the FD node to a potential corresponding to its capacitance value and the amount of charge to be held.

The transistor T_SF has a configuration in which the voltage VDD is supplied to the drain and a bias current is supplied to the source from a current source (not illustrated) via the transistor T_SEL, and forms an amplifier unit (source follower circuit) having a gate as an input node. Thus, the transistor T_SF outputs a signal based on the potential of the FD node to the column signal line LC via the transistor T_SEL.

The transistor T_RES, which is also referred to as a reset transistor, has a function as a reset unit for resetting the FD node to a voltage corresponding to the voltage VDD when turned on. The transistor T_SEL, also referred to as a select transistor, has a function as a select unit for selecting whether or not to output a signal corresponding to the source voltage of the transistor T_SF as a pixel signal to the column signal line LC.

The imaging device according to the present embodiment is characterized in that the sensor performs rolling shutter driving in which the photoelectric conversion by the photoelectric converter PD is performed at different timings for each row.

Next, the method of driving the imaging device according to the present embodiment will be described with reference to FIG. 8 to FIG. 10. FIG. 8 to FIG. 10 illustrate timing diagrams depicting examples of driving the imaging device according to the present embodiment.

FIG. 8 schematically illustrates the operation of the imaging device in the case of capturing moving images. FIG. 8 illustrates temporal changes in "frame", "actuator", "readout operation of signal based on visible light", and "readout operation of signal based on infrared light".

In FIG. 8, the "frame" is a period (period T_FR) for acquiring image data (frame data) for one still image generated based on pixel signals of a plurality of pixels PX forming the pixel array 111. FIG. 8 illustrates the operation of four consecutive frames from (n−1)-th frame to (n+2)-th frame. In FIG. 8, the period for acquiring frame data FR(n−1) of (n−1)-th frame corresponds to a period T_FR (n−1). The period for acquiring the frame data FR(n) of n-th frame corresponds to a period T_FR(n). The period for acquiring the frame data FR(n+1) of (n+1)-th frame corresponds to a period T_FR(n+1). The period for acquiring the frame data FR(n+2) of (n+2)-th frame corresponds to a period T_FR(n+2). Each of the periods T_FR includes a first period T1_FR, a second period T2_FR, a third period T3_FR, a fourth period T4_FR, a fifth period T5_FR, and a sixth period T6_FR.

In FIG. 8, the "actuator" indicates the driving state of the actuator 13. In FIG. 8, IR(n) and IR(n+1) indicate a state in which the pixel array 111 is moved in the optical axis direction by the actuator 13 in order to focus an image of infrared light. Further, $\lambda(n)$, $\lambda(n+1)$ and $\lambda(n+2)$ indicate states in which the pixel array 111 is moved in the optical axis direction by the actuator 13 in order to focus an image of visible light. In FIG. 8, the shaded period indicates a period during which the actuator 13 is not driven. In this shaded period, the actuator 13 maintains the state set in the immediately preceding period.

In FIG. 8, the "readout operation of signal based on visible light" and "readout operation of signal based on infrared light" visually indicate that signals based on visible light and signals based on infrared light are sequentially read out for each row unit. The "readout operation of signal based on visible light" indicates readout operations from pixels PX($\lambda$1), PX($\lambda$2) and PX($\lambda$3), and the "readout operation of signal based on infrared light" indicates a readout operation from pixel PX(IR). In FIG. 8, it is considered that the pixel array 111 is composed of X rows from the first row to the X-th row (X is an integer of 2 or more). It is also considered that the readout operation of the signal based on the visible light is performed in the order of the first row, the second row, the third row, . . . , and the X row, and the readout operation of the signal based on the infrared light is performed in the order of the second row, the fourth row, the eighth row, the tenth row, . . . , and the X row.

The reset operations RES1(*m*) and RES2(*m*) illustrated in FIG. 8 represent the reset operation of the photoelectric converter PD in the pixel PX of the m-th row (m is an integer of 1 to X). The readout operations RO1(*m*) and RO2(*m*) illustrated in FIG. 8 represent the readout operation of the signal from the pixel PX of the m-th row (m is an integer of 1 to X). The length of the period from the start of the reset operation RES1(*m*) to the start of the readout operation RO1(*m*) corresponds to the charge accumulation period (visible light accumulation period) in the photoelectric converter PD of the pixels PX($\lambda$1), PX($\lambda$2) and PX($\lambda$3). The length of the period from the start of the reset operation RES2(*m*) to the start of the readout operation RO2(*m*) corresponds to the charge accumulation period (infrared light accumulation period) in the photoelectric converter PD of the pixel PX(IR).

Since the operations in each frame are basically the same, description will be given here focusing on the readout operation of the frame data FR(n). In the sixth period T6_FR(n−1) of the previous frame ((n−1)-th frame), the actuator 13 is driven (actuator: $\lambda(n)$), and the pixel array 111 is moved in the optical axis direction so that the image of visible light incident on the pixel PX is focused.

The period T_FR(n) for reading out the frame data FR(n) includes, as described above, the first period T1_FR(n), the second period T2_FR(n), the third period T3_FR(n), the fourth period T4_FR(n), the fifth period T5_FR(n), and the sixth period T6_FR(n).

In the first period T1_FR(n), accumulation of electric charges of the pixels PX($\lambda$1), PX($\lambda$2) and PX($\lambda$3) in the photoelectric converter PD is started in a state where the actuator 13 is not driven (actuator: inactive). Specifically, the reset operation RES1 of the photoelectric converter PD in the pixels PX($\lambda$1), PX($\lambda$2) and PX($\lambda$3) is sequentially executed for each row from the start to the end of the first period T1_FR(n). For example, the reset operation RES1(1) of the first row is started after the start of the first period T1_FR(n), and the reset operation RES1 of each row is sequentially executed so that the reset operation RES1(X) of the X row ends before the end of the first period T1_FR(n). In other words, the timing for starting charge accumulation in the photoelectric converter PD is different in the pixels PX of each row. The charge stored in the photoelectric converter PD is held in the photoelectric converter PD until the readout operation RO1 of the row to which the pixel PX belongs is executed.

In the following second period T2_FR(n), the readout operation RO1 of signals from the pixels PX($\lambda$1), PX($\lambda$2), and PX($\lambda$3) is sequentially performed for each row unit in a state where the actuator 13 is not driven (actuator: inactive). Specifically, during the second period T2_FR(n), the readout operations from the readout operation RO1(1) of the first row to the readout operation RO1($\lambda$) of the X-th row are sequentially performed for each row unit. The timing at which charge accumulation in the photoelectric converter PD ends is defined by the timing at which charge is transferred from the photoelectric converter PD to the FD node. The readout operation RO1 is started after charge transfer from the photoelectric converter PD to the FD node. The readout operation RO1 is executed while the charge transferred from the photoelectric converter PD is held in the capacitor C_FD.

In the following third period T3_FR(n), the actuator 13 is driven (actuator: IR(n)), and the pixel array 111 is moved in the optical axis direction so that the image of the infrared light incident on the pixel PX(IR) is focused. Although the details will be described later, in the third period T3_FR(n), no charge is accumulated in the photoelectric converter PD. Specifically, the charge generated in the photoelectric converter PD during the third period T3_FR(n) is discharged through the transistors T_TX and T_RES.

Since the amount of movement by the actuator 13 varies depending on the type of the lens and the focal length, the actuator driving period (third period T3_FR(n)) varies depending on the condition of the lens. Since the axial chromatic aberration of a general lens increases in proportion to the focal length, the longer the focal length, the greater the amount of movement, that is, the longer the actuator driving period (third period T3_FR(n)).

In the following fourth period T4_FR(n), in a state where the actuator 13 is not driven (actuator: inactive), accumulation of electric charges in the photoelectric converter PD of the pixel PX(IR) is started. Specifically, during the period from the start to the end of the fourth period T4_FR(n), the reset operation RES2 of the photoelectric converter PD in the pixel PX(IR) is sequentially executed for each row. For example, the reset operation RES2(2) of the second row is started after the start of the fourth period T4_FR(n), and the reset operation RES2 of each row is sequentially executed so that the reset operation RES2(λ) of the X row is finished before the end of the fourth period T4_FR(n). In other words, the timing for starting the charge accumulation in the photoelectric converter PD is different in the pixels PX of each row. The charge stored in the photoelectric converter PD is held in the photoelectric converter PD until the readout operation RO2 of the row to which the pixel PX belongs is executed.

In the following fifth period T5_FR(n), the readout operation RO2 of signals from the pixel PX(IR) is sequentially performed for each row unit in a state where the actuator 13 is not driven (actuator: inactive). Specifically, during the fifth period T5_FR(n), the readout operations from the readout operation RO2(2) of the second row to the readout operation RO2(X) of the X-th row are sequentially performed for each row unit. The timing at which the charge accumulation in the photoelectric converter PD ends is defined by the timing at which charge is transferred from the photoelectric converter PD to the FD node. The readout operation RO2 is started after charge transfer from the photoelectric converter PD to the FD node. The readout operation RO2 is executed while the charge transferred from the photoelectric converter PD is held in the capacitor C_FD.

In the following sixth period T6_FR(n), the actuator 13 is driven (actuator: λ(n+1)), and the pixel array 111 is moved in the optical axis direction so that images of visible light incident on the pixels PX(λ1), PX(λ2), and PX(λ3) are focused.

The processor 12 may acquire an image signal based on the visible light and the infrared light focused as described above for one frame. The acquired image signal is stored in the image information storing unit 14 as image information.

FIG. 9 and FIG. 10 illustrate waveforms of control signals supplied from the vertical scanning circuit 113 to the pixels PX of the pixel array 111 when the operation of FIG. 8 is performed. FIG. 9 and FIG. 10 illustrate only the control signals supplied to the pixels PX in the m-th row and the (m+1)-th row for simplification of the description, but the same applies to the control signals supplied to the pixels PX in other rows.

FIG. 9 illustrates control signals P_RES1(m), P_TX1(m) and P_SEL1(m) of pixels PX(λ1) and PX(λ2), and control signals P_RES1(m+1), P_TX1(m+1) and P_SEL1(m+1) of pixels PX(λ3). FIG. 9 illustrates control signals P_RES2 (m+1), P_TX2(m+1), and P_SEL2(m+1) of pixels PX(IR).

The control signals P_SEL1(m), P_SEL1(m+1), and P_SEL2(m+1) correspond to the readout operation in FIG. 5. That is, the period in which the control signals P_SEL1(m), P_SEL1(m+1), and P_SEL2(m+1) are indicated at the H level corresponds to a period in which the readout operations RO1(m), RO1(m+1), and RO2(m+1) are performed. The period in which the control signals P_SEL1(m), P_SEL1 (m+1), and P_SEL2(m+1) are indicated at the L level corresponds to a period in which reading is not performed.

In the sixth period T6_FR(n−1) of the (n−1)-th frame, the control signals P_RES1(m), P_RES1(m+1) and P_RES2(m+1) are switched to the H level by the vertical scanning circuit 113. As a result, the pixels PX(λ1) and PX(λ2) of the m-th row and the transistors T_RES of the pixels PX(λ3) and PX(IR) of the (m+1)-th row are turned on, and the capacitors C_FD of these pixels PX are in a reset state.

In the sixth period T6_FR(n−1) of the (n−1)-th frame, the control signals P_SEL1(m), P_SEL1(m+1), and P_SEL2(m+1) are switched to the L level by the vertical scanning circuit 113. As a result, the pixels PX(λ1) and PX(λ2) of the m-th row and the transistors T_SEL of the pixels PX(λ3) and PX(IR) of the (m+1)-th row are turned off, and the signals of these pixels PX are not read out to the column signal line LC.

In the first period T1_FR(n) of the following n-th frame, the vertical scanning circuit 113 switches the control signal P_TX1(m) from the L level to the H level. Thus, the transistors T_TX of the pixels PX(λ1) and PX(λ2) in the m-th row are turned on, and the photoelectric converters PD of the pixels PX(λ1) and PX(λ2) are reset via the transistors T_RES and T_TX. When the control signal P_TX1(m) is switched from the H level to the L level by the vertical scanning circuit 113, the reset of the photoelectric converter PD in the pixels PX(λ1) and PX(λ2) is released. Thus, the charge accumulation is started in the photoelectric converters PD of the pixels PX(λ1) and PX(λ2).

After the control signal P_TX1(m) is switched from the H level to the L level, the control signal P_TX1(m+1) is switched from the L level to the H level. As a result, the transistor T_TX of the pixel PX(λ3) of the (m+1)-th row is turned on, and the photoelectric converter PD of the pixel PX(λ3) is reset via the transistors T_RES and T_TX. When the control signal P_TX1(m+1) is switched from the H level to the L level by the vertical scanning circuit 113, the reset of the photoelectric converter PD in the pixel PX(λ3) is released. Thus, the charge accumulation is started in the photoelectric converter PD of the pixel PX(λ3).

Thus, during the first period T1_FR(n), the charge accumulation in the photoelectric converter PD of the pixels PX(λ1), PX(λ2) or PX(λ3) is started sequentially from the first row to the X-th row.

The following second period T2_FR(n) includes X periods T_RO1(1) to T_RO1(λ) (both not illustrated) which are sequentially executed. In each of these periods, the signals from the pixels PX(λ1), PX(λ2), and PX(λ3) of the corresponding rows are read out.

During the period T_RO1(m) of the second period T2_FR (n), the vertical scanning circuit 113 switches the control signal P_RES1(m) to the L level and the control signal P_SEL1(m) to the H level. Further, although the details will be described later, during the period T_RO1(m), the control signal P_TX1(m) is temporarily switched to the H level by the vertical scanning circuit 113. Thus, from the pixels PX(λ1) and PX(λ2) of the m-th row, an N signal corresponding to the reset potential of the FD node and an S signal corresponding to the amount of charge transferred from the photoelectric converter PD are read out (readout operation RO1(m)).

During the period T_RO1(m+1) of the second period T2_FR(n), the vertical scanning circuit 113 switches the control signal P_RES1(m+1) to the L level and the control signal P_SEL1(m+1) to the H level. Further, although the details will be described later, during the period T_RO1(m+ 1), the control signal P_TX1(m+1) is temporarily switched to the H level by the vertical scanning circuit 113. Thus, from the pixel PX(λ3) of the (m+1)-th row, an N signal corresponding to the reset potential of the FD node and an S signal corresponding to the amount of charge transferred from the photoelectric converter PD are read out (readout operation RO1(m+1)).

Thus, during the second period T2_FR(n), the N signals and the S signals from the pixels PX(λ1), PX(λ2) or PX(λ3) are sequentially read out from the first row to the X row (readout operations RO1(1) to RO1(X)). Although the readout operations RO1(1) to RO1(X) are executed in the order of row numbers, the readout operations RO1(1) to RO1(X) may be executed in any order.

In the following third period T3_FR(n), the control signals P_RES1($m$), P_RES1($m$+1) and P_RES2($m$+1) are continuously maintained at the H level from the second period T2_FR(n) by the vertical scanning circuit 113. As a result, the pixels PX($\lambda$1) and PX($\lambda$2) of the m-th row and the transistors T_RES of the pixels PX($\lambda$3) and PX(IR) of the (m+1)-th row are turned on, and the capacitors C_FD of these pixels PX are in a reset state.

However, in the third period T3_FR(n), the control signals P_TX1($m$), P_TX1($m$+1), and P_TX2($m$+1) are switched to the L level by the vertical scanning circuit 113. As a result, the pixels PX($\lambda$1) and PX($\lambda$2) in the m-th row and the pixels PX($\lambda$3) and transistor T_TX in the PX(IR) in the (m+1)-th row are turned off, and the photoelectric converter PD of these pixels PX is not reset.

In the third period T3_FR(n), the control signals P_SEL1($m$), P_SEL1($m$+1), and P_SEL2($m$+1) are switched to the L level by the vertical scanning circuit 113. As a result, the pixels PX($\lambda$1) and PX($\lambda$2) of the m-th row and the transistors T_SEL of the pixels PX($\lambda$3) and PX(IR) of the (m+1)-th row are turned off, and the signals of these pixels PX are not read out to the column signal line LC.

In the following fourth period T4_FR(n), the vertical scanning circuit 113 switches the control signal P_TX2($m$+1) from the L level to the H level. As a result, the transistor T_TX of the pixel PX(IR) of the (m+1)-th row is turned on, and the photoelectric converter PD of the pixel PX(IR) is reset via the transistors T_RES and T_TX. When the control signal P_TX2($m$+1) is switched from the H level to the L level by the vertical scanning circuit 113, the reset of the photoelectric converter PD in the pixel PX(IR) is released. Thus, the charge accumulation is started in the photoelectric converter PD of the pixel PX(IR) of the (m+1)-th row.

Similarly, during the fourth period T4_FR(n), the charge accumulation in the photoelectric converter PD of the pixel PX(IR) is started sequentially from the second row to the X-th row.

The following fifth period T5_FR(n) includes (X/2) periods T_RO2(2) to T_RO1($\lambda$) (not illustrated) which are sequentially executed. In each of these periods, a signal is read out from the pixel PX(IR) of the corresponding row.

During the period T_RO2($m$+1) of the fifth period T5_FR(n), the vertical scanning circuit 113 switches the control signal P_RES2($m$+1) to the L level and the control signal P_SEL2($m$+1) to the H level. Further, although the details will be described later, during the period T_RO2($m$+1), the control signal P_TX2($m$+1) is temporarily switched to the H level by the vertical scanning circuit 113. Thus, from the pixel PX(IR) of the (m+1)-th row, an N signal corresponding to the reset potential of the FD node and an S signal corresponding to the amount of charge transferred from the photoelectric converter PD are read out (readout operation RO2($m$+1)).

Similarly, during the fifth period T5_FR(n), the N signal and the S signal from the pixel PX(IR) are sequentially read out (readout operations RO2(2) to RO1(X)) from the second row to the X row. Although the readout operations RO2(2) to RO2(X) are executed in the order of row numbers, the readout operations RO2(2) to RO2(X) may be executed in any order.

In the following sixth period T6_FR(n), the control signals P_RES1($m$), P_RES1($m$+1) and P_RES2($m$+1) are continuously maintained at the H level from the fifth period T5_FR(n) by the vertical scanning circuit 113. As a result, the pixels PX($\lambda$1) and PX($\lambda$2) of the m-th row and the transistors T_RES of the pixels PX($\lambda$3) and PX(IR) of the (m+1)-th row are turned on, and the capacitors C_FD of these pixels PX are in a reset state.

However, in the sixth period T6_FR(n), the control signals P_TX1($m$), P_TX1($m$+1), and P_TX2($m$+1) are switched to the L level by the vertical scanning circuit 113. As a result, the pixels PX($\lambda$1) and PX($\lambda$2) in the m-th row and the pixels PX($\lambda$3) and transistor T_TX in the PX(IR) in the (m+1)-th row are turned off, and the photoelectric converter PD of these pixels PX is not reset.

In the sixth period T6_FR(n), the control signals P_SEL1($m$), P_SEL1($m$+1), and P_SEL2($m$+1) are switched to the L level by the vertical scanning circuit 113. As a result, the pixels PX($\lambda$1) and PX($\lambda$2) of the m-th row and the transistors T_SEL of the pixels PX($\lambda$3) and PX(IR) of the (m+1)-th row are turned off, and the signals of these pixels PX are not read out to the column signal line LC.

FIG. 10 is a timing diagram illustrating specific operations in the readout operations RO1($m$), RO1($m$+1), and RO2($m$+1) of FIG. 9. FIG. 10 illustrates control signals P_SEL1($m$), P_RES1($m$) and P_TX1($m$) of pixels PX($\lambda$1) and PX($\lambda$2), and control signals P_SEL1($m$+1), P_RES1($m$+1) and P_TX1($m$+1) of pixels PX($\lambda$3). FIG. 10 illustrates the control signals P_SEL2($m$+1), P_RES2($m$+1), and P_TX2($m$+1) of pixels PX(IR).

In FIG. 10, the sampling operation in the signal readout unit 114 is expressed by the same pulse waveform as that of the control signal. A period indicating "sampling of a signal readout unit" at the H level corresponds to a period for sampling, and a period indicating "sampling of a signal readout unit" at the L level corresponds to a period for not sampling. As described above, the signal readout unit 114 reads out a signal from the pixel PX row by row. Therefore, when a signal is read out from the pixel PX of a certain row, the H level of "sampling of the signal readout unit" indicates that the signal from the pixel PX of the row is sampled.

In the present embodiment, the readout operations RO1(1) to RO1(X) from the first row to the X-th row and the readout operations RO2(2) to RO2(X) from the second row to the X-th row are sequentially executed. Focusing only the m-th row and the (m+1)-th row, as illustrated in FIG. 10, the readout operations RO1($m$), RO1($m$+1), and RO2($m$+1) are executed in this order. In FIG. 10, the period for performing the readout operation RO1($m$) corresponds to the period T_RO1($m$), and the period for performing the readout operation RO1($m$+1) corresponds to the period T_RO1($m$+1). The period during which the readout operation RO2($m$+1) is performed corresponds to the period T_RO2($m$+1). The period T_RO1($m$) includes a period T1_RO1($m$), a period T2_RO1($m$), and a period T3_RO1($m$). The period T_RO1($m$+1) includes a period T1_RO1($m$+1), a period T2_RO1($m$+1), and a period T3_RO1($m$+1). The period T_RO2($m$+1) includes a period T1_RO2($m$+1), a period T2_RO2($m$+1), and a period T3_RO2($m$+1).

First, the operation in the period T_RO1($m$) will be described.

In the period before the period T_RO1($m$) (period T_RO1($m$−1)), the control signal P_RES1($m$) is switched to the H level by the vertical scanning circuit 113. As a result, the transistors T_RES of the pixels PX($\lambda$1) and PX($\lambda$2) in the m-th row are turned on, and the FD node (capacitor C_FD) is reset.

At the start timing of the period T_RO1($m$), the vertical scanning circuit 113 switches the control signal P_SEL1($m$) from the L level to the H level. As a result, the transistor T_SEL of the pixels PX(λ1) and PX(λ2) of the m-th row is turned on, and the signal from the pixels PX(λ1) and PX(λ2) of the m-th row to the signal readout unit 114 may be read out. The vertical scanning circuit 113 maintains the control signal P_SEL1(*m*) at the H level during the period T_RO1 (*m*).

At the start timing of the period T_RO1(*m*), the vertical scanning circuit 113 switches the control signal P_RES1(*m*) from the H level to the L level. As a result, the transistors T_RES of the pixels PX(λ1) and PX(λ2) in the m-th row are turned off, and the reset state of the FD node (capacitor C_FD) is released. A signal corresponding to the reset potential of the FD node is output to the column signal line LC of the corresponding column via the transistor T_SEL.

Next, after the control signal P_RES1(*m*) is shifted to the L level, the signal readout unit 114 samples the signal output to the column signal line LC of each column. The signals obtained from the pixels PX(λ1) and PX(λ2) in this manner correspond to the visible light signals SV(m)_N.

After the completion of sampling of the visible light signal SV(m)_N, the vertical scanning circuit 113 temporarily switches the control signal P_TX1(*m*) to the H level. As a result, the transistors T_TX of the pixels PX(λ1) and PX(λ2) in the m-th row are turned on, and the charges held by the photoelectric converter PD are transferred to the capacitor C_FD. Thus, the FD node has a potential corresponding to the amount of charge transferred from the photoelectric converter PD. A signal corresponding to the potential of the FD node is output to the column signal line LC of the corresponding column via the transistor T_SEL. The timing at which the control signal P_TX1(*m*) is switched from the L level to the H level corresponds to the start timing of the period T2_RO1(*m*). The timing at which the control signal P_TX1(*m*) is switched from the H level to the L level corresponds to the timing of the end of the period T2_RO1(*m*) and the timing of the start of the period T3_RO1(*m*).

Next, in the period T3_RO1(*m*) after the control signal P_TX1(*m*) has switched to the L level, the signal readout unit 114 samples the signals output to the column signal lines LC of each column. The signals obtained from the pixels PX(λ1) and PX(λ2) in this manner correspond to the visible light signals SV(m)_S.

In the signal readout unit 114, the CDS processing is applied to the signals SV(m)_N and SV(m)_S acquired as described above. That is, by subtracting the signal SV(m)_N from the signal SV(m)_S, the offset component caused by the circuit configuration and the characteristic variation superimposed on the signal SV(m)_S is removed.

Next, the operation in the period T_RO1(*m*+1) will be described.

In the period T_RO1(*m*), the control signal P_RES1(*m*+1) is switched to the H level by the vertical scanning circuit 113. As a result, the transistor T_RES of the pixel PX(λ3) of the (m+1)-th row is turned on, and the FD node (capacitor C_FD) is reset.

At the start timing of the period T_RO1(*m*+1), the vertical scanning circuit 113 switches the control signal P_SEL1(*m*) from the H level to the L level and switches the control signal P_SEL1(*m*+1) from the L level to the H level. As a result, the transistor T_SEL of the pixel PX of the m-th row is turned off, the transistor T_SEL of the pixel PX(λ3) of the (m+1)-th row is turned on, and the signal may be read out from the pixel PX(λ3) of the (m+1)-th row to the signal readout unit 114. The vertical scanning circuit 113 maintains the control signal P_SEL1(*m*+1) at the H level during the period T_RO1(*m*+1).

At the start timing of the period T_RO1(*m*+1), the vertical scanning circuit 113 switches the control signal P_RES1(*m*) from the L level to the H level and switches the control signal P_RES1(*m*+1) from the H level to the L level. As a result, the transistor T_RES of the pixel PX(λ3) of the (m+1)-th row is turned off, and the reset state of the FD node (capacitor C_FD) is released. A signal corresponding to the reset potential of the FD node is output to the column signal line LC of the corresponding column via the transistor T_SEL.

Next, after the control signal P_RES1(*m*+1) is switched to the L level, the signal readout unit 114 samples the signals output to the column signal lines LC of each column. The signal obtained from the pixel PX(λ3) in this manner is the visible light signal SV(m+1)_N.

After the completion of sampling of the visible light signal SV(m+1)_N, the vertical scanning circuit 113 temporarily switches the control signal P_TX1(*m*+1) to the H level. As a result, the transistor T_TX of the pixel PX(λ3) of the (m+1)-th row is turned on, and the charge held by the photoelectric converter PD is transferred to the capacitor C_FD. Thus, the FD node has a potential corresponding to the amount of charge transferred from the photoelectric converter PD. A signal corresponding to the potential of the FD node is output to the column signal line LC of the corresponding column via the transistor T_SEL. The timing at which the control signal P_TX1(*m*+1) is switched from the Llevel to the H level corresponds to the start timing of the period T2_RO1(*m*+1). The timing at which the control signal P_TX1(*m*+1) is switched from the H level to the L level corresponds to the timing of the end of the period T2_RO1(*m*+1) and the timing of the start of the period T3_RO1(*m*+1).

Next, in the period T3_RO1(*m*+1) after the control signal P_TX1(*m*+1) has switched to the L level, the signal readout unit 114 samples the signals output to the column signal lines LC of the respective columns. The signal obtained from the pixel PX(λ3) in this manner is the visible light signal SV(m+1)_S.

In the signal readout unit 114, the CDS processing is applied to the signals SV(m+1)_N and SV(m+1)_S acquired as shown above. That is, by subtracting the signal SV(m+1)_N from the signal SV(m+1)_S, the offset component caused by the circuit configuration and characteristic variation superimposed on the signal SV(m+1)_S is removed.

Next, the operation in the period T_RO2(*m*+1) will be described.

In the period before the period T_RO2(*m*+1) (period T_RO2(*m*−1)), the control signal P_RES2(*m*+1) is switched to the H level by the vertical scanning circuit 113. As a result, the transistor T_RES of the pixel PX(IR) of the (m+1)-th row is turned on, and the FD node (capacitor C_FD) is reset.

At the start timing of the period T_RO2(*m*+1), the vertical scanning circuit 113 switches the control signal P_SEL2(*m*+1) from the L level to the H level. As a result, the transistor T_SEL of the pixel PX(IR) of the (m+1)-th row is turned on, and the signal from the pixel PX(IR) of the (m+1)-th row to the signal readout unit 114 may be read out. The vertical scanning circuit 113 maintains the control signal P_SEL2(*m*+1) at the H level during the period T_RO2(*m*+1).

At the start timing of the period T_RO2(*m*+1), the vertical scanning circuit 113 switches the control signal P_RES2(*m*+1) from the H level to the L level. As a result, the transistor T_RES of the pixel PX(IR) of the (m+1)-th row is turned off, and the reset state of the FD node (capacitor C_FD) is released. A signal corresponding to the reset potential of the FD node is output to the column signal line LC of the corresponding column via the transistor T_SEL.

Then, after the control signal P_RES2(m+1) is switched to the L level, the signal readout unit 114 samples the signals output to the column signal lines LC of the respective columns. The signal obtained from the pixel PX(IR) in this manner is an infrared light signal SI(m+1)_N.

After the completion of sampling of the infrared light signal SI(m+1)_N, the vertical scanning circuit 113 temporarily switches the control signal P_TX2(m+1) to the H level. As a result, the transistor T_TX of the pixel PX(IR) of the (m+1)-th row is turned on, and the charge held by the photoelectric converter PD is transferred to the capacitor C_FD. Thus, the FD node has a potential corresponding to the amount of charge transferred from the photoelectric converter PD. A signal corresponding to the potential of the FD node is output to the column signal line LC of the corresponding column via the transistor T_SEL. The timing at which the control signal P_TX2(m+1) is switched from the L level to the H level corresponds to the start timing of the period T2_RO2(m+1). The timing at which the control signal P_TX2(m+1) is switched from the H level to the L level corresponds to the timing at which the period T2_RO2(m+1) ends and the timing at which the period T3_RO2(m+1) starts.

Next, in the period T3_RO2(m+1) after the control signal P_TX2(m+1) has switched to the L level, the signal readout unit 114 samples the signal output to the column signal line LC of each column. The signal obtained from the pixel PX(IR) in this manner is an infrared light signal SI(m+1)_S.

In the signal readout unit 114, the CDS processing is applied to the signals SI(m+1)_N and SI(m+1)_S acquired as shown above. That is, by subtracting the signal SI(m+1)_N from the signal SI(m+1)_S, the offset component caused by the circuit configuration and characteristic variation superimposed on the signal SI(m+1)_S is removed.

In the present embodiment, the image signal by focused visible light and infrared light may be acquired within one frame (from the start of charge accumulation in the photoelectric converter PD of all pixels PX to the completion of signal reading) by using a lens to which axial chromatic aberration correction has been applied within the range of visible light. Therefore, it is possible to achieve an imaging device capable of obtaining high-quality images of visible light and infrared light at a high speed at a lower cost than using an expensive lens whose axial chromatic aberration is corrected over a range from visible light to infrared light.

Further, since the number of transistors forming the pixel PX of the present embodiment is smaller than the number of transistors forming the pixel PX of the first embodiment, noise and dark current generated in the pixel PX may be suppressed more than in the first embodiment. Further, since the number of transistors is small, the light receiving area of the photoelectric converter PD may be widened to improve sensitivity, and the capacitance of the capacitor C_FD may be increased to improve the amount of saturated charge of the pixel.

As described above, according to the present embodiment, in the imaging device having a plurality of kinds of pixels having sensitivity in different wavelength bands, it is possible to acquire a high-quality image focused on the plurality of kinds of pixels at a high speed while suppressing an increase in component cost.

Third Embodiment

Figure 11:
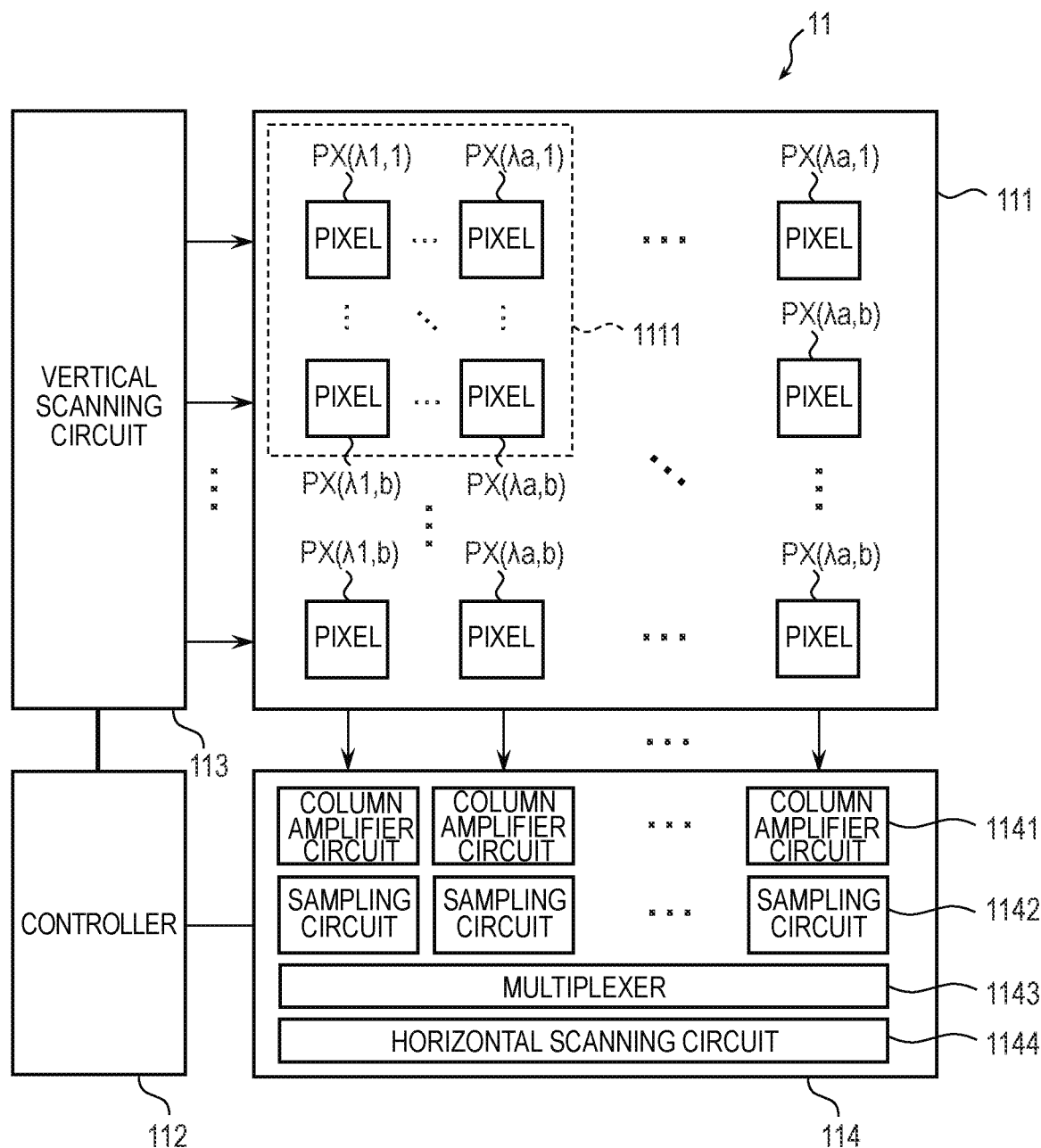
FIG. 11 is a block diagram illustrating a configuration example of an imaging unit in an imaging device according to a third embodiment of the present invention.
Figure 12:
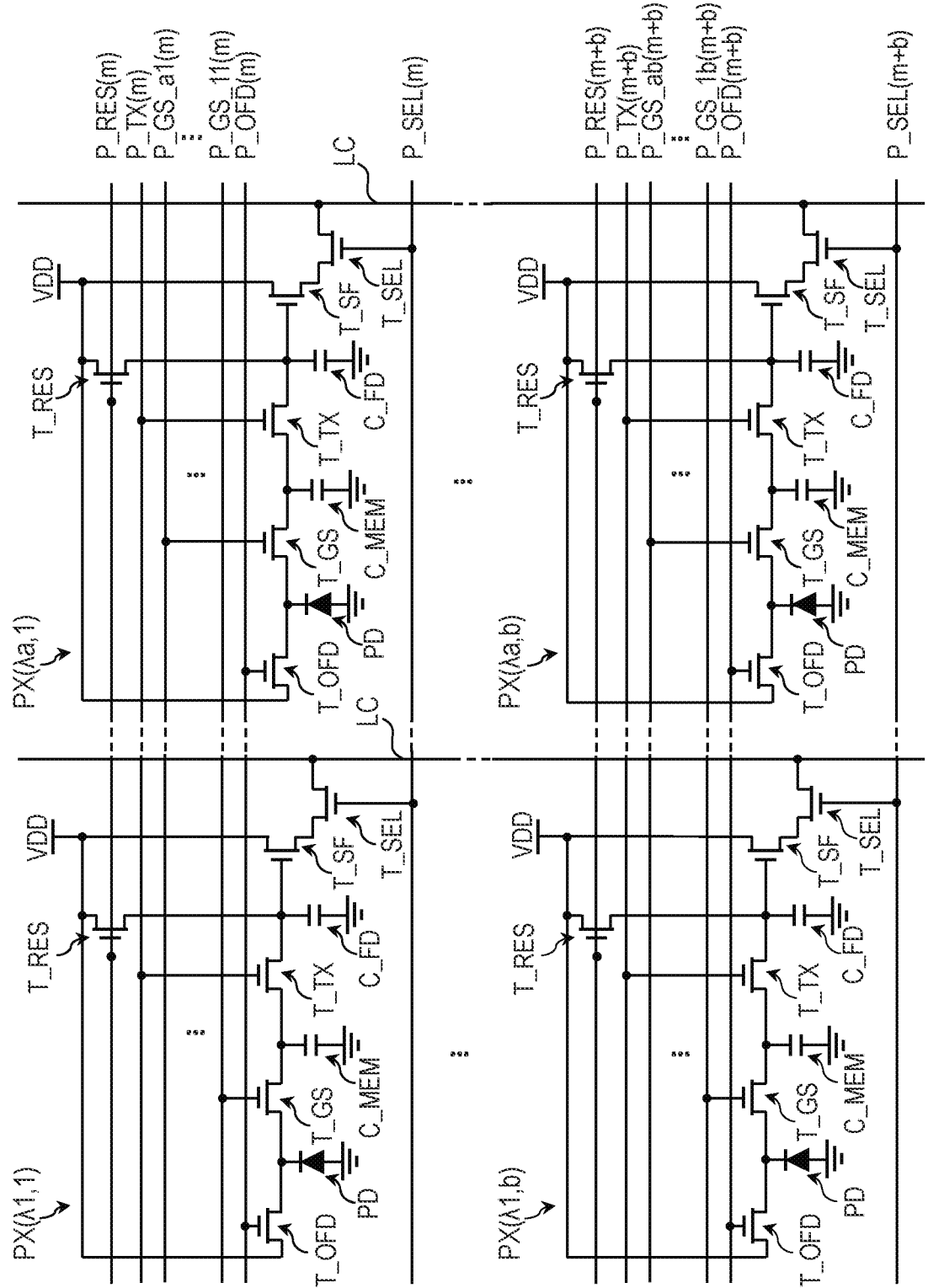
FIG. 12 is a circuit diagram illustrating a configuration example of a unit pixel block in the imaging device according to the third embodiment of the present invention.
Figure 13:
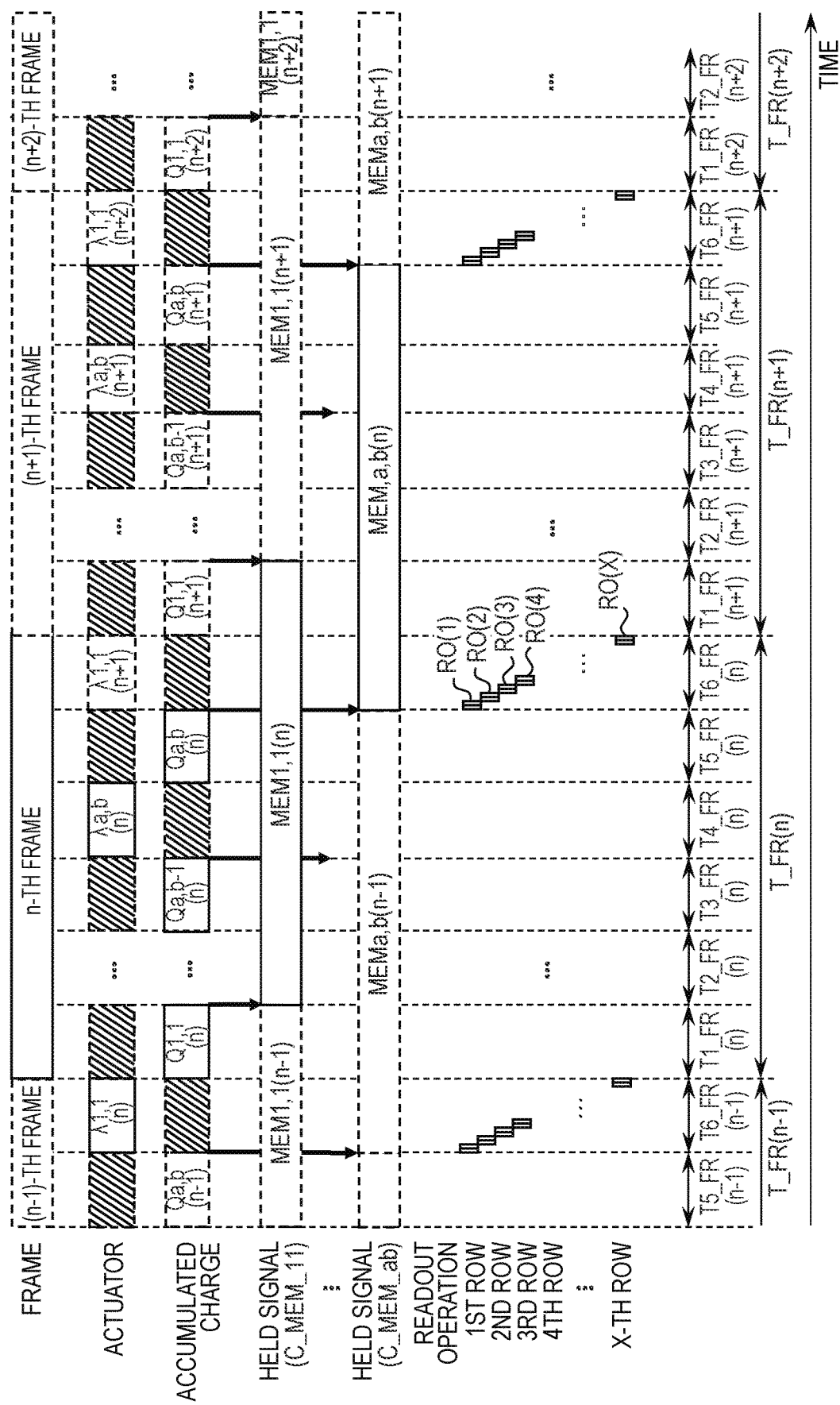
FIG. 13 is a timing diagram (part 1) illustrating an example of driving the imaging device according to the third embodiment of the present invention.
Figure 14:
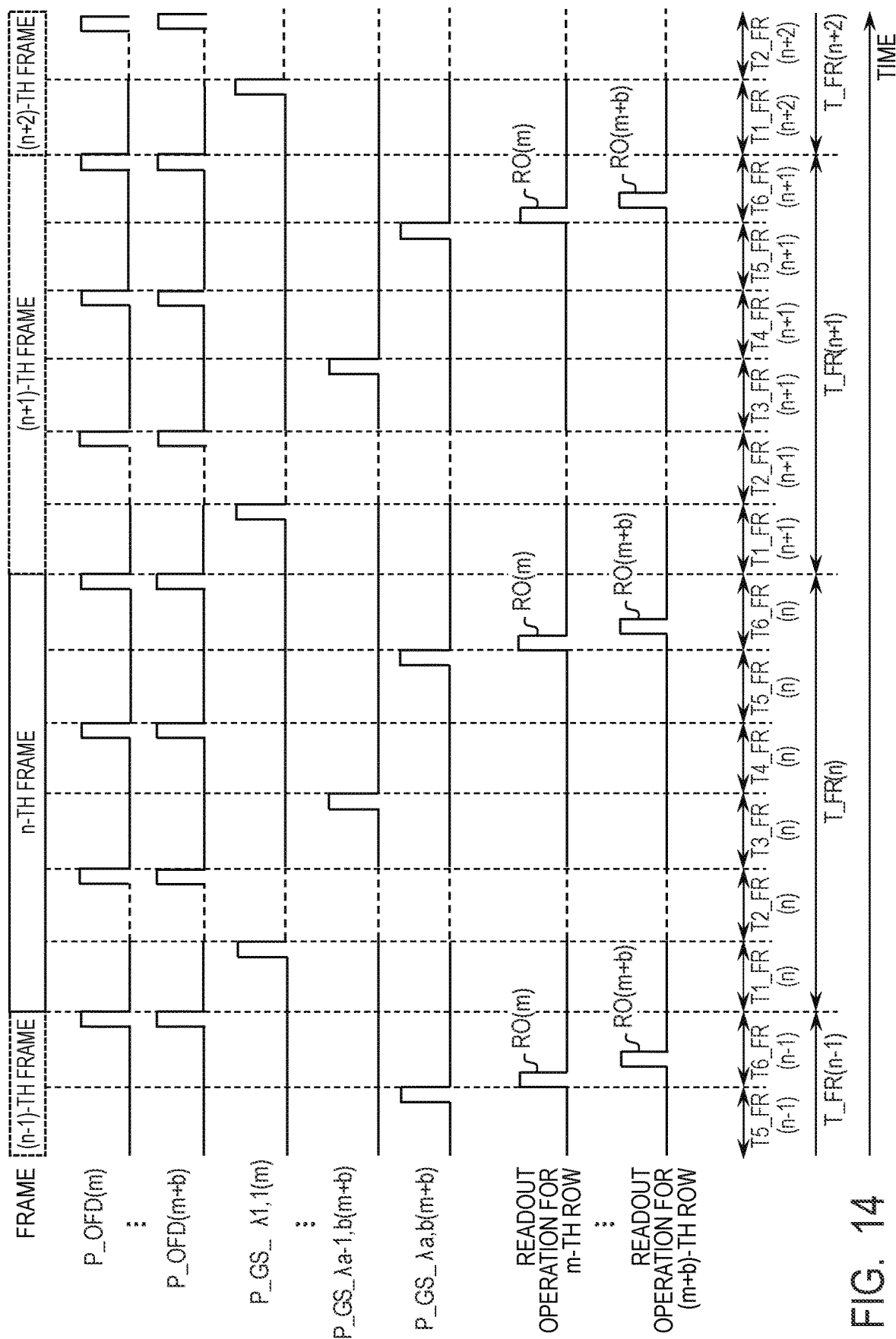
FIG. 14 is a timing diagram (part 2) illustrating an example of driving the imaging device according to the third embodiment of the present invention.
Figure 15:
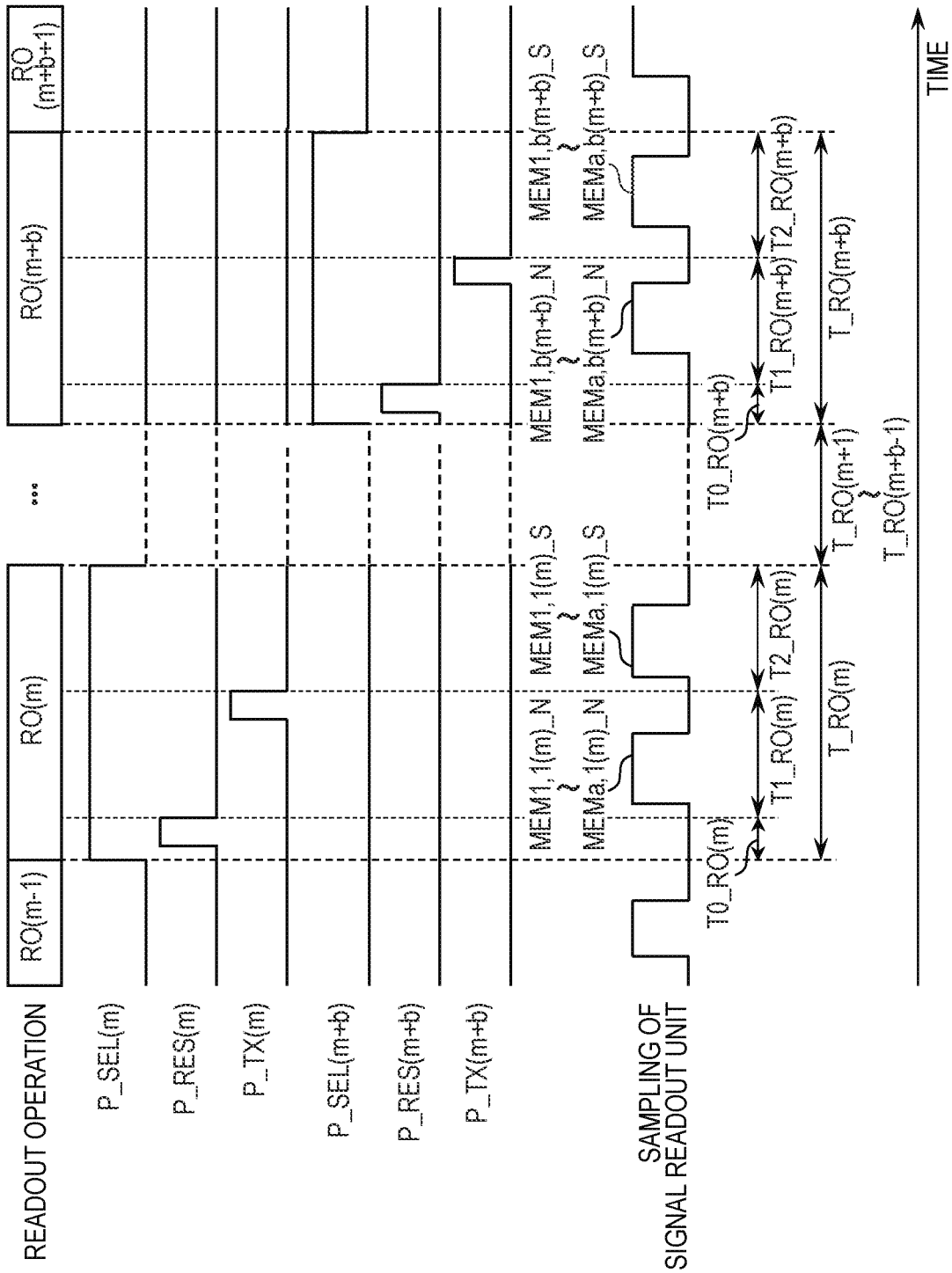
FIG. 15 is a timing diagram (part 3) illustrating an example of driving the imaging device according to the third embodiment of the present invention.

An imaging device according to a third embodiment of the present invention will be described with reference to FIG. 11 to FIG. 15. Components similar to those of the imaging device according to the first and second embodiments are denoted by the same reference numerals, and descriptions thereof are omitted or simplified. FIG. 11 is a block diagram illustrating an example of the configuration of the imaging unit in the imaging device according to the present embodiment. FIG. 12 is a circuit diagram illustrating a configuration example of a unit pixel block according to the present embodiment. FIG. 13 to FIG. 15 are timing diagrams illustrating driving examples of the imaging device according to the present embodiment.

The overall configuration of the imaging device according to the present embodiment is the same as that of the imaging device according to the first embodiment illustrated in FIG. 1. In the imaging device according to the present embodiment, the configuration of the unit pixel block 1111 forming the pixel array 111 is different from that of the imaging device according to the first embodiment illustrated in FIG. 2.

That is, in the imaging device according to the present embodiment, the unit pixel block 1111 is formed with a pixel array of a columns×b rows as illustrated in FIG. 11 (a and b are integers of 1 or more). The unit pixel blocks 1111 are repeatedly arranged in the row and column directions to form a pixel array 111. FIG. 11 illustrates pixels PX(λ1, 1), PX(λa, 1), PX(λ1, b), and PX(λa, b) located at four corners out of a×b pixels PX forming the unit pixel block 1111. Here, when the pixels are represented by a symbol of PX(λx, y), the variables x and y correspond to coordinates (columns, rows) in the unit pixel block 1111.

Each of the pixels PX forming the unit pixel block 1111 has sensitivity in an arbitrary wavelength band. That is, the unit pixel block 1111 may include at most a×b kinds of pixels PX having different spectral sensitivity characteristics from each other. The wavelength band in which the pixel PX has sensitivity may be visible light or non-visible light. One unit pixel block 1111 may include a pixel PX sensitive to visible light and a pixel PX sensitive to non-visible light. Two or more pixels PX included in one unit pixel block 1111 may have sensitivity in the same wavelength band.

In the imaging device according to the present embodiment, the lens 16 may be a lens whose axial chromatic aberration of light is corrected or a lens whose axial chromatic aberration of light is not corrected. For example, the lens 16 may be a lens whose axial chromatic aberration caused by the wavelength difference of red, green and blue is corrected, or a lens which is not corrected.

FIG. 12 illustrates a circuit diagram depicting a configuration example of the unit pixel block 1111. Here, an example of the configuration of the unit pixel block 1111 will be described referring to the pixels PX(λ1, 1) and PX(λa, 1) arranged in the m-th row, and the pixels PX(λ1, b) and PX(λa, b) arranged in the (m+b)-th row. These four pixels PX are arranged at four corners of the unit pixel block 1111.

Similar to the first embodiment, each of the pixels PX forming the unit pixel block 1111 may include the photoelectric converter PD, the transistors T_GS, T_TX, T_OFD, T_RES, T_SF, T_SEL, and the capacitors C_MEM, C_FD. Since the connection relationship between these elements is same as that in the first embodiment, descriptions thereof will be omitted.

The gates of the transistors T_RES of the pixels PX(λ1, 1) to PX(λa, 1) arranged in the m-th row are connected to signal lines for supplying the common control signal P_RES (m) to the pixels PX(λ1, 1) to PX(λa, 1) in the m-th row. The gate of each transistor T_TX of the pixels PX(λ1, 1) to PX(λa, 1) arranged in the m-th row is connected to a signal line for supplying a common control signal P_TX(m) to the pixels PX(λ1, 1) to PX(λa, 1) in the m-th row. The gate of each transistor T_OFD of the pixels PX(λ1, 1) to PX(λa, 1) arranged in the m-th row is connected to a signal line for supplying the common control signal P_OFD(m) to the pixels PX(λ1, 1) to PX(λa, 1) in the m-th row. The gate of each transistor T_SEL of the pixels PX(λ1, 1) to PX(λa, 1) arranged in the m-th row is connected to a signal line for supplying a common control signal P_SEL(m) to the pixels PX(λ1, 1) to PX(λa, 1) in the m-th row.

The gates of the transistors T_GS of the pixels PX(λ1, 1) to PX(λa, 1) arranged in the m-th row are connected to signal lines for supplying the individual control signals P_GS_11(*m*) to P_GS_a1(*m*) to the pixels PX(λ1, 1) to PX(λa, 1). That is, the gate of the transistor T_GS of the pixel PX(λ1, 1) arranged in the m-th row is connected to a signal line for supplying the control signal P_GS_11(*m*). The gate of the transistor T_GS of the pixel PX(λa, 1) arranged in the m-th row is connected to a signal line for supplying the control signal P_GS_a1(*m*). The same configuration is applied to the pixels PX(λ2, 1) to PX(λa–1, 1).

The gates of the transistors T_RES of the pixels PX(λ1, b) to PX(λa, b) arranged in the (m+b)-th row are connected to signal lines for supplying a common control signal P_RES(m+b) to the pixels PX(λ1, b) to PX(λa, b). The gates of the transistors T_TX of the pixels PX(λ1, b) to PX(λa, b) arranged in the (m+b)-th row are connected to signal lines for supplying a common control signal P_TX(m+b) to the pixels PX(λ1, b) to PX(λa, b). The gate of each transistor T_OFD of the pixels PX(λ1, b) to PX(λa, b) arranged in the (m+b)-th row is connected to a signal line for supplying a common control signal P_OFD(m+b) to the pixels PX(λ1, b) to PX(λa, b). The gate of each transistor T_SEL of the pixels PX(λ1, b) to PX(λa, b) arranged in the (m+b)-th row is connected to a signal line for supplying a common control signal P_SEL(m+b) to the pixels PX(λ1, b) to PX(λa, b).

The gates of the transistors T_GS of the pixels PX(λ1, b) to PX(λa, b) of the (m+b)-th row are connected to signal lines for supplying the individual control signals P_GS_11 (*m*) to P_GS_a1(*m*) to the pixels PX(λ1, b) to PX(λa, b). That is, the gate of the transistor T_GS of the pixel PX(λ1, b) arranged in the (m+b)-th row is connected to a signal line for supplying the control signal P_GS_1*b*(m+b). The gate of the transistor T_GS of the pixel PX(λa, b) arranged in the (m+b)-th row is connected to a signal line for supplying the control signal P_GS_ab(m+b). The same configuration is applied to the pixels PX(λ2, b) to PX(λa–1, b).

The same configuration is applied to the lines (m+1) to (m+b–1).

The control signals P_RES, P_TX, P_GS_11 to P_GS_ab, P_OFD and P_SEL are generated by the vertical scanning circuit 113 based on the synchronization signal outputted from the controller 112 and supplied to the pixel PX in a row unit. Each transistor forming the pixel PX is controlled to be conductive (ON) or non-conductive (OFF) in response to a corresponding control signal. If each transistor is composed of an n-channel MOS transistor, a conductive state (ON) is obtained when a corresponding control signal is at a high level (H level), and a non-conductive state (OFF) is obtained when a corresponding control signal is at a low level (L level).

Next, the method of driving the imaging device according to the present embodiment will be described with reference to FIG. 13 to FIG. 15. FIG. 13 to FIG. 15 illustrate timing diagrams depicting driving examples of the imaging device according to the present embodiment.

FIG. 13 schematically illustrates the operation of the imaging device in the case of capturing moving images. FIG. 13 illustrates temporal changes of "frame", "actuator", "accumulated charge", "held signal (C_MEM_11)", "held signal (C_MEM_ab)", and "readout operation".

In FIG. 13, the "frame" indicates a period (period T_FR) for acquiring image data (frame data) corresponding to one still image generated based on pixel signals of a plurality of pixels PX forming the pixel array 111. FIG. 13 illustrates the operation of four consecutive frames from (n–1)-th frame to (n+2)-th frame. In FIG. 13, the period for acquiring frame data FR(n–1) of (n–1)-th frame corresponds to a period T_FR(n–1). The period for acquiring the frame data FR(n) of n-th frame corresponds to the period T_FR(n). The period for acquiring the frame data FR(n+1) of (n+1)-th frame corresponds to the period T_FR(n+1). The period for acquiring the frame data FR(n+2) of (n+2)-th frame corresponds to the period T_FR(n+2). In the present embodiment, each of the periods T_FR is conveniently divided into a first period T1_FR, a second period T2_FR, a third period T3_FR, a fourth period T4_FR, a fifth period T5_FR, and a sixth period T6_FR.

In FIG. 13, the "actuator" indicates a driving state of the actuator 13. The actuator 13 is configured to control the position of the pixel array 111 in the optical axis direction in order to correct the axial chromatic aberration of the lens, and may take three driving states, for example, focusing an image of visible light, focusing an image of infrared light, and inactive. In FIG. 4, "λ1", "1(n)", "λ1", "1(n+1)", "λ1", and "1(n+2)" indicate a state in which the pixel PX(λ1, 1) moves the pixel array 111 in the optical axis direction by the actuator 13 in order to focus an image of light in the wavelength band having sensitivity. In addition, "λa", "b(n)", "λa", and "b(n+1)" indicate a state in which the pixel array 111 is moved in the optical axis direction by the actuator 13 in order to focus an image of light in the wavelength band in which the pixel PX(λa, b) has sensitivity. In FIG. 13, the shaded period indicates a period during which the actuator 13 is not driven. In this shaded period, the actuator 13 maintains the state set in the immediately preceding period.

In FIG. 13, the "accumulated charge" indicates a charge retention period in the photoelectric converter PD. Here, the amount of charge accumulated in the photoelectric converter PD during the fifth period T5_FR(n–1) of the (n–1)-th frame is represented by Qa,b(n–1), and the amount of charge accumulated in the photoelectric converter PD during the first period T1_FR(n) of the n-th frame is represented by Q1,1(*n*). Further, the amount of charge accumulated in the photoelectric converter PD during the third period T3_FR(n) of the n-frame is represented by Qa,b–1(n), and the amount of charge accumulated in the photoelectric converter PD during the fifth period T5_FR(n) of the n-frame is represented by Qa,b(n). Further, the amount of charge accumulated in the photoelectric converter PD during the first period T1_FR(n+1) of the(n+1)-th frame is represented by Q1,1 (*n*+1), and the amount of charge accumulated in the photoelectric converter PD during the third period T3_FR(n+1) of the (n+1)-th frame is represented by Qa,b–1(n+1). The amount of charge accumulated in the photoelectric converter PD during the fifth period T5_FR(n+1) of the (n+1)-th frame is represented by Qa,b(n+1), and the amount of charge accumulated in the photoelectric converter PD during the first period T1_FR(n+2) of the (n+2)-th frame is represented by Q1,1(*n*+2). In FIG. 4, the shaded period corresponds to a period during which the overflow drain (OFD) operation is performed, and charge is not accumulated in the photoelectric converter PD.

In FIG. 13, the "held signal (C_MEM_11)" indicates the signals MEM1,1 held by the capacitor C_MEM of the pixel PX($\lambda$1, 1). The "held signal (C_MEM_ab)" indicates signals MEMa,b held in the capacitor C_MEM of the pixel PX($\lambda$a, b). The levels of the signals MEM1,1, MEMa,b held in the capacitor C_MEM are voltage values corresponding to the amount of charge transferred from the photoelectric converter PD to the capacitor C_MEM by the transistor T_GS. Although only the held signal (C_MEM_11) and the held signal (C_MEM_ab) are illustrated in FIG. 13, the held signal (C_MEM_xy) is present for each of the pixels PX forming the unit pixel block 1111.

In FIG. 13, the "readout operation" visually indicates that signals from a plurality of pixels PX are sequentially read for each row unit. In FIG. 13, it is considered that the pixel array 111 is composed of X rows from the first row to the X-th row (X is an integer of 2 or more), and the readout operation is performed in the order of the first row, the second row, the third row, . . . , and the X-th row. The readout operation RO(m) illustrated in FIG. 13 represents the readout operation of the signal from the pixel PX of the m-th row (m is an integer of 1 to X).

Since the operations in each frame are basically the same, description will be given here focusing on the readout operation of the frame data FR(n). In the sixth period T6_FR(n−1) of the previous frame ((n−1)-th frame), the actuator 13 is driven (actuator: $\lambda$1,1(n)), and the pixel array 111 is moved in the optical axis direction so that the image of light incident on the pixel PX($\lambda$1, 1) is focused.

The period T_FR(n) for reading the frame data FR(n) includes, as described above, the first period T1_FR(n), the second period T2_FR(n), the third period T3_FR(n), the fourth period T4_FR(n), the fifth period T5_FR(n), and the sixth period T6_FR(n).

In the first period T1_FR(n), charge of the pixel PX($\lambda$1, 1) is accumulated in the photoelectric converter PD in a state where the actuator 13 is not driven (actuator: inactive). The charge amount Q1,1(n) accumulated in the photoelectric converter PD during the first period T1_FR(n) is based on the amount of visible light focused on the pixel array 111 and incident on the pixel PX($\lambda$1, 1).

After the lapse of the first period T1_FR(n), the charge held by the photoelectric converter PD is transferred to the capacitor C_MEM. Thus, the capacitor C_MEM of the pixel PX($\lambda$1, 1) holds signals MEM1,1(n) corresponding to the capacitance value and the charge amount Q1,1(n). The capacitor C_MEM of the pixel PX($\lambda$1, 1) holds signals MEM1,1(n) over a period from a second period T2_FR(n) of n-th frame to a first period T1_FR(n+1) of (n+1)-th frame.

In the following second period T2_FR(n), charge accumulation and charge transfer in each of the pixels PX($\lambda$a, b−2) from the pixel PX($\lambda$1, 2) are executed in the same manner as in the sixth period T6_FR(n−1) of the (n−1)-th frame and the first period T1_FR(n) of the n-th frame.

In the following third period T3_FR(n), charge of the pixel PX($\lambda$a, b−1) is accumulated in the photoelectric converter PD in a state where the actuator 13 is not driven (actuator: inactive). The charge amount Qa,b−1(n) accumulated in the photoelectric converter PD during the third period T3_FR(n) is based on the amount of visible light focused on the pixel array 111 and incident on the pixel PX($\lambda$a, b−1).

After the lapse of the third period T3_FR(n), the charge held by the photoelectric converter PD is transferred to the capacitor C_MEM. As a result, signals MEMa,b−1(n) corresponding to the capacitance value and the charge amounts Qa,b−1(n) are held in the capacitor C_MEM of the pixel PX($\lambda$a, b−1). The capacitor C_MEM of the pixel PX($\lambda$a, b−1) holds the signals MEMa,b−1(n) over a period from a fourth period T4_FR(n) of n-th frame to a third period T3_FR(n+1) of (n+1)-th frame.

In the following fourth period T4_FR(n), the actuator 13 is driven (Actuator: $\lambda$a,b(n)) to move the pixel array 111 in the optical axis direction so that the image of light incident on the pixel PX($\lambda$a, b) is focused. Although the details will be described later, charge is not accumulated in the photoelectric converter PD during the fourth period T4_FR(n). Specifically, the charge generated in the photoelectric converter PD during the fourth period T4_FR(n) is discharged by the transistor T_OFD (OFD operation).

In the following fifth period T5_FR(n), charge of the pixel PX($\lambda$a, b) is accumulated in the photoelectric converter PD in a state where the actuator 13 is not driven (actuator: inactive). The charge amount Qa,b(n) accumulated in the photoelectric converter PD during the fifth period T5_FR(n) is based on the amount of infrared light focused on the pixel array 111 and incident on the pixel PX($\lambda$a, b).

After the lapse of the fifth period T5_FR(n), the charge held by the photoelectric converter PD is transferred to the capacitor C_MEM. As a result, signals MEMa,b(n) corresponding to the capacitance value and the charge amounts Qa,b(n) are held in the capacitor C_MEM of the pixel PX($\lambda$a, b). The capacitor C_MEM holds the signals MEMa,b(n) over a period from the sixth period T6_FR(n) of n-th frame to the fifth period T5_FR(n+1) of (n+1)-th frame.

In the following sixth period T6_FR(n), the actuator 13 is driven (actuator: $\lambda$1, 1(n+1)), and the pixel array 111 is moved in the optical axis direction so that the image of visible light incident on the pixel PX($\lambda$1, 1) is focused. Further, although the details will be described later, in the sixth period T6_FR(n), the readout operation of the signals from the plurality of pixels PX is sequentially performed for each row unit. Specifically, the readout operations from the readout operation RO(1) of the first row to the readout operation RO(X) of the X row are sequentially performed for each row unit. This readout operation is performed during the sixth period T6_FR(n) in which the signals MEMa,b(n) from the signals MEM1,1(n) are held in the capacitor C_MEM.

Based on the signals MEMa,b(n) from the signals MEM1,1(n) read out as described above, the processor 12 may acquire an image signal based on the light focused to each of the plurality of pixels PX for one frame. The acquired image signal is stored in the image information storing unit 14 as image information.

FIG. 14 and FIG. 15 illustrate waveforms of control signals supplied from the vertical scanning circuit 113 to the pixels PX of the pixel array 111 when the operation of FIG. 13 is performed. FIG. 14 and FIG. 15 illustrate only the control signals supplied to the pixels PX in the m-th row and the (m+b)-th row for simplification of the description, but the same applies to the control signals supplied to the pixels PX in other rows.

FIG. 14 illustrates control signals P_OFD(m), P_GS_$\lambda$1, 1(m) of pixels PX($\lambda$1, 1) to PX($\lambda$a, 1) in the m-th row. FIG. 14 illustrates control signals P_OFD(m+b), P_GS_$\lambda$a−1,b (m+b), and P_GS_$\lambda$a,b(m+b) for pixels PX($\lambda$1, b) to PX($\lambda$a, b) in the (m+b)-th row. In FIG. 14, the readout operations RO(m) and RO(m+b) are represented by the same pulse waveform as that of the control signal. A period in which the readout operations RO(m) and RO(m+b) are indicated at the H level corresponds to a period for reading out, and a period in which the readout operations RO(m) and RO(m+b) are indicated at the L level corresponds to a period for not reading out.

In the sixth period T6_FR(n−1) of the (n−1)-th frame, the position of the pixel array 111 in the optical axis direction is adjusted by the actuator 13 so that the image of light incident on the pixel PX(λ1, 1) is focused. At the end of the sixth period T6_FR(n−1) of the (n−1)-th frame, the vertical scanning circuit 113 switches the control signals P_OFD(m) to P_OFD(m+b) from the L level to the H level. As a result, the transistor T_OFD of the pixel PX of the m-th row to the (m+b)-th row is turned on, and the photoelectric converter PD of the pixels PX(λ1, 1) to PX(λa, b) is reset.

The control signals P_OFD(m) to P_OFD(m+b) are switched from the H level to the L level by the vertical scanning circuit 113, whereby the reset of the photoelectric converter PD in the pixels PX(λ1, 1) to PX(λa, b) is released. Thus, the charge accumulation is started in the photoelectric converter PD of the pixels PX(λ1, 1) to PX(λa, b). The timing at which the control signals P_OFD(m) to P_OFD(m+b) switch from the H level to the L level corresponds to the end timing of the sixth period T6_FR(n−1) of the (n−1)-th frame and the start timing of the first period T1_FR(n) of the n-th frame.

At the end of the first period T1_FR(n), the vertical scanning circuit 113 switches the control signals P_GS_λ1, 1(m) from the L level to the H level. As a result, the transistor T_GS of the pixel PX(λ1, 1) of the m-th row is turned on, and the charge stored in the photoelectric converter PD of the pixel PX(λ1, 1) of the m-th row is transferred to the capacitor C_MEM.

When the control signals P_GS_λ1,1(m) are switched from the H level to the L level by the vertical scanning circuit 113, the transfer operation of charges from the photoelectric converter PD to the capacitor C_MEM is completed. The timing at which the control signals P_GS_λ1,1(m) switch from the H level to the L level corresponds to the end timing of the first period T1_FR(n) and the start timing of the second period T2_FR(n).

Thus, the first period T1_FR(n) corresponds to the charge accumulation period (exposure period) in the photoelectric converter PD of the pixel PX(λ1, 1) in the m-th row. In the first period T1_FR(n), charges of charge amounts Q1,1($n$) are accumulated in the photoelectric converter PD of the pixel PX(λ1, 1) of the m-th row. Further, since charges of the charge amounts Q1,1($n$) are transferred, signals MEM1,1($n$) corresponding to the charge amounts Q1,1($n$) are held in the capacitor C_MEM as image signals based on light focused on the pixel PX(λ1, 1).

In the following second period T2_FR(n), the adjustment, the charge accumulation, and the charge transfer of the actuator 13 in the pixel PX(λ1, 2) are executed in the same manner as in the sixth period T6_FR(n−1) of the (n−1)-th frame and the first period T1_FR(n) of the n-th frame. Further, similarly to the pixels PX(λ1, 2), the adjustment of the actuator 13, the charge accumulation and the charge transfer in each of the pixels PX(λa, b−2) from the pixels PX(λ1, 3) are sequentially executed. At the end of the second period T2_FR(n), the vertical scanning circuit 113 switches the control signals P_OFD(m) to P_OFD(m+b) from the L level to the H level. As a result, the transistor T_OFD of the pixel PX of the m-th row to the (m+b)-th row is turned on, and the photoelectric converter PD of the pixels PX(λ1, 1) to PX(λa, b) is reset.

The control signals P_OFD(m) to P_OFD(m+b) are switched from the H level to the L level by the vertical scanning circuit 113, whereby the reset of the photoelectric converter PD in the pixels PX(λ1, 1) to PX(λa, b) is released. Thus, the charge accumulation is started in the photoelectric converter PD of the pixels PX(λ1, 1) to PX(λa, b). The timing at which the control signals P_OFD(m) to P_OFD(m+b) switch from the H level to the L level corresponds to the end timing of the second period T2_FR(n) and the start timing of the third period T3_FR(n).

At the end of the third period T3_FR(n), the vertical scanning circuit 113 switches the control signals P_GS_λa−1,b(m) from the L level to the H level. As a result, the transistor T_GS of the pixel PX(λa−1, b) of the (m+b)-th row is turned on, and the charge stored in the photoelectric converter PD of the pixel PX(λa−1, b) of the (m+b)-th row is transferred to the capacitor C_MEM.

When the control signals P_GS_λa−1,b(m+b) are switched from the H level to the L level by the vertical scanning circuit 113, the charge transfer operation from the photoelectric converter PD to the capacitor C_MEM is completed. The timing at which the control signals P_GS_λa−1,b(m+b) switch from the H level to the L level corresponds to the end timing of the third period T3_FR(n) and the start timing of the fourth period T4_FR(n).

Thus, the third period T3_FR(n) corresponds to the charge accumulation period (exposure period) in the photoelectric converter PD of the pixel PX(λa−1, b) in the (m+b)-th row. In the third period T3_FR(n), the charge amounts Qa−1,b(n) are accumulated in the photoelectric converter PD of the pixel PX(λa−1, b) of the (m+b)-th row. Further, since the charge amounts Qa−1,b(n) are transferred, signals MEMa−1,b(n) corresponding to the charge amounts Qa−1,b(n) are held in the capacitor C_MEM as image signals based on light focused on the pixel PX(λa−1, b).

In the following fourth period T4_FR(n), the position of the pixel array 111 in the optical axis direction is adjusted by the actuator 13 so that the image of light incident on the pixel PX(λa, b) is focused. At the end of the fourth period T4_FR(n), the control signals P_OFD(m) to P_OFD(m+b) are switched from the L level to the H level by the vertical scanning circuit 113. As a result, the transistor T_OFD of the pixel PX of the m-th row to the (m+b)-th row is turned on, and the photoelectric converter PD of the pixels PX(λ1, 1) to PX(λa, b) is reset.

The control signals P_OFD(m) to P_OFD(m+b) are switched from the H level to the L level by the vertical scanning circuit 113, whereby the reset of the photoelectric converter PD in the pixels PX(λ1, 1) to PX(λa, b) is released. Thus, the charge accumulation is started in the photoelectric converter PD of the pixels PX(λ1, 1) to PX(λa, b). The timing at which the control signals P_OFD(m) to P_OFD(m+b) switch from the H level to the L level corresponds to the end timing of the fourth period T4_FR(n) and the start timing of the fifth period T5_FR(n).

At the end of the fifth period T5_FR(n), the vertical scanning circuit 113 switches the control signals P_GS_λa, b(m+b) from the L level to the H level. As a result, the transistor T_GS of the pixel PX(λa, b) of the (m+b)-th row is turned on, and the charge stored in the photoelectric converter PD of the pixel PX(λa, b) of the (m+b)-th row is transferred to the capacitor C_MEM.

When the control signals P_GS_λa,b(m+b) are switched from the H level to the L level by the vertical scanning circuit 113, the charge transfer operation from the photoelectric converter PD to the capacitor C_MEM is completed. The timing at which the control signals P_GS_λa,b(m+b)

switch from the H level to the L level corresponds to the end timing of the fifth period T5_FR(n) and the start timing of the sixth period T6_FR(n).

Thus, the fifth period T5_FR(n) corresponds to the charge accumulation period (exposure period) in the photoelectric converter PD of the pixel PX(λa, b) in the (m+b)-th row. In the fifth period T5_FR(n), the charge amounts Qa,b(n) are accumulated in the photoelectric converter PD of the pixel PX(λa, b) of the (m+b)-th row. Further, since the charge amounts Qa,b(n) are transferred, signals MEMa,b(n) corresponding to the charge amounts Qa,b(n) are held in the capacitor C_MEM as image signals based on light focused on the pixel PX(λa, b).

In the sixth period T6_FR(n), the readout operations from the first row to the X-th row, that is, the readout operations RO(1) to RO(X) are sequentially executed. Since the charge accumulation time is set uniform for all the pixels PX and the accumulated charge is held in the capacitor C_MEM in all the pixels PX, the readout operations RO(1) to RO(X) may be executed in any order. In FIG. 14, the readout operation RO(m) starts from the start timing of the sixth period T6_FR(n), but may be executed at any timing during the sixth period T6_FR(n).

FIG. 15 illustrates a timing chart depicting specific operations in the readout operations RO(m) and RO(m+b) of FIG. 14. FIG. 15 illustrates control signals P_SEL(m), P_RES(m), and P_TX(m) of the pixel PX in the m-th row, and control signals P_SEL(m+b), P_RES(m+b), and P_TX(m+b) of the pixel PX in the (m+b)-th row.

In FIG. 15, the sampling operation in the signal readout unit 114 is depicted by the same pulse waveform as that of the control signal. A period indicating "sampling of a signal readout unit" at the H level corresponds to a period for sampling, and a period indicating "sampling of a signal readout unit" at the L level corresponds to a period for not sampling. As described above, the signal readout unit 114 reads out a signal from the pixel PX row by row. Therefore, when a signal is read out from the pixel PX of a certain row, the H level of "sampling of the signal readout unit" indicates that the signal from the pixel PX of the row is sampled.

In the present embodiment, the readout operations RO(1) to RO(λ) from the first row to the X-th row are sequentially executed. From the (m−1)-th row to the (m+b+1) th row, as illustrated in FIG. 6, the readout operations RO(m−1), RO(m), . . . , RO(m+b), and RO(m+b+1) are executed in this order. In FIG. 15, the period for performing the readout operation RO(m) corresponds to the period T_RO(m), and the period for performing the readout operation RO(m+b) corresponds to the period T_RO(m+b). The period T_RO(m) includes a period T0_RO(m), a period T1_RO(m), and a period T2_RO(m). The period T_RO(m+b) includes a period T0_RO(m+b), a period T1_RO(m+b), and a period T2_RO(m+b).

First, the operation in the period T_RO(m) will be described.

At the start timing of the period T_RO(m), the vertical scanning circuit 113 switches the control signal P_SEL(m) from the L level to the H level. Thus, the transistor T_SEL of the pixel PX of the m-th row is turned on, and the signal may be read out from the pixel PX of the m-th row to the signal readout unit 114. The vertical scanning circuit 113 maintains the control signal P_SEL(m) at the H level during the period T_RO(m).

Then, the vertical scanning circuit 113 temporarily switches the control signal P_RES(m) to the H level during the period T0_RO(m). As a result, the transistor T_RES of the pixel PX of the m-th row is turned on, and the FD node (capacitor C_FD) is reset. A signal corresponding to the reset potential of the FD node is output to the column signal line LC of the corresponding column via the transistor T_SEL.

Then, during the period T1_RO(m) after the control signal P_RES(m) has switched to the L level, the signal readout unit 114 samples the signals output to the column signal lines LC of the respective columns. The signals obtained from the pixels PX(λ1, 1) to PX(λa, 1) in this manner correspond to the signals MEM1,1(m)_N to MEMa,1(m)_N.

Then, the vertical scanning circuit 113 temporarily switches the control signal P_TX(m) to the H level. As a result, the transistor T_TX of the pixel PX of the m-th row is turned on, and the charge held by the capacitor C_MEM is transferred to the capacitor C_FD. Thus, the FD node has a potential corresponding to the amount of charge transferred from the capacitor C_MEM. A signal corresponding to the potential of the FD node is output to the column signal line LC of the corresponding column via the transistor T_SEL.

Next, in the period T2_RO(m) after the control signal P_TX(m) has switched to the L level, the signal readout unit 114 samples the signals output to the column signal lines LC of each column. The signals obtained from the pixels PX(λ1, 1) to PX(λa, 1) in this manner correspond to the signals MEM1,1(m)_S to MEMa,1(m)_S.

In the signal readout unit 114, the CDS processing is applied to the signals MEM1,1(m)_N-MEMa,1(m)_N and the signals MEM1,1(m)_S-MEMa, 1(m)_S acquired as shown above. That is, the corresponding signals MEM1,1(m)_N to MEMa,1(m)_N are subtracted from each of the signals MEM1,1(m)_S to MEMa,1(m)_S. Thus, the offset component caused by the circuit configuration or characteristic variation superimposed on the signals MEM1,1(m)_S to MEMa,1(m)_S is removed.

The operation in each of the subsequent periods T_RO(m+1) to T_RO(m+b−1) is similar to the operation in the period T_RO(m).

Next, the operation in the period T_RO(m+b) will be described.

At the start timing of the period T_RO(m+b), the vertical scanning circuit 113 switches the control signal P_SEL(m+b) from the L level to the H level. As a result, the transistor T_SEL of the pixel PX in the (m+b)-th row is turned on, and the signal may be read out from the pixel PX in the (m+b)-th row to the signal readout unit 114. The vertical scanning circuit 113 maintains the control signal P_SEL(m+b) at the H level during the period T_RO(m+b).

Then, the vertical scanning circuit 113 temporarily switches the control signal P_RES(m+b) to the H level during the period T0_RO(m+b). As a result, the transistor T_RES of the pixel PX in the (m+b)-th row is turned on, and the FD node (capacitor C_FD) is reset. A signal corresponding to the reset potential of the FD node is output to the column signal line LC of the corresponding column via the transistor T_SEL.

Next, in the period T1_RO(m+b) after the control signal P_RES(m+b) has switched to the L level, the signal readout unit 114 samples the signals output to the column signal lines LC of each column. The signals obtained from the pixels PX(λ1, b) to PX(λa, b) in this manner correspond to the signals MEM1,b(m+b)_N to MEMa,b(m+b)_N.

Then, the vertical scanning circuit 113 temporarily switches the control signal P_TX(m+b) to the H level. As a result, the transistor T_TX of the pixel PX of the (m+b)-th row is turned on, and the charge held by the capacitor C_MEM is transferred to the capacitor C_FD. Thus, the FD node has a potential corresponding to the amount of charge transferred from the capacitor C_MEM. A signal corresponding to the potential of the FD node is output to the column signal line LC of the corresponding column via the transistor T_SEL.

Next, in the period T2_RO(m+b) after the control signal P_TX(m+b) has switched to the L level, the signal readout unit 114 samples the signals output to the column signal lines LC of each column. The signals obtained from the pixels PX($\lambda$1, b) to PX($\lambda$a, b) in this manner correspond to the signals MEM1,$b(m+b)$_S to MEMa,b(m+b)_S.

In the signal readout unit 114, the CDS processing is applied to the signals MEM1,$b(m+b)$_N to MEMa,b(m+b)_N and the signals MEM1,$b(m+b)$_S to MEMa,b(m+b)_S acquired as shown above. That is, the corresponding signals MEM1,$b(m+b)$_N to MEMa,b(m+b)_N are subtracted from each of the signals MEM1,$b(m+b)$_S to MEMa,b(m+b)_S. Thus, the offset component caused by the circuit configuration or characteristic variation superimposed on the signals MEM1,$b(m+b)$_S to MEMa,b(m+b)_S is removed.

In the present embodiment, regardless of whether or not the axial chromatic aberration correction is performed on the lens 16, an image signal by light of a plurality of focused wavelength bands may be acquired within one frame (from the start of charge accumulation in the photoelectric converter PD of all the pixels PX to the completion of signal readout). Therefore, it is possible to achieve an imaging device capable of obtaining a multi-spectral high-quality image at a high speed at a lower cost than when using a lens subjected to axial chromatic aberration correction. For example, even if the unit pixel block 1111 is composed of nine kinds of pixels having sensitivity in the wavelength bands of ultraviolet light, infrared light and seven kinds of visible light, an image based on the light focused in each wavelength band may be acquired in a single frame by using a single lens not subjected to axial chromatic aberration correction. Thus, a multispectral imaging system may be established at a low cost.

As described above, according to the present embodiment, in the imaging device having a plurality of kinds of pixels having sensitivity in different wavelength bands, it is possible to acquire a high-quality image focused on the plurality of kinds of pixels at a high speed while suppressing an increase in component cost.

Fourth Embodiment

Figure 16:
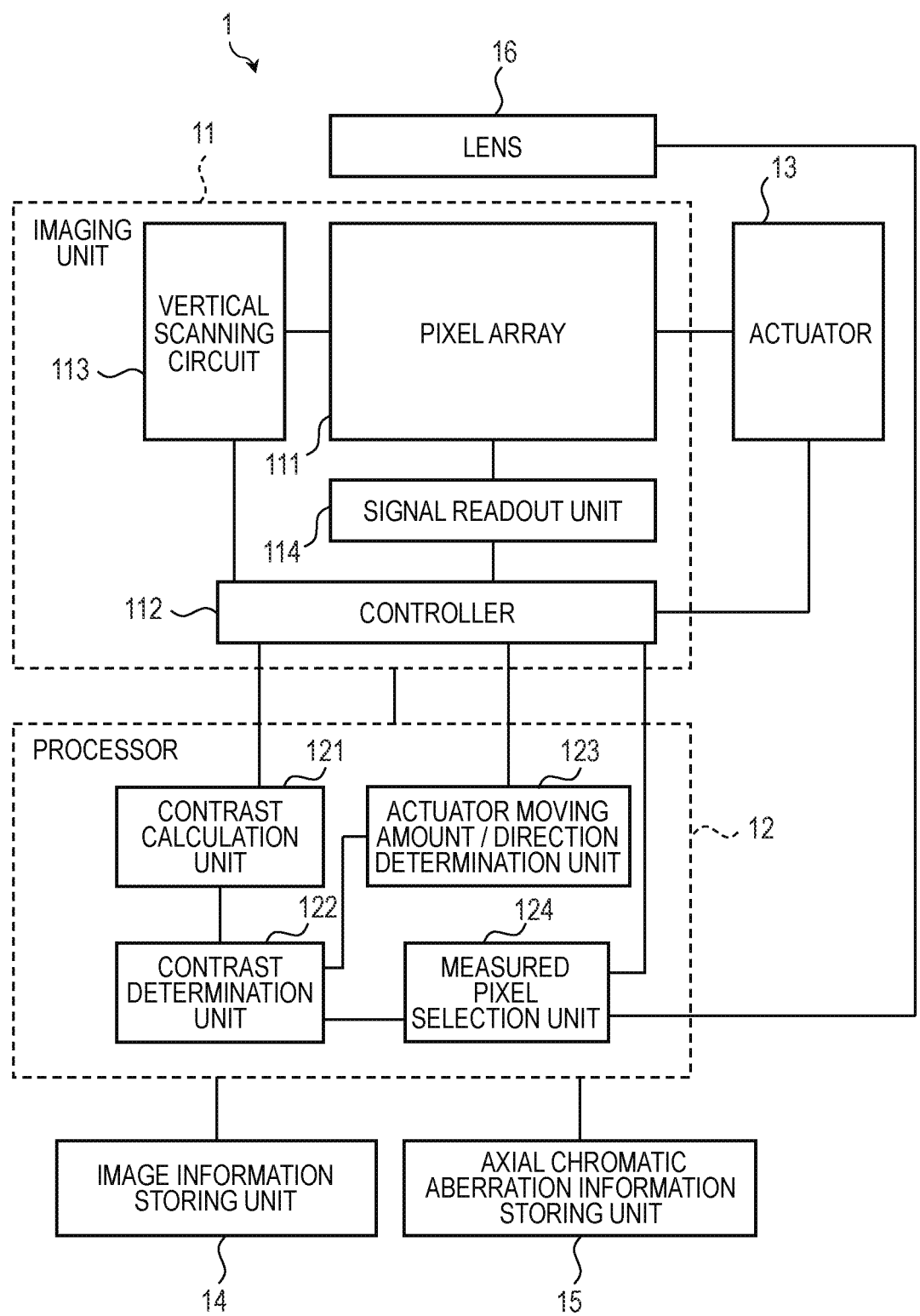
FIG. 16 is a block diagram illustrating a configuration example of an imaging unit in an imaging device according to a fourth embodiment of the present invention.
Figure 17:
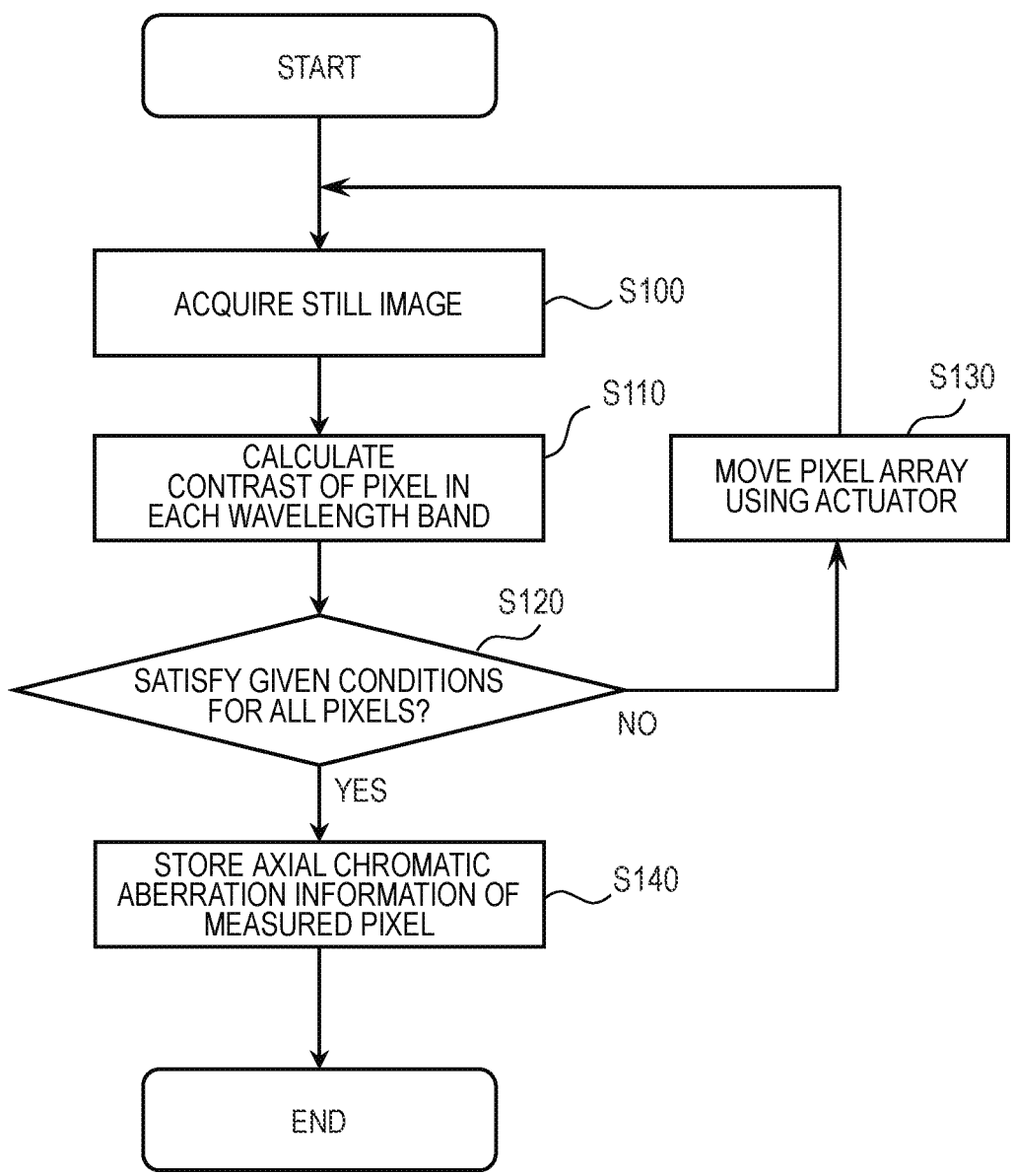
FIG. 17 is a flowchart illustrating a method of acquiring axial chromatic aberration information in the imaging device according to the fourth embodiment of the present invention.

An imaging device according to a fourth embodiment of the present invention will be described with reference to FIG. 16 and FIG. 17. Components similar to those of the imaging device according to the first to third embodiments are denoted by the same reference numerals, and descriptions thereof are omitted or simplified. FIG. 16 is a block diagram illustrating a configuration example of the imaging device according to the present embodiment. FIG. 17 is a flowchart illustrating the method of acquiring axial chromatic aberration information in the imaging device according to the present embodiment.

The imaging device according to the present embodiment is similar to the imaging device according to the first embodiment except that the internal configuration of the processor 12 is different. That is, as illustrated in FIG. 16, the processor 12 of the imaging device according to the present embodiment may include a contrast calculation unit 121, a contrast determination unit 122, an actuator moving amount/direction determination unit 123, and a measured pixel selection unit 124. The imaging device according to the present embodiment may further include functions to be described later, in addition to the functions described in the first embodiment, depending on the internal configuration of the processor 12.

The contrast calculation unit 121 has a function of acquiring image information of a still image from the imaging unit 11 and calculating contrast C in each of the pixels PX($\lambda$,1), PX($\lambda$2), PX($\lambda$3), and PX(IR) each having sensitivity for different wavelength bands.

The contrast determination unit 122 has a function of determining whether or not the contrast C acquired from the contrast calculation unit 121 satisfies a predetermined condition. Although the determination condition of the contrast C may be set properly, it is considered in the present embodiment that the determination condition is whether or not the contrast C is the maximum value. As a result of the determination, when the contrast C does not satisfy the predetermined condition, the contrast determination unit 122 outputs information on the contrast C to the actuator moving amount/direction determination unit 123. On the other hand, when the contrast C satisfies the predetermined condition, the contrast determination unit 122 outputs to the measured pixel selection unit 124 the position information (moving amount and direction) of the actuator 13 when the image is acquired, that is, information concerning the condition for focusing on the pixel PX.

The actuator moving amount/direction determination unit 123 has a function of estimating the moving amount and direction of the actuator 13 for maximizing the contrast C based on the value of the contrast C acquired from the contrast calculation unit 121 through the contrast determination unit 122. The actuator moving amount/direction determination unit 123 also has a function of transmitting the estimated moving amount and direction of the actuator 13 to the actuator 13 via the controller 112. The method of estimating the moving amount and direction of the actuator 13 is not particularly limited to specific manners. As in a general contrast autofocus method, the contrast C may be acquired while changing the direction and the amount of movement of the focus, and the amount and direction of movement of the actuator 13 may be estimated from the direction and the amount of movement of the focus in which the contrast C reaches the maximum value.

The measured pixel selection unit 124 has a function of acquiring information on the amount and direction (position) of movement of the actuator 13 when the contrast C of the pixel PX is the maximum value from the contrast determination unit 122. The measured pixel selection unit 124 has a function of acquiring information on the type and focal length of the lens from the lens 16 and transmitting the information to the axial chromatic aberration information storing unit 15. The measured pixel selection unit 124 has a function of determining whether or not all of the pixels PX($\lambda$1), PX($\lambda$2), PX($\lambda$3), and PX(IR) each having sensitivity for different wavelength bands are focused, and transmitting a determination result to the controller 112 if all of the pixels PX are not focused.

The controller 112 controls the actuator 13, the vertical scanning circuit 113, and the signal readout unit 114 based on the information acquired from the actuator moving amount/direction determination unit 123 and the measured pixel selection unit 124 to capture still images and moving images.

The axial chromatic aberration information storing unit 15 holds information (axial chromatic aberration information) in which information on the type and focal length of the lens is linked to information on the moving amount and direction (position) of the actuator 13 when the contrast C of the pixel PX reaches the maximum value.

With the configuration described above, in the imaging device of the present embodiment, it is possible to acquire axial chromatic aberration information for each type of lens and each focal length prior to the main imaging operation and store the information in the axial chromatic aberration information storing unit 15. For example, an object whose contrast may be measured, such as a resolution chart, is captured while driving the actuator 13 by an arbitrary moving amount, and the moving amount of the actuator 13 when the contrast becomes maximum is stored in the axial chromatic aberration information storing unit 15 as axial chromatic aberration information. By repeating this operation for each of the pixels PX($\lambda$1), PX($\lambda$2), PX($\lambda$3), PX(IR) each having sensitivity for different wavelength bands, the axial chromatic aberration information of a lens of an arbitrary type and focal length may be acquired.

Note that at least a part of a plurality of pixels PX forming the pixel array 111 may be formed with pupil division pixels having a plurality of photoelectric converters, and information on the moving amount and direction of the actuator 13 for focusing on the pixel PX may be acquired using phase difference information obtained from image data. In this case, the contrast calculation unit 121 and the contrast determination unit 122 are unnecessary, and based on the phase difference information sent from the controller 112 to the processor 12, the measured pixel selection unit 124 determines whether all the pixels PX are in focus. As a result of the determination, if all the pixels PX are not in focus, the moving amount and direction of the actuator 13 with respect to the pixels PX not in focus are determined by the actuator moving amount/direction determination unit 123.

Next, the method of acquiring the axial chromatic aberration information in the imaging device according to the present embodiment will be described more specifically with reference to FIG. 17. FIG. 17 is a flowchart illustrating the method of acquiring the axial chromatic aberration information in the imaging device according to the present embodiment.

First, the processor 12 instructs the controller 112 to take a still image as a preliminary imaging operation for acquiring the axial chromatic aberration information. The controller 112 controls the vertical scanning circuit 113 and the signal readout unit 114 in response to an instruction from the processor 12, and acquires a still image of an optical image incident on the pixel array 111 through the lens 16 (step S100). The captured still image is sent from the controller 112 to the contrast calculation unit 121 of the processor 12.

Then, the contrast calculation unit 121 extracts the data of the pixels PX($\lambda$1), PX($\lambda$2), PX($\lambda$3), and PX(IR) from the acquired still image and reconstructs the extracted still image into four types of image data, each of which is composed of data of one type of pixel PX. The image data thus reconstructed is called image data IM($\lambda$1), IM($\lambda$2), IM($\lambda$3), IM(IR).

Next, the contrast calculation unit 121 calculates the contrast in an arbitrary calculation region in each of the image data IM($\lambda$1), IM($\lambda$2), IM($\lambda$3), and IM(IR) (step S110). The contrast calculation method is not particularly limited to specific manners, but may be calculated based on, for example, the following calculation formula. Here, C is the contrast of an arbitrary operation region in the image data, Omax is the maximum value of the output level in an arbitrary operation region in the image data, and Omin is the minimum value of the output level in an arbitrary operation region in the image data.

$$C=(O\max-\theta O\min)/(O\max+O\min)$$

Next, the contrast calculation unit 121 determines whether the contrast C in each of the image data IM($\lambda$1), IM($\lambda$2), IM($\lambda$3), IM(IR) calculated in step S110 satisfies a predetermined condition (step S120). The predetermined condition is the value of the contrast C when focusing on each pixel PX, specifically, that the maximum value of the contrast C obtained within the movable range of the actuator 13.

As a result of the determination in step S120, if at least one contrast C does not satisfy a predetermined condition ("NO" in FIG. 17), the process proceeds to step S130. In step S130, the actuator moving amount/direction determination unit 123 estimates the moving amount and direction of the actuator 13 at which the contrast C becomes maximum for the pixels PX in which their contrast C does not satisfy the predetermined condition. The controller 112 drives the actuator 13 based on the estimated result of the actuator moving amount/direction determination unit 123. Thereafter, the process returns to step S100, and the process is repeated from the capture of a still image.

If all the contrasts C of the image data IM($\lambda$1), IM($\lambda$2), IM($\lambda$3), and IM(IR) satisfy predetermined conditions ("YES" in FIG. 17), the process proceeds to step S140. In step S140, the measured pixel selection unit 124 acquires from the contrast determination unit 122 the moving amount and direction (position) information of the actuator in which the contrast C of the pixel PX becomes maximum from the contrast determination unit 122. The measured pixel selection unit 124 acquires information on the kind and focal length of the lens from the lens 16. The measured pixel selection unit 124 links the information obtained from the lens 16 to the information obtained from the contrast determination unit 122, and stores the linked information in the axial chromatic aberration information storing unit 15 as axial chromatic aberration information.

The axial chromatic aberration information corresponding to each of the pixels PX($\lambda$1), PX($\lambda$2), PX($\lambda$3), and PX(IR) is stored in the axial chromatic aberration information storing unit 15, thereby completing a series of flows for acquiring the axial chromatic aberration information of the lens 16.

The method of obtaining the axial chromatic aberration information described in the present embodiment is particularly useful when the axial chromatic aberration information of the lens 16 is not known in advance. For example, it is considered that the axial chromatic aberration within a visible light range is infinitely close to zero as a result of advances in lens development technology. In this case, the axial chromatic aberration between the visible light and the infrared light is different from the conventional lens, and in the imaging device in which the axial chromatic aberration information is previously stored as in the first embodiment, the precision of focusing in each pixel PX is lowered. In this regard, by applying the method of acquiring axial chromatic aberration information according to the present embodiment, it is possible to generate the axial chromatic aberration information suitable for the lens 16 by the preliminary imaging operation prior to the main imaging operation.

Therefore, according to the present embodiment, it is possible to achieve an imaging device capable of focusing in each wavelength band in accordance with not only existing lenses but also lenses to be developed in the future.

Fifth Embodiment

Figure 18:
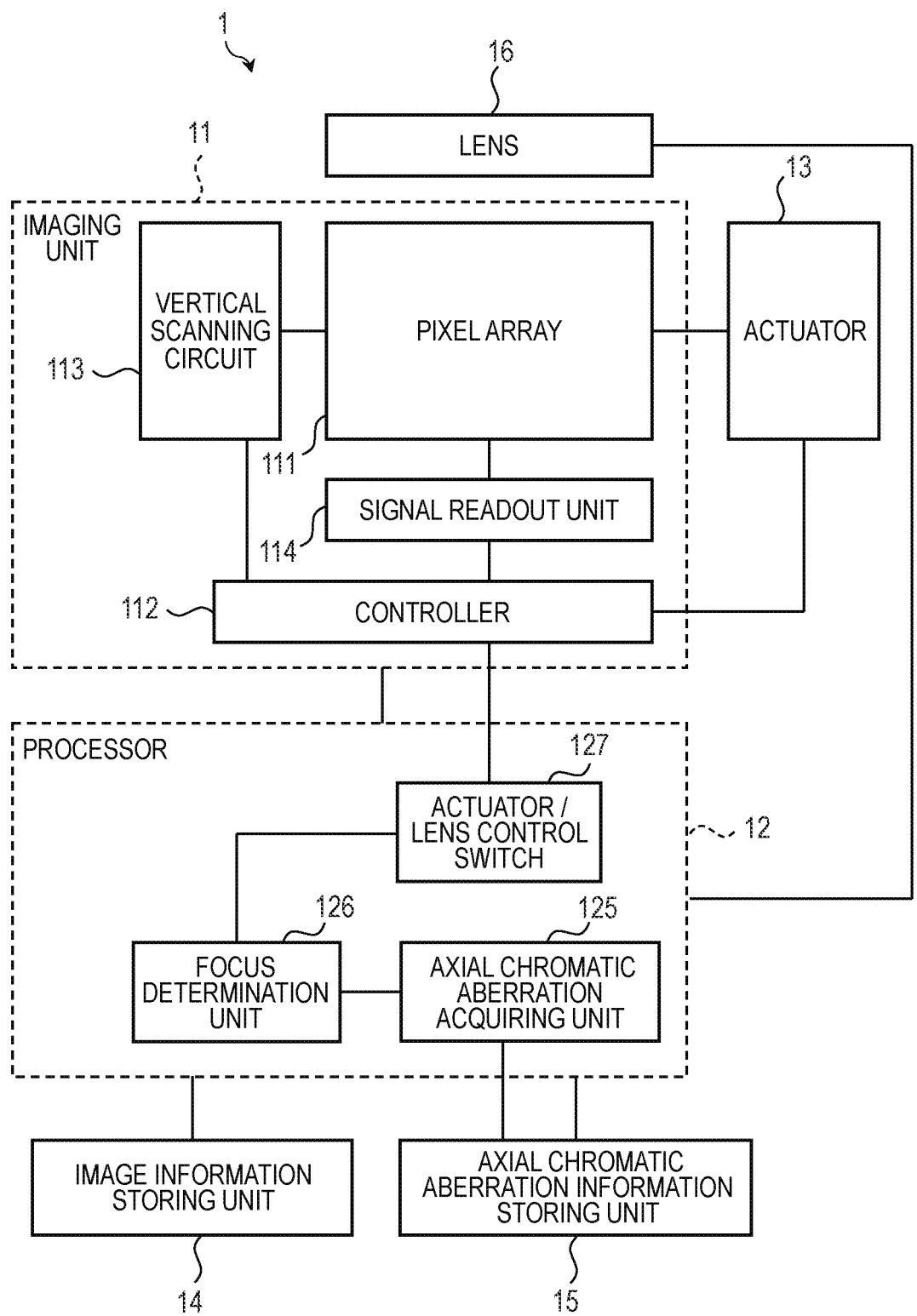
FIG. 18 is a block diagram illustrating a configuration example of an imaging unit in an imaging device according to a fifth embodiment of the present invention.
Figure 19:
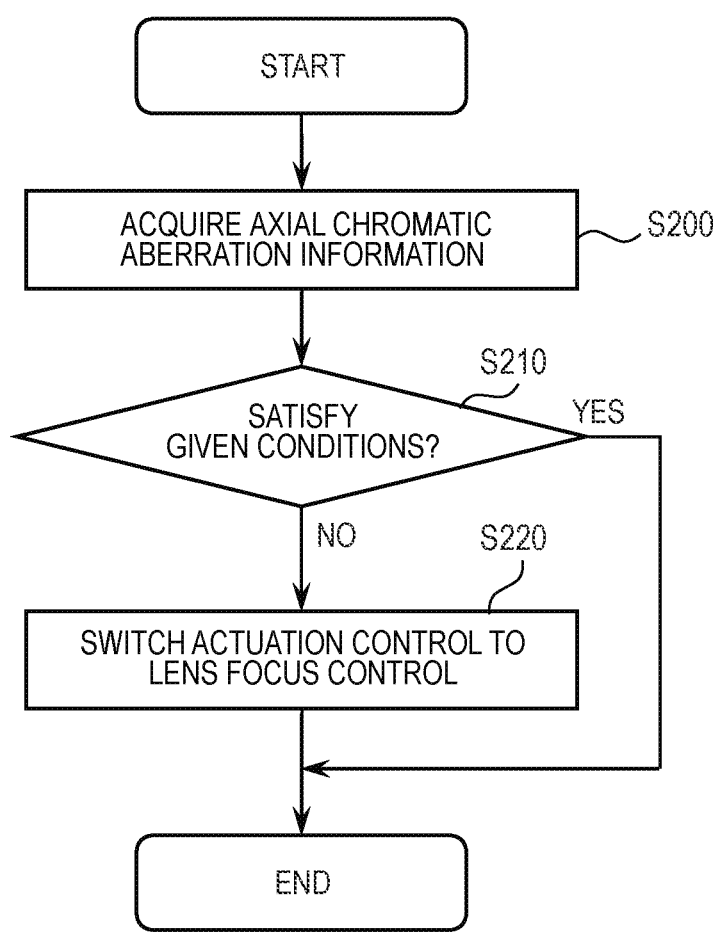
FIG. 19 is a flowchart illustrating a focus control method in the imaging device according to the fifth embodiment of the present invention.

An imaging device according to a fifth embodiment of the present invention will be described with reference to FIG. 18 and FIG. 19. Components similar to those of the imaging device according to the first to fourth embodiments are denoted by the same reference numerals, and descriptions thereof are omitted or simplified. FIG. 18 is a block diagram illustrating a configuration example of the imaging device according to the present embodiment. FIG. 19 is a flowchart illustrating the focus control method in the imaging device according to the present embodiment.

The imaging device according to the present embodiment is similar to the imaging device according to the first embodiment except that the internal configuration of the processor 12 is different. That is, as illustrated in FIG. 17, the processor 12 of the imaging device according to the present embodiment may include an axial chromatic aberration acquiring unit 125, a focus determination unit 126, and an actuator/lens control switch 127. The imaging device according to the present embodiment may further include functions to be described later, in addition to the functions described in the first embodiment, depending on the internal configuration of the processor 12.

The axial chromatic aberration acquiring unit 125 has a function of acquiring the axial chromatic aberration information of the lens 16 stored in advance from the axial chromatic aberration information storing unit 15 and outputting the information to the focus determination unit 126.

The focus determination unit 126 has a function of determining whether or not the axial chromatic aberration information acquired from the axial chromatic aberration acquiring unit 125 satisfies predetermined conditions for focusing on each of the pixels PX($\lambda$1), PX($\lambda$2), PX($\lambda$3), and PX(IR). The focus determination unit 126 has a function of outputting the determination result to the actuator/lens control switch 127.

The actuator/lens control switch 127 has a function of selecting either the movement of the pixel array 111 by the actuator 13 or the autofocus control by the lens 16 as a focus control method in accordance with a determination result obtained from the focus determination unit 126.

The controller 112 has a function of instructing the actuator 13 or the lens 16 to perform the focus control in accordance with the selection result by the actuator/lens control switch 127.

Next, the focus control method in the imaging device according to the present embodiment will be described more specifically with reference to FIG. 19. FIG. 19 is a flowchart illustrating the focus control method in the imaging device according to the present embodiment.

First, the axial chromatic aberration acquiring unit 125 acquires the previously stored axial chromatic aberration information of the lens 16 from the axial chromatic aberration information storing unit 15 and outputs the above information to the focus determination unit 126 (step S200).

Next, the focus determination unit 126 determines whether or not the axial chromatic aberration information acquired from the axial chromatic aberration acquiring unit 125 satisfies predetermined conditions for focusing on each of the pixels PX($\lambda$1), PX($\lambda$2), PX($\lambda$3), and PX(IR) (step S210). The predetermined conditions used as the criteria for determination include, for example, the time required for focusing by the actuator 13 being shorter than the time required for focusing by the lens 16, and the axial chromatic aberration being equal to or less than the maximum amount of the movable area of the actuator 13. In the case of capturing a distant object using the lens 16 having a long focal length, the time required for focusing by the actuator 13 becomes longer than the time required for focusing by the lens 16, or there is a possibility that the focusing cannot be achieved only by using the actuator 13. Step S210 is a step for determining whether or not the focusing may be achieved with respect to the pixel PX only by controlling the actuator 13.

As a result of the determination in step S210, if the axial chromatic aberration information acquired from the axial chromatic aberration acquiring unit 125 does not satisfy the predetermined condition ("NO" in FIG. 19), the process proceeds to step S220. For example, it may be determined that the axial chromatic aberration information does not satisfy the predetermined condition if any one of the above two examples is not satisfied. Alternatively, it may be determined that the axial chromatic aberration information does not satisfy the predetermined condition if the above two examples are not satisfied at the same time. In step S220, it is determined to switch from the focusing control by the actuator 13 to the focusing control by the lens 16, and the result is output to the controller 112. In this case, the autofocus function by the lens 16 is used for focus control.

If the axial chromatic aberration information acquired from the axial chromatic aberration acquiring unit 125 satisfies the predetermined condition ("YES" in FIG. 19), the series of flows for selecting the focus control method ends. In this case, as described in the first embodiment, only the actuator 13 is used for focus control.

The focus control may be switched for each of pixels PX($\lambda$1), PX($\lambda$2), PX($\lambda$3) and PX(IR). Alternatively, when the predetermined condition is not satisfied for any one kind of pixel PX, focus control may be performed so as to switch to the lens focus control for all pixels PX.

The focus control method described in the present embodiment is particularly useful when the axial chromatic aberration information of the lens 16 is not known in advance. For example, it is considered that the axial chromatic aberration within a visible light range is infinitely close to zero as a result of advances in lens development technology. In this case, the axial chromatic aberration between the visible light and the infrared light is different from the conventional lens, and in the imaging device in which the axial chromatic aberration information is previously stored as in the first embodiment, the precision of focusing in each pixel PX is lowered. In this regard, by applying the focus control method according to the present embodiment, it is possible to achieve the optimum focus control suitable for the lens 16.

Therefore, according to the present embodiment, it is possible to achieve an imaging device capable of focusing in each wavelength band in accordance with not only existing lenses but also lenses to be developed in the future.

Sixth Embodiment

Figure 20:
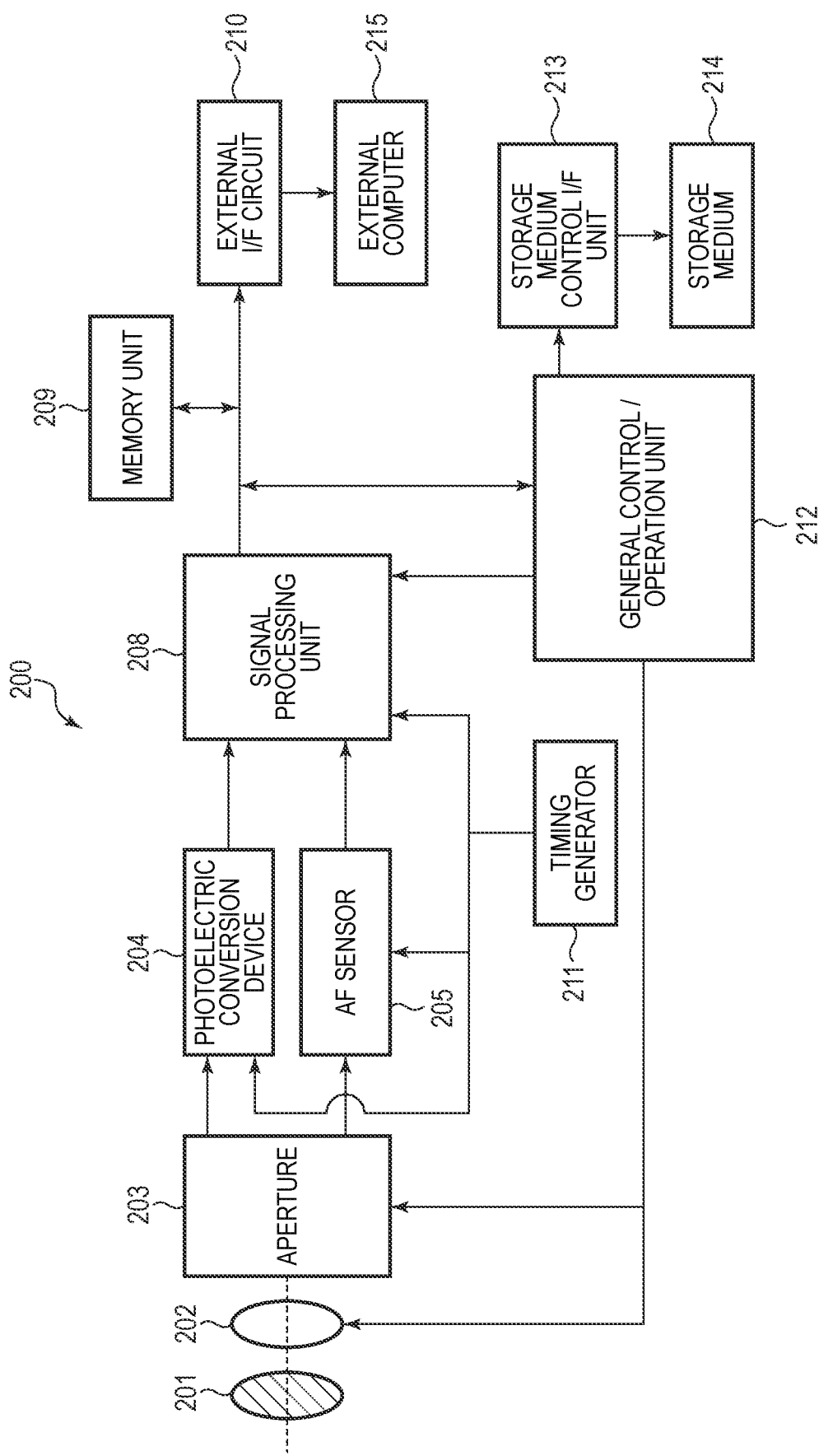
FIG. 20 is a block diagram illustrating a schematic configuration of an imaging system according to a sixth embodiment of the present invention.

An imaging system according to a sixth embodiment of the present invention will be described with reference to FIG. 20. FIG. 20 is a block diagram illustrating a schematic configuration of an imaging system according to the present embodiment.

The imaging device 1 described in the first to fifth embodiments may be applied to various imaging systems. Examples of applicable imaging systems include digital still cameras, digital camcorders, surveillance cameras, copiers, fax machines, cellular phones, in-vehicle cameras, observation satellites, and the like. A camera module including an optical system such as a lens and an imaging device is also included in the imaging system. FIG. 20 illustrates a block diagram of a digital still camera as an example.

The imaging system 200 illustrated in FIG. 20 includes a photoelectric conversion device 204, a lens 202 that forms an optical image of an object on the photoelectric conversion device 204, an aperture 203 that varies the amount of light passing through the lens 202, a barrier 201 that protects the lens 202, and an AF sensor 205. The lens 202 and the aperture 203 are optical systems that focuses light on the photoelectric conversion device 204. The photoelectric conversion device 204 is the photoelectric conversion apparatus described in any one of the first to fifth embodiments, and converts an optical image formed by the lens 202 into image data. The AF sensor 205 is for acquiring a signal necessary for focus detection.

The imaging system 200 also includes a signal processing unit 208 that processes an output signal output from the photoelectric conversion device 204 and the AF sensor. The signal processing unit 208 generates image data from the digital signal output from the photoelectric conversion device 204. The signal processing unit 208 performs various types of correction and compression as necessary to output image data. The photoelectric conversion device 204 may include an AD conversion unit that generates a digital signal to be processed by the signal processing unit 208. The AD conversion unit may be formed on a semiconductor layer (semiconductor substrate) on which the photoelectric converter of the photoelectric conversion device 204 is formed, or may be formed on a semiconductor substrate different from the semiconductor layer on which the photoelectric converter of the photoelectric conversion device 204 is formed. The signal processing unit 208 may be formed on the same semiconductor substrate as the photoelectric conversion device 204.

The imaging system 200 further includes a memory unit 209 that temporarily stores image data, and an external interface unit (external I/F unit) 210 that communicates with an external computer 215 and the like. The imaging system 200 further includes a storage medium 214 such as a semiconductor memory for storing or reading out image pickup data, and a storage medium control interface unit (storage medium control I/F unit) 213 for storing or reading out image pickup data on or from the storage medium 214. The storage medium 214 may be built in the imaging system 200 or may be detachable.

The imaging system 200 further includes a general control/operation unit 212 that controls various calculations and the entire digital still camera, and a timing generation unit 211 that outputs various timing signals to the photoelectric conversion device 204, the signal processing unit 208, and the AF sensor 205. Here, the timing signal or the like may be input from the outside, and the imaging system 200 may include at least the photoelectric conversion device 204 and the signal processing unit 208 that processes the output signal output from the photoelectric conversion device 204.

The photoelectric conversion device 204 outputs an imaging signal to the signal processing unit 208. The signal processing unit 208 performs predetermined signal processing on an imaging signal output from the photoelectric conversion device 204, and outputs image data. The signal processing unit 208 generates an image using the imaging signal.

As described above, according to the present embodiment, the imaging system to which the photoelectric conversion apparatus according to the first to fifth embodiments is applied may be realized.

Seventh Embodiment

Figure 21A:
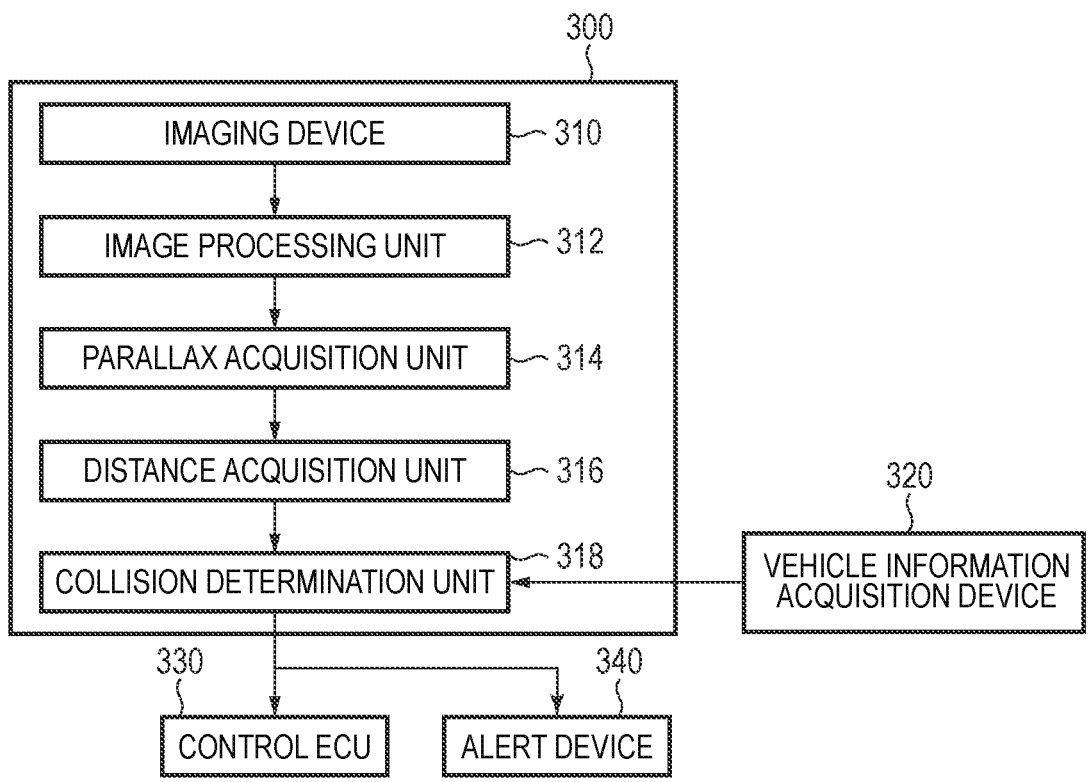
FIG. 21A is a diagram illustrating a configuration example of an imaging system according to a seventh embodiment of the present invention.
Figure 21B:
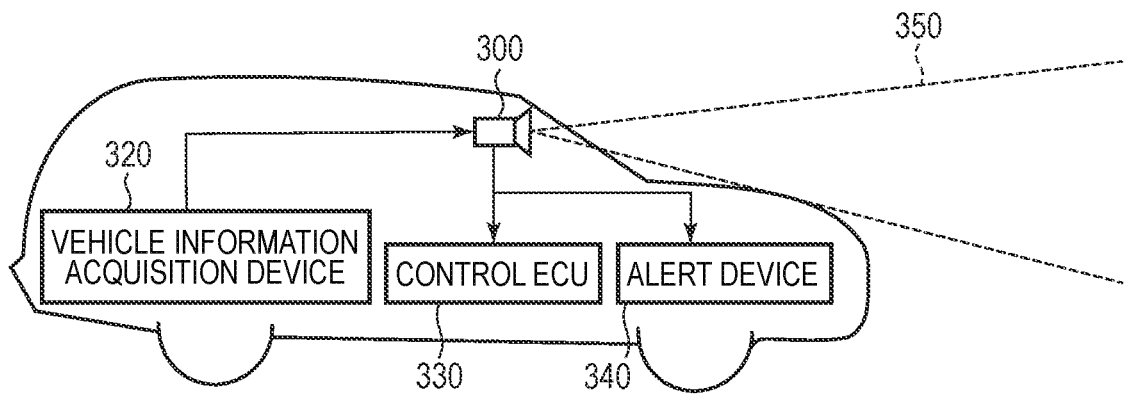
FIG. 21B is a diagram illustrating a configuration example of a movable object according to the seventh embodiment of the present invention.

An imaging system and a movable object according to a seventh embodiment of the present invention will be described with reference to FIG. 21A and FIG. 21B. FIG. 21A is a diagram illustrating a configuration of the imaging system according to the present embodiment. FIG. 21B is a diagram illustrating the configuration of the movable object according to the present embodiment.

FIG. 21A illustrates an example of an imaging system for an on-vehicle camera. The imaging system 300 includes an imaging device 310. The imaging device 310 corresponds to the imaging device 1 according to any one of the first to fifth embodiments. The imaging system 300 includes an image processing unit 312 for performing image processing to a plurality of image data acquired by the imaging device 310, and a parallax acquisition unit 314 for calculating parallax (phase difference of parallax images) from the plurality of image data acquired by the imaging system 300. The imaging system 300 includes a distance acquisition unit 316 for calculating a distance to an object based on the calculated parallax, and a collision determination unit 318 for determining whether there is a possibility of collision based on the calculated distance. The parallax acquisition unit 314 and the distance acquisition unit 316 are examples of distance information acquisition means for acquiring information of a distance to an object. That is, the distance information relates to parallax, defocus amount, the distance to the object, and the like. The collision determination unit 318 may use any of the distance information to determine the possibility of collision. The distance information acquisition means may be implemented by a specially designed hardware or may be implemented by a software module. It may be realized by an FPGA (Field Programmable Gate Array), an ASIC (Application Specific Integrated Circuit), or a combination thereof.

The imaging system 300 is connected to a vehicle information acquisition device 320, and may acquire vehicle information such as vehicle speed, yaw rate, and steering angle. The imaging system 300 is connected to a control ECU 330, which is a control device for outputting a control signal for generating a braking force to the vehicle, based on a result of determination by the collision determination unit 318. The imaging system 300 is also connected to an alert device 340 for alerting the driver based on the determination result by the collision determination unit 318. For example, when the collision probability is high as a result of the determination by the collision determination unit 318, the control ECU 330 performs vehicle control for avoiding the collision and reducing the damage by applying the brake, releasing an accelerator pedal, and suppressing the engine output. The alert device 340 warns the user by sounding an alarm such as sound, displaying alert information on a screen of a car navigation system or the like, or giving vibration to the seat belt or steering.

In the present embodiment, the periphery of the vehicle, for example, the front side or the rear side, is imaged by the imaging system 300. FIG. 21B illustrates an imaging system for imaging the front of a vehicle (imaging range 350). The vehicle information acquisition device 320 sends an instruction to the imaging system 300 or the imaging device 310. With such a configuration, the accuracy of distance measurement may be further improved.

Although an example of controlling the vehicle so as not to collide with another vehicle has been described above, the present invention may be applied to control for automatically driving the vehicle while following another vehicle, or to control for automatically driving the vehicle so as not to protrude from a lane. Further, the imaging system may be applied not only to a vehicle such as the own vehicle, but also to a movable object (movable device) such as a ship, an aircraft or an industrial robot. In addition, the present invention may be applied not only to a movable object, but also widely to devices using the object recognition, such as an intelligent transport system (ITS).

Other Embodiments

The present invention is not limited to the above embodiments, and various modifications are possible.

For example, the embodiments of the present invention include an example in which a part of the configuration of one embodiment is added to another embodiment and an example in which a part of the configuration of another embodiment is replaced.

Although the color filter of the RGB array is shown in the first embodiment, the color filter may be an CMY array including an C pixel having a cyan color filter, an M pixel having a magenta color filter, and an Y pixel having a yellow color filter. In addition to color pixels such as the RGB and CMY, a pixel for directly detecting incident light without color separation (white pixel) may be further included.

Although the fourth embodiment has shown the method of acquiring axial chromatic aberration information in the imaging device according to the first embodiment, the same method of acquiring axial chromatic aberration information may be applied to the imaging device according to the second and third embodiments.

Although the focus control method in the imaging device according to the first embodiment has been described in the fifth embodiment, the same focus control method may be applied to the imaging device according to the second and third embodiments.

In the first to fifth embodiments, a device for acquiring an image, that is, an imaging device, is exemplified, but the present invention is not necessarily limited to the application to the imaging device. For example, if the present invention is applied to a device mainly directed to distance measurements as described in the seventh embodiment, it is not necessary to output an image. In such a case, the device may be referred to as a photoelectric conversion device for converting optical information into a predetermined electric signal. The imaging device may be categorized as one of photoelectric conversion devices.

The imaging system according to the sixth and seventh embodiments is an example of an imaging system to which the photoelectric conversion apparatus of the present invention may be applied, and the imaging system to which the photoelectric conversion apparatus of the present invention may be applied is not limited to the configuration illustrated in FIG. 20 and FIG. 21A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-174108, filed Oct. 15, 2020, which is hereby incorporated by reference herein in its entirety.

What is claimed is:

1. An imaging device comprising:
a plurality of pixels each including a photoelectric converter;
an actuator configured to move the plurality of pixels along a direction of an optical axis;
a focus control circuit configured to control a focal position of light incident on the plurality of pixels by driving the actuator; and
a pixel control circuit configured to control charge accumulation in the photoelectric converters of the plurality of pixels, and readout of signals from the plurality of pixels,
wherein the plurality of pixels includes a plurality of first pixels each configured to output a signal corresponding to light in a first wavelength band, and a plurality of second pixels each configured to output a signal corresponding to light in a second wavelength band that is different from the first wavelength band,
wherein the pixel control circuit is configured to execute:
a first period of accumulating charge in the photoelectric converters of the plurality of first pixels after the light in the first wavelength band is focused on the plurality of first pixels by driving the actuator;
a second period of accumulating charge in the photoelectric converters of the plurality of second pixels after the light in the second wavelength band is focused on the plurality of second pixels by driving the actuator after the first period, and before a first signal corresponding to an amount of charge generated in the photoelectric converter of each of the plurality of first pixels is read out; and
a third period of reading out the first signal corresponding to the amount of charge generated in the photoelectric converter of each of the plurality of first pixels and a second signal corresponding to an amount of charge generated in the photoelectric converter of each of the plurality of second pixels after the second period,
wherein the first period, the second period, and the third period are executed during one frame.

2. The imaging device according to claim 1,
wherein the pixel control circuit is further configured to execute, after the one frame, a subsequent frame during which periods corresponding to the first period, the second period, and the third period of the one frame are executed, wherein the focus control circuit is configured to execute;
- a period of controlling a focal position such that the light in the first wavelength band is focused on the plurality of first pixels after the second period of the one frame and before the first period of the subsequent frame; and
- a period of controlling a focal position such that the light in the second wavelength band is focused on the plurality of second pixels after the first period of the subsequent frame and before the second period of the subsequent frame.

3. The imaging device according to claim 1 further comprising an axial chromatic aberration information storing circuit configured to store axial chromatic aberration information related to an axial chromatic aberration amount for each lens type and each focal length,
- wherein the focus control circuit is configured to control a focal position of light incident on the plurality of pixels based on the axial chromatic aberration information stored in the axial chromatic aberration information storing circuit.

4. The imaging device according to claim 3, wherein the axial chromatic aberration information is generated based on contrast or phase difference information of each of the plurality of first pixels and the plurality of second pixels acquired by a preliminary image taken prior to a main imaging.

5. The imaging device according to claim 3 further comprising a focus determination circuit configured to determine whether or not information acquired from the axial chromatic aberration information storing circuit satisfies a predetermined condition for focusing on the plurality of pixels,
- wherein the focus control circuit is configured to:
  - control, when the information satisfies the predetermined condition, a focal position of light incident on the plurality of pixels by driving an actuator configured to move the plurality of pixels along a direction of an optical axis, and
  - control, when the information does not satisfy the predetermined condition, a focal position of light incident on the plurality of pixels by driving a lens configured to couple an image of an object to the plurality of pixels.

6. The imaging device according to claim 5, wherein the focus determination circuit determines that the predetermined condition is satisfied when a time required for focusing by the actuator is shorter than a time required for focusing by the lens.

7. The imaging device according to claim 5, wherein the focus determination circuit determines that the predetermined condition is satisfied when the focusing can be executed in a movable area for the actuator.

8. The imaging device according to claim 1, wherein the focus control circuit is configured to control a focal position of light incident on the plurality of pixels by driving a lens configured to couple an image of an object to the plurality of pixels.

9. The imaging device according to claim 1 further comprising a lens configured to couple an image of an object to the plurality of pixels,
- wherein the lens has axial chromatic aberration between an image of light in the first wavelength band coupled to the plurality of pixels and an image of light in the second wavelength band coupled to the plurality of pixels.

10. The imaging device according to claim 1,
- wherein the light in the first wavelength band is visible light, and
- wherein the light in the second wavelength band is infrared light.

11. The imaging device according to claim 10, wherein the plurality of first pixels includes a plurality of types of pixels each having sensitivity in different wavelength bands.

12. An imaging system comprising:
the imaging device according to claim 1; and
a signal processing unit configured to process a signal output from the imaging device.

13. A movable object comprising:
the imaging device according to claim 1;
a distance information acquisition unit configured to acquire distance information indicating a distance to an object from a parallax image based on a signal output from the pixels of the imaging device; and
a controller configured to control the movable object based on the distance information.

14. An imaging device comprising:
a plurality of pixels each including a photoelectric converter;
an actuator configured to move the plurality of pixels along a direction of an optical axis;
a focus control circuit configured to control a focal position of light incident on the plurality of pixels by driving the actuator; and
a pixel control circuit configured to control charge accumulation in the photoelectric converters of the plurality of pixels, and readout of signals from the plurality of pixels,
wherein the plurality of pixels includes a plurality of types of pixels each having sensitivity in different wavelength bands,
wherein the pixel control circuit is configured to execute:
- a plurality of periods each corresponding to the plurality of types of pixels, each of the plurality of periods being a period of accumulating charge in the photoelectric converter of a corresponding type of pixel in a state that light in a wavelength band in which the corresponding type of pixel has sensitivity is focused on by driving the actuator, and
- a period of reading out, from each of the plurality of pixels, a signal corresponding to an amount of charge generated in the photoelectric converter after executing the plurality of periods,
wherein the plurality of periods and the period of the reading out are executed during one frame.

* * * * *